US012596693B2

(12) United States Patent
Alfaras et al.

(10) Patent No.: US 12,596,693 B2
(45) Date of Patent: Apr. 7, 2026

(54) DATA VISIBILITY AND QUALITY MANAGEMENT PLATFORM

(71) Applicant: Confie Holding II Co., Huntington Beach, CA (US)

(72) Inventors: Christopher Alfaras, Marietta, GA (US); Ramakrishnasai Sola, Simi Valley, CA (US)

(73) Assignee: Confie Holding II Co., Huntington Beach, CA (US)

( * ) Notice: Subject to any disclaimer, the term of this patent is extended or adjusted under 35 U.S.C. 154(b) by 0 days.

(21) Appl. No.: 18/585,040

(22) Filed: Feb. 22, 2024

(65) Prior Publication Data

US 2024/0281419 A1 Aug. 22, 2024

Related U.S. Application Data

(60) Provisional application No. 63/486,377, filed on Feb. 22, 2023.

(51) Int. Cl.
*G06F 16/215* (2019.01)
*G06F 16/25* (2019.01)

(52) U.S. Cl.
CPC .......... *G06F 16/215* (2019.01); *G06F 16/254* (2019.01)

(58) Field of Classification Search
None
See application file for complete search history.

(56) References Cited

U.S. PATENT DOCUMENTS

| | | | | |
|---|---|---|---|---|
| 2016/0179164 A1* | 6/2016 | Park | | G06F 1/3206 |
| | | | | 713/340 |
| 2019/0235449 A1* | 8/2019 | Slessman | | G05B 13/02 |
| 2020/0394455 A1* | 12/2020 | Lee | | G06N 20/00 |

FOREIGN PATENT DOCUMENTS

WO WO-2012129675 A1 * 10/2012 ............... G06F 1/26

OTHER PUBLICATIONS

Sugiuchi et al. (JP 2007244098 A), "Power Quality Monitoring Device", Sep. 20, 2007, 11 Pages. (Year: 2007).*

* cited by examiner

*Primary Examiner* — Bai D Vu
(74) *Attorney, Agent, or Firm* — Rutan & Tucker LLP; Ravi Mohan

(57) ABSTRACT

Embodiments described herein comprise an advanced Software as a Service (SaaS) platform addressing challenges including trust, governance, quality, data accuracy, and transparency, ensuring full visibility of enterprise data warehouse data pipelines. These embodiments seamlessly integrate with cloud-based and legacy data platforms, enhancing visibility through monitoring data quality, tracking metadata changes, and generating exceptions for review. Data quality management allows for custom script creation to validate pipelines and business rules. Cloud-native connectors facilitate integration with one or more cloud-based services streamlining data delivery processes. Personalized notifications aid administrators in responsive action, while data profiling capabilities identify quality issues and provide distribution insights. Actionable data intelligence for privacy, security, and governance is enabled through data classification. Automation features encompass data quality checks, metadata monitoring, profiling, and classification, orchestrated by a flexible scheduler. The architecture lever- (Continued)

ages a scalable serverless design with independent micros-
ervices, dynamically scaling based on demand.

20 Claims, 18 Drawing Sheets

*FIG. 17*

DATA VISIBILITY AND QUALITY MANAGEMENT PLATFORM

PRIORITY

This application claims the benefit of and priority to U.S. Provisional patent application Ser. No. 63/486,377, filed Feb. 22, 2023, the disclosure of which is incorporated by reference herein in its entirety.

FIELD

The present disclosure relates to data management platforms. More particularly, the present disclosure relates to operating a data platform across various cloud and legacy environments to provide increased data visibility and quality management.

BACKGROUND

Data pipelines play a crucial role in the management and processing of data within enterprise data warehouses (EDWs). These pipelines are responsible for extracting data from various sources, transforming it into a usable format, and loading it into the EDW for storage and analysis. As data moves through these pipelines, metadata is generated to provide descriptive information about the data, including its source, structure, and quality. However, metadata exceptions can occur when the metadata attributes deviate from predefined rules or standards, leading to issues such as incorrect data lineage or data quality discrepancies. Managing metadata exceptions is essential for maintaining the integrity and reliability of the data stored within the EDW, as it ensures that users can trust the accuracy and consistency of the information they access for decision-making and analysis.

Quality management within data pipelines and EDWs involves addressing various challenges to ensure that the data meets predefined standards for accuracy, consistency, and relevancy. These challenges include managing the complexity of diverse data types and sources, handling large volumes of data, integrating data from disparate systems, enforcing data governance policies, ensuring data privacy and security, and managing data lifecycles. Each of these challenges can impact the quality of the data stored within the EDW and require robust strategies and processes to mitigate effectively. For example, data integration challenges can lead to inconsistencies or discrepancies in the data loaded into the EDW, while data governance challenges can result in compliance issues or unauthorized access to sensitive information. By implementing comprehensive data quality management strategies, organizations can address these challenges and maintain the reliability and trustworthiness of their EDW data.

Furthermore, the relationship between data pipelines, EDWs, metadata exceptions, and quality management challenges underscores the importance of proactive monitoring and governance practices. Organizations must continuously monitor data pipelines to detect and address metadata exceptions promptly, ensuring that data quality issues are identified and resolved before they impact downstream processes or analytics. Additionally, investing in data quality management tools and technologies can help organizations automate data validation, profiling, and cleansing processes, enabling them to maintain high standards of data quality while reducing manual effort and risk of errors. Ultimately, by addressing these challenges holistically and leveraging the synergy between data pipelines, EDWs, metadata management, and quality management practices, organizations can unlock the full potential of their data assets and drive meaningful insights and innovation within their businesses.

SUMMARY OF THE DISCLOSURE

Systems and methods for operating a data platform across various cloud and legacy environments to provide increased data visibility and quality management in accordance with embodiments of the disclosure are described herein. In some embodiments, a device includes a processor, a memory communicatively coupled to the processor, a data quality management logic. The logic is configured to select a target enterprise data warehouse (EDW) platform, monitor the EDW platform, produce peak demand hour data, analyze the EDW platform, generate a plurality of suggested actions, automatically select one of the suggested actions, and dynamically apply the selected suggested action.

In some embodiments, the data quality management logic is further configured to send a notification in response to the dynamically applied selected suggested action.

In some embodiments, the suggested action is associated with computing power.

In some embodiments, the computing power is related to the EDW.

In some embodiments, the suggested action is to increase the overall available computing power of the EDW.

In some embodiments, the monitoring of the EDW platform includes at least monitoring the queries associated with the EDW.

In some embodiments, the monitoring further includes determining a delay time associated with the queries.

In some embodiments, data quality management logic is further configured to produce a plurality of metrics based on the monitoring of the EDW platform.

In some embodiments, the metrics are based on the delay time and the produced peak demand hour data.

In some embodiments, the analysis of the EDW platform is at least based on the produced plurality of metrics.

In some embodiments, a method of dynamically monitoring EDW platforms includes selecting, via a quality management logic, a target enterprise data warehouse (EDW) platform, monitoring the EDW platform, producing peak demand hour data, analyzing the EDW platform, generating a plurality of suggested actions, automatically selecting one of the suggested actions, and dynamically applying the selected suggested action.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 17 is a conceptual graphical user interface for metadata monitoring in accordance with various embodiments of the disclosure.

Figure 1:
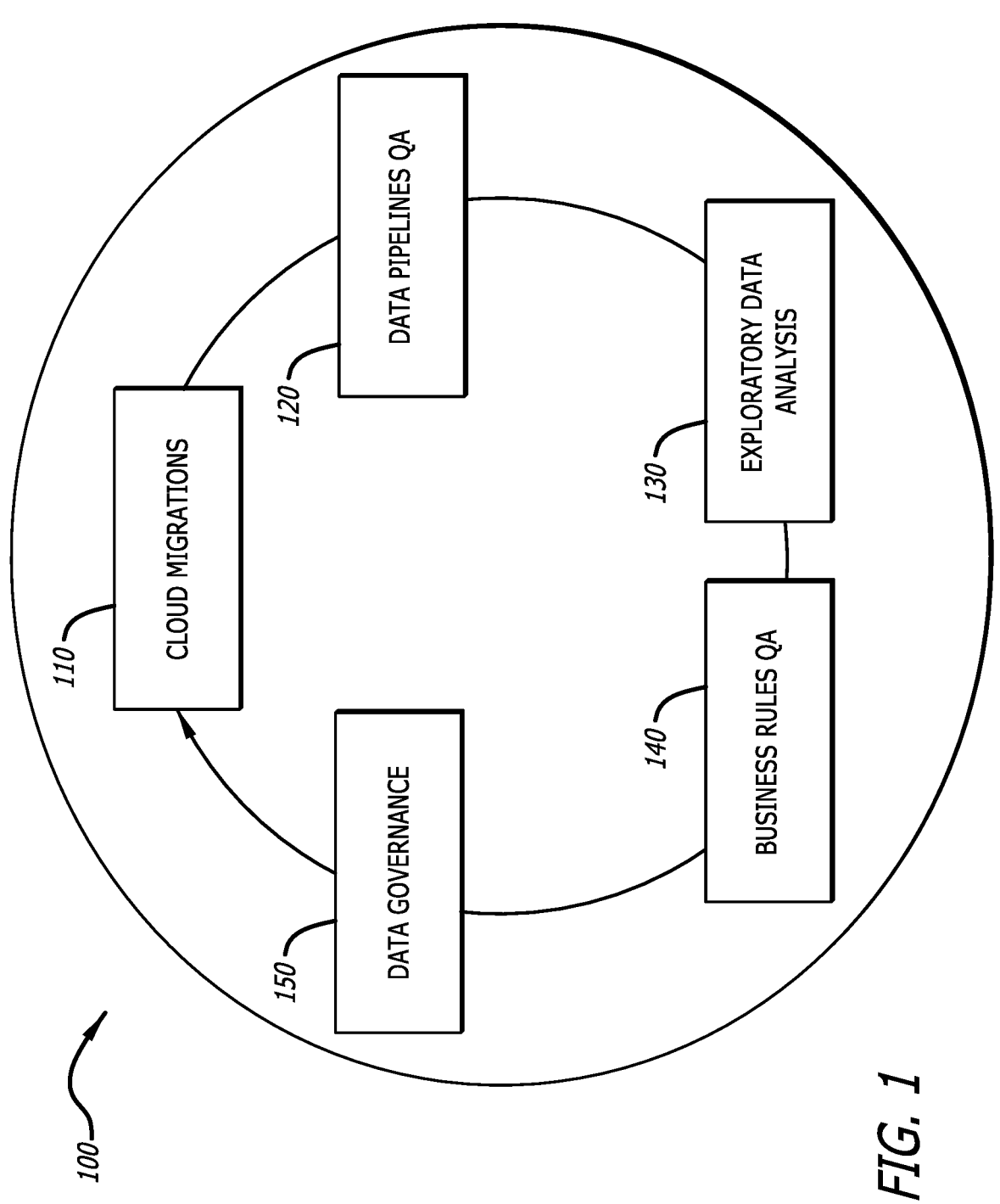
FIG. 1 is a conceptual diagram of a data processing life cycle, in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

Embodiments described herein can be utilized as an advanced software as a service (SaaS) platform that can help companies meet the challenges related to trust, governance, quality, data accuracy, and transparency. In many embodiments, this can allow for ensuring data teams have full visibility of their enterprise data warehouse data pipelines. Various embodiments can integrate seamlessly over or through a cloud-based service and/or legacy data platforms to greatly improve the visibility of an enterprise data warehouse via monitoring data quality and accuracy, tracking metadata changes across systems, and generating metadata exceptions for subsequent review and action.

Data quality management can allow for writing custom scripts as test cases to validate data pipelines and business rule validations. One or more cloud-native connectors can simplify seamless integration with various cloud data platforms like Snowflake, by Snowflake, Inc.; Azure, by Microsoft; and AWS, by Amazon. Native integration with cloud data platforms can enable for automation of processes required for the streamlined delivery of consistently high-quality data, such as, but not limited to, discovery, profiling, testing, and monitoring.

In more embodiments, personalized notifications can help an administrator act responsively in cases of exceptions to avoid pipeline failures and data quality issues. The embodiments described herein can utilize one or more data profiling capabilities to discover data quality issues and provide data distribution information for your datasets. These embodiments can provide actionable data intelligence for data privacy, security, and governance through data classification. In some embodiments, automation can be configured to provide data quality checks, metadata monitoring, profiling, and classification through a scheduler for flexibility to run anytime and every time. In still more embodiments, a flexible and scalable serverless architecture containing multiple microservices running independently that can scale up or down dynamically based on demand may be utilized.

Data warehouses are comprehensive data storage and management systems that play a fundamental role in modern businesses' data management strategies. These repositories serve as centralized hubs where organizations can collect, organize, and integrate data from various sources across the enterprise. By consolidating data from disparate systems such as transactional databases, customer relationship management (CRM) platforms, enterprise resource planning (ERP) systems, and other sources, data warehouses provide a unified view of organizational data.

One of the characteristics of data warehouses is their ability to structure and organize data in a way that facilitates analysis and decision-making. They typically employ a dimensional modeling approach, which may involve organizing data into dimensions and facts. Dimensions represent the descriptive attributes of data, such as time, geography, product, or customer, while facts are the measurable metrics or events being analyzed, such as sales revenue, inventory levels, or website traffic. This dimensional model allows users to easily navigate and query data to extract valuable insights.

Moreover, in certain embodiments, data warehouses are designed to support analytical processing and reporting tasks. They store historical data over time, enabling users to analyze trends, patterns, and historical performance. This historical perspective is useful for strategic decision-making, as it provides context and insight into past events and trends. Additionally, in more embodiments, data warehouses support complex queries, ad-hoc analysis, and data mining techniques, empowering organizations to uncover hidden patterns, correlations, and relationships within their data.

Furthermore, in some embodiments, data warehouses are subject-oriented, meaning they are tailored to specific areas or domains of interest within the organization. For example, a data warehouse might focus on sales, marketing, finance, or operations. This subject-oriented approach allows organizations to customize their data warehouses to meet the unique analytical needs of different business functions or departments. By providing a dedicated environment for data analysis and reporting, data warehouses empower users across the organization to make data-driven decisions and gain actionable insights.

Data warehouses serve as strategic assets for organizations seeking to harness the power of their data for informed decision-making and business growth. By centralizing and structuring data from disparate sources, supporting analytical processing and reporting tasks, and offering subject-oriented perspectives, data warehouses enable organizations to unlock the full potential of their data assets and drive competitive advantage in today's data-driven business landscape.

Data pipelines are useful components of modern data architecture, facilitating the efficient and automated movement of data from various sources to destinations where it can be stored, processed, and analyzed. A data pipeline typically consists of a series of interconnected steps or stages through which data flows, undergoing transformations and manipulations as it progresses along the pipeline.

At its core, a data pipeline is designed to address the challenge of data integration by enabling organizations to ingest data from diverse sources, such as databases, applications, APIs, streaming platforms, and IoT devices, and deliver it to target systems, such as data warehouses, data lakes, or analytics platforms. By automating the data ingestion process and providing mechanisms for data transformation and enrichment, data pipelines streamline the movement of data across the enterprise, ensuring that it is available and accessible for analysis and decision-making purposes.

Data pipelines typically involve several stages, including data extraction, transformation, loading (ETL), or ingestion (ELT), depending on the specific requirements of the use case and the technologies involved. In the extraction stage, data is retrieved from the source systems using various methods, such as batch processing, change data capture (CDC), or real-time streaming. Once extracted, the data may undergo transformations to clean, enrich, or standardize it, ensuring consistency and quality before it is loaded into the target system.

The loading or ingestion stage may involve delivering the transformed data to its destination, where it can be stored, processed, and analyzed. This stage often may involve considerations such as data partitioning, schema evolution, and data governance to ensure that the data is structured and organized appropriately for downstream consumption. Depending on the requirements of the use case, data pipelines may support batch processing, streaming processing, or a combination of both to accommodate different latency and throughput requirements.

Data pipelines play a role in enabling organizations to harness the value of their data assets by providing a reliable and scalable mechanism for data integration and processing. By automating the movement of data across the enterprise and facilitating seamless connectivity between disparate systems, data pipelines empower organizations to derive actionable insights, make informed decisions, and drive innovation in today's data-driven business landscape.

Data quality management is a systematic approach to ensuring that data used within an organization is accurate, consistent, reliable, and relevant for its intended purpose. It may involve a series of processes, techniques, and technologies aimed at improving and maintaining the quality of data throughout its lifecycle, from acquisition and entry to storage, processing, and analysis. At its core, data quality management encompasses several components. First and foremost is data profiling, which may involve assessing the quality and characteristics of data to identify any anomalies, inconsistencies, or errors. This process helps organizations gain insights into the structure, completeness, and accuracy of their data, enabling them to identify areas for improvement and prioritize data quality initiatives.

Once data has been profiled, organizations can implement data cleansing or data scrubbing techniques to address any identified issues and errors. Data cleansing may involve correcting errors, removing duplicates, standardizing formats, and validating data against predefined rules or criteria. By cleansing data, organizations can ensure that it is accurate, consistent, and reliable for downstream use in analytics, reporting, and decision-making.

Another important aspect of data quality management is data governance, which may involve defining policies, procedures, and standards for managing data quality throughout the organization. Data governance establishes roles, responsibilities, and accountability for data quality, ensuring that stakeholders are aware of their obligations and empowered to enforce best practices. It also may involve implementing controls and mechanisms to monitor and enforce compliance with data quality standards, such as data validation checks, data profiling tools, and data quality metrics.

Furthermore, in some embodiments, data quality management may involve ongoing monitoring and measurement of data quality to track performance, identify trends, and address emerging issues proactively. This may involve implementing data quality dashboards, reports, and metrics to provide stakeholders with visibility into the state of data quality across the organization. By monitoring data quality continuously, organizations can detect and resolve issues in a timely manner, preventing them from impacting business operations or decision-making processes.

Data quality management is useful for organizations seeking to leverage their data assets effectively and derive actionable insights from their data. By implementing robust processes, tools, and governance frameworks for managing data quality, organizations can ensure that their data is accurate, consistent, and reliable, enabling them to make informed decisions, drive innovation, and achieve their business objectives in today's data-driven world.

Metadata can refer to descriptive information that provides insights into the characteristics, structure, and context of the data. Metadata acts as a valuable resource for understanding and managing datasets effectively, as it encapsulates details such as the data's source, format, quality, creation date, and ownership. Usefully, metadata can serve as a data about data that facilitates data discovery, interpretation, and usage. For instance, metadata might include field names and descriptions in a database, column types and constraints in a spreadsheet, or tags and annotations in a document. This information not only helps users understand the content and purpose of the dataset but also enables them to assess its reliability, relevance, and suitability for specific analytical or operational tasks. Additionally, in more embodiments, metadata plays a role in facilitating data integration, sharing, and governance efforts by providing a standardized framework for organizing and managing data assets across different systems, applications, and stakeholders. metadata enhances the usability, accessibility, and trustworthiness of datasets, empowering organizations to derive meaningful insights and make informed decisions based on their data resources.

Metadata exceptions refer to instances where the metadata associated with a dataset does not conform to predefined standards or expectations. Metadata, which provides descriptive information about data, such as its structure, format, source, and meaning, is useful for understanding and managing data effectively. However, metadata exceptions can occur when there are discrepancies, inconsistencies, or errors in the metadata, which can lead to misunderstandings, misinterpretations, and inaccuracies in data usage and analysis. These exceptions may arise due to various reasons, including incomplete or outdated metadata, data entry errors, changes in data schemas or structures, or mismatches between different systems or repositories. Addressing metadata exceptions typically may involve identifying and resolving discrepancies through data profiling, validation, and cleansing processes, as well as implementing robust metadata management and governance practices to ensure the accuracy, consistency, and reliability of metadata across the organization. By addressing metadata exceptions effectively, organizations can enhance the quality and usability of their data assets, enabling stakeholders to make informed decisions and derive valuable insights from their data.

Data accuracy monitoring may involve systematic processes and procedures aimed at assessing and ensuring the precision and correctness of data within an organization's systems and repositories. It encompasses various activities designed to detect, measure, and address inaccuracies, errors, and inconsistencies in data. One aspect of data accuracy monitoring may involve establishing benchmarks or standards against which the accuracy of data can be evaluated. This may involve defining acceptable error rates, tolerance levels, or quality metrics for different types of data within the organization. These benchmarks serve as a reference point for assessing the accuracy of data and determining whether it meets predefined criteria.

Another component of data accuracy monitoring is implementing monitoring mechanisms and tools to continuously track the quality and accuracy of data over time. This may involve automated data validation checks, data profiling techniques, or data quality dashboards that provide real-time insights into the accuracy of data. By monitoring data accuracy on an ongoing basis, organizations can detect issues and anomalies early, allowing them to take corrective action promptly.

Furthermore, in some embodiments, data accuracy monitoring often may involve conducting regular audits or reviews of data to identify and address inaccuracies, inconsistencies, or errors. This may include manual inspection of data samples, comparison of data against external sources or benchmarks, or validation of data against predefined business rules or standards. Audits help ensure that data accuracy is maintained and provide opportunities for improvement in data management processes.

Additionally, in more embodiments, data accuracy monitoring may involve implementing data governance practices and controls to enforce data quality standards and best practices across the organization. This includes defining roles, responsibilities, and accountability for data accuracy, establishing policies and procedures for data validation and cleansing, and implementing mechanisms for data quality monitoring and reporting. Data accuracy monitoring is useful for organizations seeking to maintain the integrity and reliability of their data assets. By implementing systematic processes, tools, and controls for monitoring data accuracy, organizations can ensure that their data remains trustworthy, enabling them to make informed decisions and derive value from their data resources.

A cloud-native connector represents a vital component within the landscape of cloud computing, serving as a bridge that facilitates seamless integration between various cloud-based applications, services, or platforms. Engineered to capitalize on the unique capabilities and architectures offered by cloud environments, these connectors play a pivotal role in enabling efficient communication and data exchange among different cloud-based systems. Primarily, a cloud-native connector can serve diverse purposes tailored to the specific requirements of integration scenarios within cloud ecosystems. One of its fundamental functionalities lies in data integration, where these connectors enable the smooth transfer of data between cloud-based applications or between cloud and on-premises systems. Supporting various data integration patterns such as batch processing, real-time streaming, or event-driven synchronization, they provide flexibility in handling data exchange requirements across different use cases.

Moreover, in certain embodiments, cloud-native connectors are adept at API integration, empowering applications to communicate and exchange data programmatically with cloud-based APIs (Application Programming Interfaces). By offering pre-built adapters or wrappers for popular cloud services and APIs, these connectors simplify the process of integrating with third-party applications and services, thereby reducing development efforts, and accelerating time-to-market for new initiatives. Another role of cloud-native connectors lies in enabling event-driven architectures, where applications can respond to events and triggers in real-time. By providing capabilities for event sourcing, event streaming, or event-driven messaging, these connectors facilitate asynchronous communication between applications, allowing them to scale dynamically based on demand and react promptly to changing conditions.

Furthermore, in some embodiments, cloud-native connectors may serve as protocol bridges, facilitating seamless communication between systems that use different data formats, protocols, or communication standards. This capability is particularly valuable in heterogeneous cloud environments where interoperability between diverse technologies and platforms is useful for achieving seamless integration and collaboration. Lastly, security and compliance are paramount considerations for cloud-native connectors, which often incorporate robust security features and compliance controls to safeguard data exchanged between cloud-based systems. This may include encryption, authentication, access control, and audit logging mechanisms to ensure that data remains protected and compliant with regulatory requirements throughout the integration process.

Cloud-native connectors are indispensable components in modern cloud environments, enabling organizations to build and maintain integrated ecosystems where applications, services, and data can communicate and collaborate effectively. By harnessing the capabilities of cloud platforms and architectures, these connectors streamline integration efforts, reduce complexity, and empower organizations to leverage the full potential of cloud computing for their business needs.

Data quality management encompasses a multitude of challenges, spanning trust, governance, quality, data accuracy, and transparency. Trust is foundational in data quality management, as stakeholders often have confidence in the accuracy and reliability of data to make informed decisions. However, achieving trust can be challenging due to various factors such as data inaccuracies, inconsistencies, and incomplete information. Lack of trust can stem from concerns about data provenance, data lineage, and data quality control processes. Without trust, stakeholders may hesitate to rely on data-driven insights, leading to missed opportunities and diminished confidence in organizational decision-making.

Governance is another aspect of data quality management, involving the establishment of policies, processes, and standards to ensure the proper management, usage, and protection of data assets. Effective data governance may include clear roles, responsibilities, and accountability for data quality, as well as mechanisms for enforcing compliance with policies and regulations. However, governance challenges often arise due to organizational silos, conflicting priorities, and inadequate resources or expertise. Without robust governance frameworks in place, organizations may struggle to maintain data integrity, security, and privacy, leading to increased risks and regulatory non-compliance.

Quality is at the heart of data quality management, encompassing the completeness, accuracy, consistency, timeliness, and relevance of data for its intended use. However, ensuring data quality is a complex and multifaceted endeavor, as data may originate from diverse sources, formats, and systems, each with its own unique characteristics and challenges. Common quality issues include data duplication, data entry errors, outdated information, and data inconsistency across different systems. Addressing these issues may include comprehensive data profiling, cleansing, and validation processes, as well as ongoing monitoring and measurement of data quality metrics.

Data accuracy is a component of data quality management, representing the degree to which data reflects the true values or attributes of the entities it represents. Achieving data accuracy is challenging due to factors such as data entry errors, data processing errors, and data integration issues. These inaccuracies can have significant consequences, leading to incorrect analyses, flawed decisions, and damaged reputation. To improve data accuracy, organizations often implement rigorous data validation checks, data cleansing techniques, and data quality controls throughout the data lifecycle.

Transparency is useful for fostering trust and accountability in data quality management, as stakeholders often have visibility into the processes, methodologies, and outcomes of data quality initiatives. However, achieving transparency can be challenging due to factors such as complex data architectures, proprietary data formats, and limited access to metadata and lineage information. Without transparency, stakeholders may lack confidence in the reliability and integrity of data quality efforts, hindering collaboration, decision-making, and innovation.

Addressing the challenges related to trust, governance, quality, data accuracy, and transparency in data quality management may include a holistic approach that encompasses people, processes, and technology. By establishing robust governance frameworks, implementing effective data quality controls, and fostering a culture of transparency and accountability, organizations can enhance trust in data, mitigate risks, and derive greater value from their data assets.

Data quality checks, metadata monitoring, profiling, and classification encompass a set of useful activities and techniques employed in data management and quality assurance processes to ensure that data meets predefined standards and requirements. Data quality checks can involve the systematic examination of data to identify inaccuracies, inconsistencies, or anomalies that may compromise its quality. These checks may include validation against predefined rules or criteria, such as data integrity constraints, format requirements, or business logic rules. Data quality checks help organizations identify and address issues such as missing values, outliers, duplicates, and incorrect data entries, ensuring that data is accurate, complete, and reliable for its intended use.

Metadata monitoring may involve tracking and managing metadata, which provides descriptive information about data, such as its structure, format, source, and meaning. Metadata monitoring may involve processes and tools for capturing, storing, and updating metadata throughout the data lifecycle. This includes monitoring changes to metadata, tracking data lineage and provenance, and ensuring that metadata remains accurate, up-to-date, and consistent across different systems and repositories. Effective metadata monitoring helps organizations maintain visibility into their data assets and facilitates data discovery, integration, and governance efforts.

Data profiling is a technique used to analyze and assess the quality and characteristics of data. It may involve examining data to understand its structure, content, and distribution, as well as identifying patterns, relationships, and anomalies. Data profiling helps organizations gain insights into the completeness, accuracy, consistency, and relevance of their data, enabling them to identify quality issues and prioritize data quality improvement efforts. Common data profiling activities include assessing data completeness, identifying data anomalies, and discovering data patterns or trends.

Data classification may involve categorizing data based on its sensitivity, importance, or other attributes to determine appropriate handling and protection measures. Data classification helps organizations classify data according to regulatory requirements, security policies, or business priorities, ensuring that sensitive or critical data receives the necessary protection and controls. This may involve assigning labels or tags to data based on predefined classification criteria, such as data type, confidentiality level, or compliance requirements.

Data quality checks, metadata monitoring, profiling, and classification are useful components of effective data management and quality assurance practices. By implementing these activities and techniques, organizations can ensure that their data remains accurate, reliable, and secure, enabling them to make informed decisions and derive value from their data assets.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual diagram of a data processing life cycle 100, in accordance with various embodiments of the disclosure is shown. Cloud migrations 110 in terms of networking refer to the process of transitioning network infrastructure, services, and applications from on-premises environments to cloud-based platforms. This migration may involve reconfiguring and optimizing network architecture, protocols, and configurations to align with the requirements and capabilities of cloud environments.

Cloud migrations 110 typically involve several steps, including assessing current network infrastructure, designing cloud-ready network architecture, provisioning network resources in the cloud, migrating data and applications, and testing and validating network connectivity and performance. By migrating to the cloud, organizations can leverage the scalability, flexibility, and cost-efficiency of cloud-based networking services, such as virtual networks, load balancers, and content delivery networks (CDNs). Additionally, in more embodiments, cloud migrations 110 can enable organizations to take advantage of advanced networking features and capabilities offered by cloud providers, such as global reach, high availability, and security enhancements. cloud migrations 110 in terms of networking can enable organizations to modernize their network infrastructure, improve agility and scalability, and reduce operational overhead, ultimately driving innovation and competitiveness in today's digital landscape.

Quality assurance in data pipelines 120 may involve a comprehensive set of practices aimed at ensuring the reliability, accuracy, and consistency of data as it moves through various stages of the pipeline. One aspect of quality assurance is data validation, which may involve verifying the integrity and correctness of data at each step of the pipeline. This may include validating data formats, ensuring data completeness, checking for outliers or anomalies, and verifying data integrity against predefined rules or constraints. Additionally, in more embodiments, data profiling techniques can be employed to analyze and assess the quality and characteristics of data, such as its distribution, patterns, and relationships. By profiling data, organizations can gain insights into potential quality issues and identify areas for improvement in data processing and transformation.

Another important aspect of Quality assurance in data pipelines 120 is error handling and exception management. This may involve implementing mechanisms to detect, log, and handle errors or exceptions that can occur during data processing. By capturing and logging errors, organizations can track the performance and reliability of data pipelines and take corrective action as needed to ensure data quality and integrity. Moreover, in certain embodiments, data lineage and metadata management are useful components of quality assurance, as they provide visibility into the origin, transformation, and usage of data throughout the pipeline. By tracking data lineage and metadata, organizations can ensure transparency and accountability in data processing and governance, facilitating compliance with regulatory requirements and best practices.

Furthermore, in some embodiments, Quality assurance in data pipelines 120 may involve performance monitoring and optimization to ensure that data processing meets predefined service level agreements (SLAs) and performance targets. This may include monitoring data throughput, latency, and resource utilization, as well as identifying bottlenecks or areas for optimization in data processing workflows. By continuously monitoring and optimizing performance, organizations can enhance the efficiency and reliability of data pipelines, enabling timely and accurate delivery of data to downstream systems and applications. Quality assurance in data pipelines 120 is useful for ensuring the integrity, reliability, and usability of data for analytics, reporting, and decision-making purposes, ultimately driving business success and innovation.

Exploratory data analysis 130 (EDA) is a fundamental approach in data analysis that focuses on understanding the characteristics, patterns, and relationships within a dataset. It may involve a series of techniques and methods aimed at gaining insights into the underlying structure and distribution of data, without making any assumptions or hypotheses about the data. EDA typically starts with visualizing the data through various graphical and statistical techniques, such as histograms, scatter plots, box plots, and summary statistics. These visualizations help analysts identify trends, outliers, anomalies, and patterns in the data, enabling them to formulate hypotheses and ask relevant questions for further investigation.

Moreover, in certain embodiments, exploratory data analysis 130 may involve exploring relationships and dependencies between variables in the dataset. This may include calculating correlations, cross-tabulations, or contingency tables to examine associations between different variables and identify potential cause-and-effect relationships. By exploring relationships between variables, analysts can uncover hidden patterns and insights that may not be immediately apparent from individual data points.

Additionally, in more embodiments, exploratory data analysis 130 often may involve data transformation and feature engineering techniques to prepare the data for further analysis. This may include cleaning and preprocessing the data to handle missing values, outliers, or inconsistencies, as well as transforming variables or creating new features to better represent the underlying relationships in the data. These preprocessing steps are useful for ensuring the quality and integrity of the data and improving the effectiveness of subsequent analysis.

Exploratory data analysis 130 can serve as a first step in the data analysis process, providing analysts with a deeper understanding of the data and guiding subsequent analysis and modeling efforts. By exploring the characteristics, patterns, and relationships within a dataset, analysts can uncover valuable insights, generate hypotheses, and make informed decisions to drive business outcomes and innovation.

Quality assurance for business rules 140 in terms of data pipeline management may involve ensuring that the rules governing data processing and transformation within the pipeline are accurate, reliable, and aligned with business requirements. This process begins with the identification and documentation of business rules that dictate how data should be processed, validated, transformed, and routed throughout the pipeline. Quality assurance efforts focus on several areas to ensure the effectiveness of these rules. Firstly, in many embodiments, validation and verification techniques are employed to confirm that the business rules accurately capture the business logic and requirements. This may involve reviewing and analyzing individual rules, as well as assessing their interactions and dependencies within the context of the data pipeline.

Additionally, in more embodiments, testing and validation processes are useful to verify that the business rules behave as intended and produce the desired outcomes when applied to real-world data. This includes conducting unit tests, integration tests, and end-to-end tests to validate rule logic, data dependencies, and rule execution paths within the data pipeline. Regression testing techniques are also used to ensure that changes to business rules do not introduce unintended consequences or break existing functionality.

Furthermore, in some embodiments, documentation and governance mechanisms play a role in quality assurance for business rules 140 in data pipeline management. Organizations often maintain accurate and up-to-date documentation of business rules, including their definitions, conditions, and actions. Clear documentation helps ensure that stakeholders have a common understanding of the business rules and can effectively apply them in practice. Governance processes, such as change management procedures and version control mechanisms, are useful for managing changes to business rules and ensuring compliance with regulatory requirements and organizational policies.

Quality assurance for business rules 140 in data pipeline management may involve a combination of validation, testing, documentation, and governance processes aimed at ensuring that the rules governing data processing and transformation are accurate, reliable, and aligned with business objectives. By implementing robust quality assurance practices, organizations can enhance the integrity, efficiency, and effectiveness of their data pipelines, ultimately driving better decision-making and business outcomes.

Data governance 150 in terms of data pipelines can refer to the establishment of policies, processes, and controls to ensure the quality, integrity, security, and compliance of data as it flows through the pipeline. It may involve defining standards, guidelines, and best practices for managing data assets, as well as assigning roles, responsibilities, and accountability for data management within the organization. Data governance 150 encompasses various aspects of data management, including data quality, metadata management, data security, privacy, and regulatory compliance.

Data governance 150 plays a role in ensuring that the data processed and transformed within the pipeline meets predefined standards and requirements. This may involve implementing mechanisms for data validation, cleansing, and enrichment to maintain data quality throughout the pipeline. Additionally, in more embodiments, Data governance 150 includes establishing metadata management processes to capture, store, and maintain metadata about the data as it moves through the pipeline. This metadata provides valuable insights into the lineage, provenance, and usage of data, facilitating data discovery, integration, and governance efforts.

Furthermore, in some embodiments, data governance 150 in data pipelines encompasses data security and privacy considerations to protect sensitive or confidential information from unauthorized access, disclosure, or misuse. This may involve implementing encryption, access controls, and data masking techniques to safeguard data against security threats and ensure compliance with regulatory requirements, such as GDPR, HIPAA, or CCPA. Additionally, in more embodiments, data governance 150 includes establishing data retention and disposal policies to manage the lifecycle of data and mitigate risks associated with data breaches or data misuse.

Moreover, in certain embodiments, data governance 150 in data pipelines may involve monitoring and auditing processes to track data usage, access, and changes, as well as to enforce compliance with data governance 150 policies and standards. This may include implementing logging, auditing, and reporting mechanisms to provide visibility into data pipeline activities and detect any deviations from established policies or procedures. By monitoring and auditing data pipeline activities, organizations can identify potential risks, issues, or compliance violations and take corrective action to mitigate them.

Data governance 150 in terms of data pipelines encompasses a range of activities and processes aimed at ensuring the quality, integrity, security, and compliance of data as it flows through the pipeline. By establishing robust data governance 150 practices, organizations can enhance the reliability, transparency, and trustworthiness of their data pipelines, ultimately enabling them to derive greater value from their data assets and drive better decision-making and business outcomes.

Although a specific embodiment for a data processing life cycle 100 suitable for carrying out the various steps, processes, methods, and operations described herein is discussed with respect to FIG. 1, any of a variety of systems and/or processes may be utilized in accordance with embodiments of the disclosure. For example, as those skilled in the art will recognize, the specific structure of a data processing life cycle 100 can vary depending on the specific application or deployment. The elements depicted in FIG. 1 may also be interchangeable with other elements of FIGS. 2-18 as required to realize a particularly desired embodiment.

Figure 2:
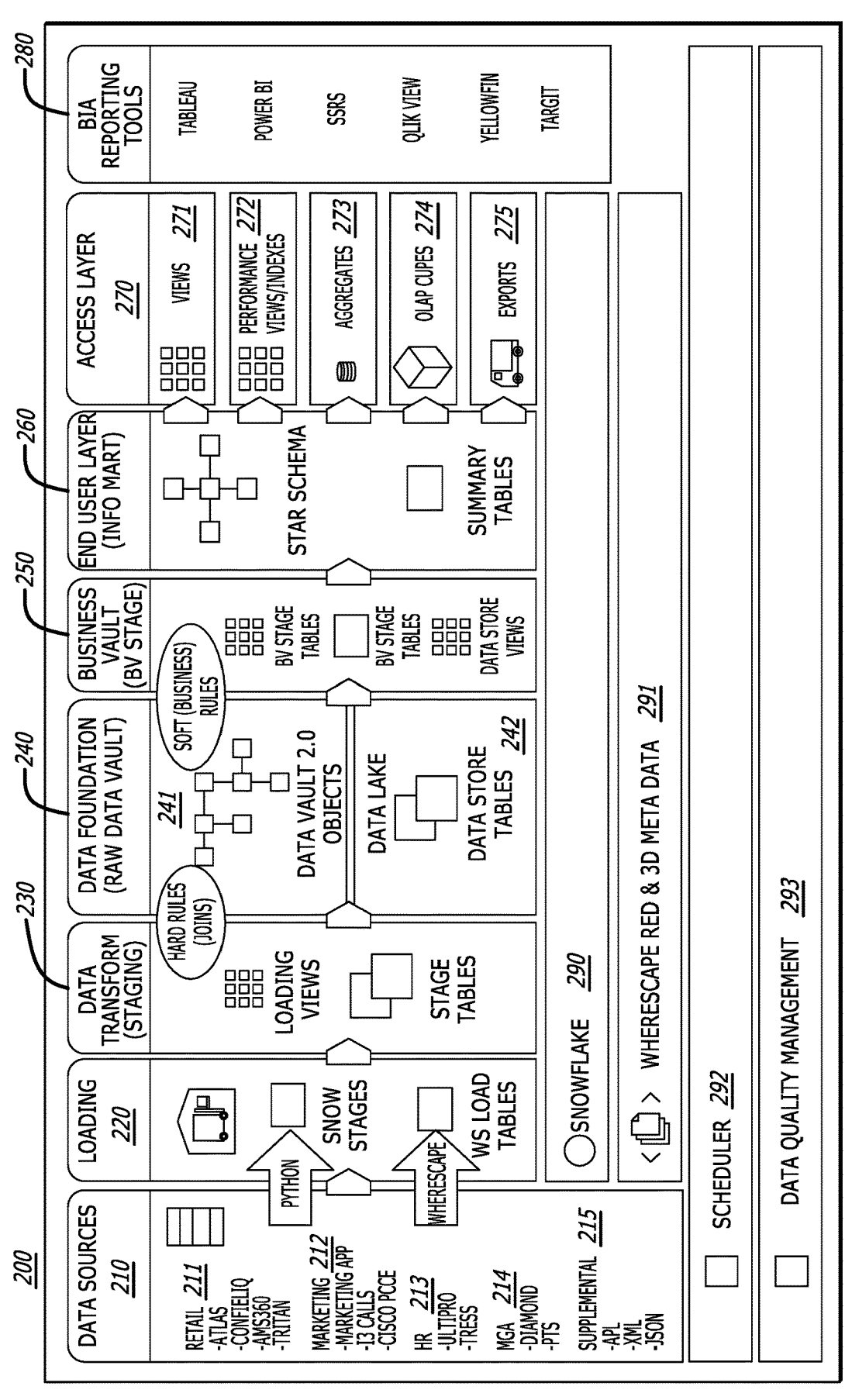
FIG. 2 is a schematic block diagram of an enterprise data warehouse, in accordance with various embodiments of the disclosure.

Referring to FIG. 2, a schematic block diagram of an enterprise data warehouse 200, in accordance with various embodiments of the disclosure is shown. Data sources 210 in the context of data pipelines refer to the various origins from which data is collected, ingested, and processed within the pipeline. These sources encompass a wide range of data repositories, systems, applications, and devices that generate or store data relevant to an organization's operations. Common data sources 210 include transactional databases, such as relational databases (e.g., MySQL, PostgreSQL) or NoSQL databases (e.g., MongoDB, Cassandra), where structured data is stored and managed. Additionally, in more embodiments, organizations may collect data from enterprise applications and systems, such as customer relationship management (CRM) systems, enterprise resource planning (ERP) systems, or supply chain management (SCM) systems, which contain valuable information about business processes, transactions, and interactions.

Furthermore, in some embodiments, data sources 210 may include external data feeds or streams from third-party sources, such as social media platforms, web services, or IoT devices, which provide real-time or streaming data for analysis. These external data sources 210 can enrich internal datasets and provide valuable insights into market trends, customer behavior, or industry developments. Additionally, in more embodiments, organizations may leverage data from public sources, such as government databases, open data repositories, or research publications, to augment their internal datasets and enhance decision-making processes.

Moreover, in certain embodiments, data sources 210 may also encompass unstructured or semi-structured data sources 210, such as text documents, images, videos, or log files, which contain valuable information but may include specialized processing techniques. Organizations may extract, transform, and analyze data from these sources using techniques such as natural language processing (NLP), image recognition, or log parsing to derive insights and extract valuable information. Data sources 210 in data pipelines encompass a diverse array of repositories, systems, applications, and devices that provide data for analysis and processing within the pipeline. By leveraging data from these sources, organizations can gain valuable insights, make informed decisions, and drive innovation in today's data-driven business landscape.

In the realm of retail data 211 within data pipelines, various types of data contribute to comprehensive retail analytics and decision-making processes. Geographic data plays a role in understanding market dynamics and optimizing store locations. This data includes information about geographical regions, population demographics, customer density, and competitor locations. Analyzing geographic data helps retailers assess market potential, identify target customer segments, and optimize their store network for maximum profitability.

Customer data provides insights into consumer behavior, preferences, and purchasing patterns. It encompasses demographic information, purchase history, browsing behavior, and engagement metrics. By analyzing customer data, retailers can segment their customer base, personalize marketing campaigns, and tailor product offerings to meet the needs and preferences of different customer segments.

Transactional data captures information about sales transactions, including product purchases, pricing details, payment methods, and sales channels. This data is useful for monitoring sales performance, analyzing product trends, and optimizing pricing and promotional strategies. Transactional data also enables retailers to track inventory levels, manage stock replenishment, and identify opportunities for cross-selling or upselling.

Operational data includes metrics related to store operations, such as inventory management, supply chain logistics, and workforce management. This data provides insights into operational efficiency, resource allocation, and cost optimization. By analyzing operational data, retailers can identify inefficiencies, streamline processes, and improve overall operational performance.

External data sources, such as market research reports, economic indicators, weather forecasts, and social media trends, also contribute valuable insights to retail analytics. These external data sources provide context and additional layers of information that can enhance decision-making and strategy development.

Retail data 211 within data pipelines encompass a wide range of data types, including geographic data, customer data, transactional data, operational data, and external data sources. By integrating and analyzing data from these sources, retailers can gain comprehensive insights into market trends, customer behaviors, operational performance, and external factors affecting their business, enabling them to make informed decisions and drive business success.

In the realm of marketing data 212 within data pipelines, various types of data contribute to comprehensive marketing analytics and decision-making processes. One category of marketing data 212 includes marketing automation platforms or software applications. These platforms are used by organizations to manage and execute marketing campaigns across multiple channels, such as email, social media, and digital advertising. They capture data on campaign performance, audience engagement, lead generation, and conversion rates. Integrating data from marketing automation platforms into data pipelines provides insights into campaign effectiveness, audience segmentation, and customer journey analysis, enabling marketers to optimize their marketing strategies and drive better results.

Another important source of marketing data is call tracking and analytics systems. These systems capture data on inbound and outbound calls, including call duration, caller demographics, and call outcomes. They provide insights into customer inquiries, sales leads, and customer service interactions. By integrating data from call tracking systems into data pipelines, marketers can analyze call metrics, track the impact of marketing campaigns on call volume and conversion rates, and optimize call handling processes to improve customer experience and sales performance.

Additionally, in more embodiments, customer service platforms play a role in providing marketing insights. These platforms capture data on customer interactions across various channels, such as phone, email, chat, and social media. They provide insights into customer service effectiveness, agent performance, and customer satisfaction levels. Integrating data from customer service platforms into data pipelines enables marketers to analyze customer feedback, identify opportunities to improve customer experience, and tailor marketing strategies to address customer needs and preferences effectively.

Other marketing data 212 may include web analytics platforms, social media monitoring tools, and customer relationship management (CRM) systems, which provide data on website traffic, social media engagement, and customer interactions. By aggregating and analyzing data from these sources within data pipelines, marketers can gain a holistic view of their marketing efforts, understand customer behavior across different channels, and make data-driven decisions to drive business growth and success.

In the context of human resource data 213 within data pipelines, various types of systems and platforms contribute useful datasets related to workforce management, employee information, and human resource operations. One category of human resource data 213 includes human capital management (HCM) platforms or enterprise resource planning (ERP) systems. These systems centralize employee data, including personal information, employment history, compensation details, performance evaluations, and training records. They provide comprehensive insights into workforce demographics, employee engagement levels, turnover rates, and other HR metrics. By integrating data from HCM platforms or ERP systems into data pipelines, HR professionals can analyze workforce trends, identify talent gaps, and make informed decisions about recruitment, retention, and talent development strategies.

Another important source of human resource data is payroll and benefits administration systems. These systems manage payroll processing, benefits enrollment, time and attendance tracking, and compliance management. They capture data on payroll expenses, employee benefits, leave balances, and tax withholdings. Integrating data from payroll and benefits administration systems into data pipelines enables HR professionals to track labor costs, manage employee benefits programs, and ensure compliance with labor regulations. This data also supports workforce planning, budgeting, and forecasting activities, helping organizations optimize their human capital investments and align HR strategies with business objectives.

Additionally, in more embodiments, employee performance management systems provide valuable data on performance evaluations, goal tracking, and competency assessments. These systems facilitate performance reviews, feedback collection, and performance improvement planning. Integrating data from performance management systems into data pipelines enables HR professionals to evaluate employee performance, identify high-performing individuals, and address performance gaps through targeted training and development initiatives.

Other human resource data 213 may include talent acquisition systems, learning management systems, employee engagement surveys, and exit interviews. By aggregating and analyzing data from these sources within data pipelines, HR professionals can gain insights into various aspects of the employee lifecycle, make data-driven decisions, and implement strategies to attract, retain, and develop top talent, ultimately driving organizational success and competitiveness.

In the realm of data pipeline data sources within the Managing General Agent (MGA) sector, Diamond and PTS represent software platforms or systems that furnish useful datasets pertinent to insurance underwriting, policy administration, and claims management. Diamond can serve as an insurance policy administration system often utilized by MGAs for overseeing policy information, underwriting processes, and policyholder records. This platform can serve as a central repository for insurance policy data, encompassing policy particulars, coverage details, premiums, endorsements, and claims history. Integrating data from Diamond into data pipelines furnishes MGAs with insights into policy performance, underwriting profitability, and claims experience. Such data facilitates risk assessment, enables optimized underwriting decisions, and supports the monitoring of policyholder behavior to mitigate losses and enhance profitability.

Similarly, PTS signifies a claims management system or platform employed by MGAs to handle and adjudicate insurance claims. This system captures comprehensive data on claim submissions, claimant information, claims assessments, and payments. It provides valuable insights into claims frequency, severity, and loss ratios, empowering MGAs to efficiently manage claims and control costs. By integrating data from PTS into data pipelines, MGAs can analyze claims trends, detect potential instances of fraud, and refine claims processing workflows. Moreover, in certain embodiments, this data aids in predictive modeling and analytics endeavors, facilitating the prediction of claims activity and the allocation of resources for optimal efficiency.

Diamond and PTS can represent MGA data 214 within data pipelines, furnishing indispensable insights into insurance policy management and claims handling processes. Through the integration of data from these platforms into data pipelines, MGAs can refine underwriting strategies, streamline claims administration, and bolster operational effectiveness, thereby enhancing profitability and competitiveness within the insurance landscape.

In the realm of data pipeline data sources, API, XML, and JSON are commonly considered as supplemental data 215, providing additional datasets that complement primary data sources and enrich analytical capabilities. API, which stands for Application Programming Interface, allows different software systems to communicate and exchange data with each other. APIs enable data retrieval and integration from external sources such as web services, cloud platforms, or third-party applications. By accessing data through APIs, organizations can tap into a wealth of external information, including real-time market data, social media feeds, weather forecasts, financial data, and more. Integrating API data into data pipelines enhances the breadth and depth of available data, providing valuable context and insights to support decision-making and analysis.

XML (eXtensible Markup Language) and JSON (JavaScript Object Notation) are both formats commonly used for representing structured data in a human-readable format. XML and JSON data may be sourced from various sources, such as web services, data feeds, or file imports. These formats are widely used for exchanging data between different systems and platforms, making them valuable supplemental data 215 for data pipelines. XML and JSON data can contain diverse types of information, including product catalogs, customer profiles, transaction records, and more. By integrating XML and JSON data into data pipelines, organizations can extract valuable insights, perform data transformations, and combine structured data with other datasets for comprehensive analysis.

API, XML, and JSON serve as supplemental data 215 within data pipelines, providing additional datasets that complement primary data sources and enhance analytical capabilities. By integrating data from these sources into data pipelines, organizations can access a broader range of external information, enrich their datasets with valuable context, and unlock new insights to support decision-making and business intelligence efforts.

In addition to the commonly utilized supplemental data 215 like API, XML, and JSON, organizations have a plethora of other options to enrich their data pipelines and bolster analytical capabilities. Structured databases, such as SQL databases, NoSQL databases, data warehouses, or data lakes, offer a wealth of structured data stored in tables or collections, containing valuable information like customer profiles, sales transactions, inventory records, or financial data. Unstructured data sources, encompassing text documents, images, videos, audio files, and social media feeds, present another opportunity. With the aid of natural language processing (NLP), image recognition, or audio processing techniques, insights can be gleaned from this unstructured data and seamlessly integrated into data pipelines for further analysis.

Web scraping is another avenue, allowing organizations to extract data from websites and online sources using automated scripts or tools. This approach facilitates the retrieval of data from competitor websites, news articles, online forums, or social media platforms to gather market intelligence, monitor industry trends, or collect customer feedback. Furthermore, in some embodiments, the proliferation of Internet of Things (IoT) devices has given rise to IoT data, which includes sensor data like temperature readings, GPS coordinates, machine diagnostics, and environmental measurements. Integrating IoT data streams into data pipelines enables organizations to monitor equipment performance, optimize operations, and even predict maintenance needs.

External feeds and syndicated data sources provide curated datasets from third-party providers or data aggregators, covering market research reports, economic indicators, industry benchmarks, or demographic data. This kind of data integration enriches internal datasets with external context, enabling organizations to make more informed decisions. Geospatial data, on the other hand, furnishes information about geographic locations, boundaries, demographics, and environmental factors. By integrating geospatial data into data pipelines, spatial analysis, location-based targeting, or route optimization for logistics and transportation can be facilitated.

Social media platforms and online communities represent yet another avenue for data enrichment. These platforms generate vast amounts of user-generated content, including posts, comments, reviews, and discussions, which can offer invaluable insights into customer sentiment, brand perception, and market trends. Lastly, government databases and open data initiatives provide access to public datasets on a myriad of topics, including demographics, economics, health, and education. Integrating government data into data pipelines enriches datasets with authoritative information, supports regulatory compliance, and facilitates public policy analysis. Through the seamless integration of these diverse supplemental data 215, organizations can enrich their datasets, gain valuable insights, and make more informed decisions, ultimately driving business success and innovation.

Loading data 220 can refer to the process of ingesting or importing data from various sources into the data pipeline for further processing, transformation, and analysis. This step typically can occur after data has been extracted from its source systems and is ready to be moved into the data pipeline for subsequent processing stages.

Snow stages and WS Load Tables are terms that may be specific to certain data warehousing or ETL (Extract, Transform, Load) processes. Snow stages could refer to intermediate storage areas within a data warehouse where data is temporarily stored before being loaded into the final destination tables. These stages are often used to perform data validation, cleansing, and transformation tasks before loading data 220 into the main data warehouse tables.

Similarly, WS Load Tables could represent a specific set of tables or staging areas within a data warehouse environment where data is loaded before being further processed or integrated into the main data warehouse schema. These load tables may serve as landing zones for incoming data, allowing for initial processing and validation before data is integrated into the broader data model.

In the context of loading data 220 in relation to snow stages and WS Load Tables, it likely may involve the movement of data from external sources or intermediate storage areas into these staging areas within the data warehouse environment. This loading process is a step in the overall data pipeline workflow, as it sets the stage for subsequent data transformation, integration, and analysis activities. By efficiently loading data 220 into snow stages or load tables, organizations can ensure the availability of clean, validated data for driving insights and decision-making processes downstream in the data pipeline.

Data pipelines often rely on a combination of Python and WhereScape to efficiently transform data from various sources and load it into target destinations. Python, a widely used programming language in the data science and analytics domain, provides extensive libraries and tools for data manipulation, transformation, and integration. With libraries like Pandas, NumPy, and requests, Python facilitates data extraction by connecting to source systems, querying data, and retrieving datasets in a structured format. Once data is extracted, Python scripts can handle data transformation tasks such as cleaning, filtering, aggregating, and enriching datasets. These transformation processes are useful for preparing the data for analysis and decision-making.

Moreover, in certain embodiments, Python offers flexibility in integrating data from different sources and performing complex join operations to combine datasets. This versatility makes Python an ideal choice for data engineers and analysts working on diverse data integration projects. However, managing the end-to-end lifecycle of data pipelines, including code generation, metadata management, scheduling, and orchestration, can be challenging. This is where WhereScape comes into play. WhereScape is a data automation platform that complements Python by automating various aspects of the data pipeline development and management process.

WhereScape simplifies the creation of ETL (Extract, Transform, Load) workflows by automating the generation of SQL code for data loading tasks. It also provides capabilities for metadata management, version control, and scheduling, enabling organizations to streamline their data pipeline workflows. By integrating Python scripts with WhereScape, organizations can leverage the strengths of both technologies to build robust, scalable, and automated data pipelines. Python handles data transformation and integration tasks, while WhereScape orchestrates the loading of data into target destinations, such as data warehouses, data marts, or analytical databases.

Furthermore, in some embodiments, Python scripts can be integrated with WhereScape to support incremental updates or delta processing, where only new or modified data is processed and loaded into target destinations. This ensures that data pipelines remain efficient and up-to-date, even as data volumes and sources change over time. the combination of Python and WhereScape empowers organizations to accelerate their data integration initiatives, derive valuable insights from their data assets, and make informed decisions to drive business success.

Data transform 230 (staging) can refer to the process of transforming raw or source data into a format suitable for loading into staging tables or loading views. This transformation step can occur after data has been extracted from source systems and is often performed in staging areas within the data pipeline architecture. Loading views and stage tables are components of the staging area where transformed data is temporarily stored before being loaded into the final destination tables or data warehouse. Loading views are virtual representations of data that may involve joins, aggregations, or other transformations applied to the source data. These views provide a logical layer for querying and accessing transformed data without physically storing it in tables.

On the other hand, stage tables are physical tables within the staging area where transformed data is stored temporarily during the data pipeline process. These tables typically mirror the structure of the final destination tables but may contain additional columns or data transformations to facilitate data loading and processing. In the context of data transform 230(staging) in relation to loading views and stage tables, the transformation process may involve applying data cleansing, validation, normalization, and enrichment operations to prepare the raw data for loading into the staging area. This may include tasks such as data type conversion, error handling, duplicate removal, and data standardization to ensure data quality and consistency.

Once the data has been transformed and loaded into the staging area, it is ready for further processing or loading into the final destination tables or data warehouse. This may involve additional transformations, aggregations, or business logic applied to the staged data before it is loaded into the target tables for analysis, reporting, or other downstream applications. Data transform 230(staging) plays a role in the data pipeline process by preparing raw data for loading into staging areas, where it can be further processed or loaded into final destination tables for analysis and decision-making purposes. By transforming data in staging, organizations can ensure data quality, consistency, and relevance before it is used for business insights and reporting.

Data foundation (raw data vault) can refer to the initial layer or staging area where raw data is ingested, stored, and organized before further processing. This raw data vault can serve as the foundation for the data pipeline, housing the original source data in its native format without any transformation or manipulation. Data vault 2.0 objects 241 are a modeling methodology used to structure and organize data within the data vault architecture. These objects include hubs, links, and satellites, which represent core entities, relationships, and attributes in the data model. Hubs capture unique business keys or identifiers, links model relationships between entities, and satellites store descriptive attributes and historical changes. Data lakes 242 are centralized repositories that store vast amounts of structured, semi-structured, and unstructured data at scale. Data lakes are designed to accommodate diverse data types and formats, making them ideal for storing raw or unprocessed data from various sources. Data lakes provide flexibility and scalability for storing large volumes of data, enabling organizations to perform exploratory analysis, data discovery, and advanced analytics.

Data store tables represent structured tables or datasets within the data warehouse or data lake environment where transformed or curated data is stored for analysis, reporting, or other downstream applications. These tables may contain aggregated, cleansed, or enriched data derived from the raw data vault or other staging areas within the data pipeline. In the context of data foundation (raw data vault) in relation to data vault 2.0 objects, data lakes, and data store tables, the raw data vault can serve as the initial landing zone for ingesting and storing raw data from source systems. This raw data is then modeled and organized using data vault 2.0 principles, such as hubs, links, and satellites, to create a scalable and flexible data architecture.

From the raw data vault, data may be transformed, curated, or loaded into data lakes for further exploration and analysis. Data lakes provide a centralized repository for storing diverse data types and formats, enabling data scientists, analysts, and other stakeholders to perform ad-hoc queries, data discovery, and machine learning experiments. Additionally, in more embodiments, curated or transformed data from the raw data vault may be loaded into data store tables within the data warehouse or data lake environment. These tables contain structured datasets optimized for analysis, reporting, or other downstream applications, providing a reliable and consistent source of information for decision-making and business intelligence. The data foundation (raw data vault) can serve as the starting point in the data pipeline process, housing raw data before it is modeled, transformed, and loaded into data lakes or data store tables for analysis and consumption. By establishing a solid foundation for data storage and organization, organizations can ensure the reliability, scalability, and usability of their data assets for driving business insights and innovation.

Hard rules, particularly joins, play a pivotal role in the seamless integration of data between data transforms and data foundations 240 within a data pipeline architecture. These hard rules ensure that relationships between different datasets are enforced consistently, maintaining data integrity, accuracy, and coherence throughout the pipeline process. The utilization of joins between data transforms and data foundations 240 encompasses several functions, enhancing the overall efficiency and effectiveness of the data pipeline.

Firstly, in many embodiments, joins are instrumental in data integration during the transformation stage. They enable the amalgamation of data from disparate sources or tables within data transforms, based on common keys or attributes. This integration process allows for the consolidation of diverse datasets into a unified, comprehensive dataset that forms the foundation for subsequent analysis and processing. By seamlessly combining data from multiple sources through joins, organizations can create a cohesive dataset that facilitates meaningful insights and decision-making.

Moreover, in certain embodiments, joins are useful for data cleansing and enrichment efforts during the transformation process. By joining raw data with reference data or lookup tables, organizations can address data quality issues, populate missing values, and append additional attributes to the dataset. For instance, joining customer data with a reference table containing standardized addresses can rectify formatting inconsistencies and enhance the accuracy and completeness of the data. This cleansing and enrichment process ensures that the data remains reliable and consistent as it progresses through the pipeline.

Additionally, in more embodiments, joins serve as a mechanism for data validation by enforcing predefined rules or criteria. During the transformation stage, data can be joined with validation rules or business logic to identify discrepancies, anomalies, or outliers. For example, joining transaction data with a list of authorized customers can help detect unauthorized transactions or fraudulent activities. By applying validation rules through joins, organizations can ensure data quality and compliance with regulatory requirements.

Furthermore, in some embodiments, joins play a role in establishing relationships between different entities or tables within the data foundation. These joins define the structure and linkage of data within the data model, laying the groundwork for subsequent analysis and reporting. By enforcing relationships through joins, organizations can maintain data consistency and coherence across the entire data pipeline, facilitating meaningful insights and decision-making.

The effective utilization of hard rules, particularly joins, between data transforms and data foundations 240 is paramount for ensuring the integrity, accuracy, and usability of data within a data pipeline. By leveraging joins effectively, organizations can enhance data quality, consistency, and traceability throughout the pipeline lifecycle, ultimately driving better insights and decision-making.

Business vaults 250 (BV) represent a layer within the data architecture that focuses on capturing and preserving the history of business events and entities in a standardized and consistent manner. Business vaults 250 serve as a bridge between the raw data ingested into the pipeline and the refined data ready for analysis and reporting. The BV layer is designed to store business-centric views of data, providing a comprehensive and unified perspective on business entities and their relationships over time.

Within business vaults 250, various stages are utilized to manage the transformation and storage of data. Satellite views, for example, represent snapshots of business entities at specific points in time, capturing the attributes and properties associated with those entities. These satellite views provide a historical record of changes to business data and enable temporal analysis to track how entities evolve over time. BV stage table views, on the other hand, serve as intermediate storage areas where transformed data is temporarily stored before being loaded into the final BV tables. These stage table views may contain data that has undergone initial processing, cleansing, or enrichment but has not yet been fully integrated into the BV layer.

Data store views within the business vault architecture represent the final destination for curated and refined data that is ready for analysis and reporting. These views provide a structured and standardized representation of business entities, relationships, and events, making it easier for stakeholders to access and analyze the data. Data store views often serve as the basis for generating reports, dashboards, and other analytical outputs that support decision-making and business intelligence initiatives. By organizing data into business-centric views within the BV layer, organizations can ensure consistency, accuracy, and reliability in their data assets, facilitating meaningful insights and informed decision-making across the enterprise.

Business vaults 250 play a role in data pipelines by providing a structured and standardized framework for capturing, transforming, and storing business data. Through the utilization of satellite views, BV stage table views, and data store views, organizations can effectively manage the lifecycle of business data, from its raw form to its refined state ready for analysis and reporting. By leveraging business vaults 250 within their data pipelines, organizations can maintain data integrity, consistency, and relevance, ultimately driving better insights and outcomes for the business.

The end-user layer 260 represents the final stage of data transformation and aggregation before data is presented to end users for analysis and decision-making purposes. This layer can serve as the interface between the underlying data infrastructure and the end-user applications or tools used for querying, visualization, and reporting. Within the end-user layer 260, various components such as info marts, star schemas, and summary tables are utilized to structure and organize data in a way that is conducive to end-user consumption and analysis.

Info marts are specialized data marts that focus on specific business functions, departments, or user groups within an organization. These info marts contain subsets of data from the broader data warehouse or data lake, tailored to meet the analytical needs of particular business units or stakeholders. By organizing data into info marts, organizations can provide targeted and relevant datasets to different user groups, enabling them to perform analysis and derive insights that are aligned with their specific requirements.

Star schemas are a common schema design used in data warehousing and analytics, characterized by a central fact table surrounded by dimension tables. The fact table contains numerical measures or metrics representing business events or transactions, while the dimension tables provide context and descriptive attributes related to those events. Star schemas facilitate efficient querying and analysis of data by enabling users to easily navigate and explore relationships between different dimensions and measures. This schema design is well-suited for OLAP (Online Analytical Processing) queries and multidimensional analysis, making it popular in data warehousing environments.

Summary tables, also known as aggregate tables, are precomputed tables that store summarized or aggregated data at various levels of granularity. These tables contain aggregated measures such as sums, averages, counts, or percentages, computed over different dimensions or hierarchies. By precomputing aggregates, organizations can accelerate query performance and improve responsiveness in analytical applications. Summary tables are particularly useful for supporting ad-hoc queries, interactive analysis, and dashboarding, where fast access to summarized data is critical for decision-making.

The end-user layer 260 in data pipelines acts as the bridge between the underlying data infrastructure and the end users who consume and analyze the data. Through the utilization of components such as info marts, star schemas, and summary tables, organizations can structure and organize data in a way that is intuitive, efficient, and tailored to the analytical needs of different user groups. By providing users with access to well-designed and optimized datasets within the end-user layer 260, organizations can empower them to derive insights, make informed decisions, and drive business success.

The access layer 270 can serve as the interface through which end users interact with the underlying data infrastructure to access, query, and analyze data. This layer plays a role in facilitating efficient and user-friendly access to data, enabling stakeholders to derive insights, make informed decisions, and drive business outcomes. Within the access layer 270, various components such as views, performance indexes, aggregates, OLAP cubes, and exports are utilized to optimize data access and enhance usability for end users.

Views are virtual representations of data that encapsulate complex SQL queries or data transformations. They provide a simplified and abstracted view of underlying data tables or structures, making it easier for users to query and analyze data without needing to understand the underlying data model. Views can be tailored to specific user requirements, providing customized datasets or perspectives on the data that align with business needs.

Performance indexes are data structures that improve query performance by enabling fast lookup and retrieval of data based on indexed columns. These indexes are created on frequently queried columns or attributes, allowing for rapid data access and retrieval in analytical or reporting applications. By optimizing data access through indexes, organizations can enhance the responsiveness and efficiency of their data pipelines, leading to improved user satisfaction and productivity.

Aggregates are precomputed summaries or aggregations of data that are stored at various levels of granularity. These aggregates enable users to quickly analyze and visualize data without the need to perform expensive computations or aggregations on the fly. Aggregates are particularly useful for supporting OLAP (Online Analytical Processing) queries and multidimensional analysis, where fast access to summarized data is critical for interactive exploration and decision-making.

OLAP cubes are multidimensional data structures that organize data into dimensions, measures, and hierarchies, enabling users to perform complex analytical queries and drill-down analysis. OLAP cubes provide a powerful framework for multidimensional analysis, allowing users to explore relationships between different dimensions and measures and gain deeper insights into their data. By leveraging OLAP cubes within the access layer 270, organizations can empower users to perform advanced analytics and derive actionable insights from their data.

Exports refer to the process of exporting data from the access layer 270 to external systems, applications, or formats for further analysis, reporting, or sharing. Exports may involve exporting data to spreadsheets, CSV files, BI tools, or other data visualization platforms, enabling users to consume and analyze data in their preferred environment. By facilitating data exports, the access layer 270 enables users to seamlessly integrate data into their workflows and collaborate effectively across the organization.

The access layer 270 in data pipelines can serve as the gateway for end users to interact with and derive value from data. Through the utilization of components such as views, performance indexes, aggregates, OLAP cubes, and exports, organizations can optimize data access, enhance usability, and empower users to make informed decisions and drive business success. By providing users with efficient and intuitive access to data, the access layer 270 plays a role in unlocking the full potential of data within the organization.

In the realm of data pipelines, Business Intelligence and Analytics (BIA) reporting tools 280 play a pivotal role in extracting insights from data and presenting them in a user-friendly and actionable format. These tools are designed to facilitate data visualization, analysis, and reporting, enabling organizations to make informed decisions and drive business outcomes. Tableau, Power BI, SSRS (SQL Server Reporting Services), QlikView, Yellowfin, and Targit are prominent examples of BIA reporting tools 280, each offering unique features and capabilities to meet diverse analytical needs.

Tableau is renowned for its intuitive interface and powerful data visualization capabilities. It allows users to create interactive dashboards, reports, and visualizations using drag-and-drop functionality, making it accessible to both technical and non-technical users. Tableau supports a wide range of data sources and integrates seamlessly with various data pipeline solutions, enabling users to derive insights from disparate datasets and communicate findings effectively.

Power BI, Microsoft's flagship business analytics tool, offers robust self-service BI capabilities combined with tight integration with the Microsoft ecosystem. Power BI enables users to connect to a multitude of data sources, including cloud services, databases, and online platforms, and create interactive reports and dashboards. With its rich set of visualization options, data modeling capabilities, and natural language querying, Power BI empowers users to analyze data and gain actionable insights quickly and easily.

SSRS (SQL Server Reporting Services) is a reporting platform included with Microsoft SQL Server, providing a centralized environment for creating, managing, and distributing reports. SSRS offers a wide range of reporting features, including paginated reports, interactive reports, and mobile reports, making it suitable for diverse reporting requirements. With its integration with SQL Server and other Microsoft technologies, SSRS enables seamless access to data stored in relational databases, data warehouses, and other data sources.

QlikView is a business intelligence and data visualization platform known for its associative data model and in-memory processing capabilities. QlikView allows users to explore data dynamically, making ad-hoc discoveries and uncovering hidden insights. With its powerful data discovery capabilities and interactive visualization features, QlikView empowers users to analyze complex datasets and derive actionable insights in real-time.

Yellowfin is a comprehensive BI and analytics platform that offers reporting, dashboards, data discovery, and storytelling capabilities. Yellowfin enables users to create interactive dashboards, reports, and visualizations using a simple and intuitive interface. With its collaborative features and mobile support, Yellowfin facilitates data-driven decision-making across the organization, enabling users to share insights, collaborate on analyses, and drive business outcomes effectively.

Targit is an end-to-end business intelligence and analytics platform that offers reporting, analytics, and data visualization capabilities. Targit allows users to create interactive dashboards, reports, and scorecards, enabling them to monitor performance indicators (KPIs) and track business performance in real-time. With its advanced analytics capabilities, Targit enables users to perform predictive analytics, forecasting, and data mining to uncover valuable insights and drive strategic decision-making.

BIA reporting tools 280 like Tableau, Power BI, SSRS, QlikView, Yellowfin, and Targit play a role in the data pipeline ecosystem by empowering users to analyze, visualize, and communicate insights derived from data effectively. These tools enable organizations to leverage their data assets, gain a competitive advantage, and drive business success through data-driven decision-making.

Snowflake 290 is a cloud-based data platform that provides a fully managed and scalable solution for storing, processing, and analyzing data in the cloud. It offers a unique architecture that separates compute and storage, allowing users to scale each independently based on their needs. Snowflake's architecture is designed to handle diverse workloads, including data warehousing, data lakes, and data engineering tasks, making it a versatile platform for modern data analytics.

In a data pipeline system, Snowflake 290 can play a central role in storing and processing data at various stages of the pipeline. At the ingest stage, raw data from different sources can be loaded into Snowflake's cloud storage, where it is securely stored in a structured format. Snowflake's storage layer is highly scalable and elastic, allowing organizations to ingest and store large volumes of data with ease.

Once the data is ingested into Snowflake 290, it can be processed and transformed using Snowflake's built-in SQL engine and support for semi-structured data formats like JSON, Avro, and Parquet. Snowflake's SQL capabilities enable users to perform complex data transformations, cleansing, and enrichment directly within the platform, eliminating the need for separate ETL tools or processing engines.

Snowflake's architecture also supports the creation of virtual warehouses, which are dedicated compute clusters that can be provisioned on-demand to execute SQL queries and process data. These virtual warehouses can be scaled up or down dynamically based on workload requirements, ensuring optimal performance and resource utilization. This flexibility allows organizations to handle peak workloads efficiently without over-provisioning resources or incurring unnecessary costs.

In addition to processing and transforming data, Snowflake 290 provides robust security and governance features to ensure data privacy, compliance, and control. It offers granular access controls, encryption at rest and in transit, and comprehensive auditing capabilities to meet the most stringent security requirements.

Once data has been processed and transformed within Snowflake 290, it can be accessed and analyzed using various reporting and visualization tools such as Tableau, Power BI, SSRS, QlikView, Yellowfin, and Targit. These tools can connect to Snowflake 290 using standard SQL interfaces or native connectors, allowing users to create interactive dashboards, reports, and visualizations based on the processed data stored in Snowflake 290.

Snowflake 290 can serve as a powerful and flexible data platform that can seamlessly integrate into data pipeline systems, providing scalable storage, processing, and analysis capabilities in the cloud. By leveraging Snowflake's features and capabilities, organizations can build robust and efficient data pipelines to ingest, process, and analyze data at scale, driving actionable insights and informed decision-making.

WhereScape RED and 3D Metadata 291 are software tools designed to streamline the development, deployment, and management of data infrastructure, including data pipelines, data warehouses, and data marts. WhereScape RED is an integrated development environment (IDE) that enables users to design, build, and automate data pipelines using a visual, code-free approach. 3D Metadata 291 is the underlying metadata repository that powers WhereScape RED, providing a comprehensive and centralized view of the entire data landscape.

In a data pipeline system, WhereScape RED and 3D Metadata 291 work together to accelerate the development and deployment of data pipelines while ensuring consistency, repeatability, and governance. The process typically begins with data modeling and design, where users define the structure and relationships of data objects within the data pipeline. Using WhereScape RED's intuitive interface, users can visually design data flows, transformations, and dependencies, leveraging pre-built templates and best practices to expedite development.

Once the data pipeline design is complete, WhereScape RED generates the necessary code, scripts, and configurations to implement the pipeline automatically. This includes generating SQL code for data extraction, transformation, and loading (ETL) processes, as well as orchestrating workflow tasks, scheduling jobs, and managing dependencies. WhereScape RED abstracts away the complexities of coding and scripting, allowing users to focus on business logic and requirements rather than technical implementation details.

Meanwhile, 3D Metadata can serve as the backbone of the data pipeline system, providing a comprehensive and unified view of the data landscape. It captures metadata from various sources, including databases, files, and external systems, and stores it in a centralized repository. This metadata includes information about data objects, their attributes, relationships, lineage, and usage, enabling users to understand and govern the entire data pipeline ecosystem effectively.

In addition to development and deployment, WhereScape RED and 3D Metadata 291 facilitate ongoing management and maintenance of data pipelines. They provide capabilities for version control, impact analysis, and documentation, allowing users to track changes, assess the impact of modifications, and maintain documentation to support regulatory compliance and auditing requirements. Furthermore, in some embodiments, WhereScape RED's automation capabilities enable users to iteratively refine and optimize data pipelines over time, adapting to changing business needs and data requirements seamlessly.

WhereScape RED and 3D Metadata 291 offer a comprehensive solution for building, managing, and optimizing data pipelines within organizations. By providing a visual, code-free development environment and a centralized metadata repository, these tools empower users to accelerate the delivery of data projects, minimize manual effort and errors, and maximize the value of their data assets.

The scheduler 292 is a component of the WhereScape automation platform designed to orchestrate, schedule, and manage the execution of data pipelines, jobs, and tasks within a data infrastructure. As part of the WhereScape ecosystem, Scheduler 292 seamlessly integrates with other WhereScape products such as WhereScape RED and WhereScape 3D Metadata 291, enabling organizations to automate and streamline their end-to-end data pipeline processes.

In a data pipeline system, scheduler 292 plays a role in ensuring the timely and reliable execution of data integration, transformation, and loading tasks. It provides a centralized platform for defining and scheduling workflow processes, dependencies, and dependencies, allowing users to orchestrate complex data pipelines with ease.

One of the features of scheduler 292 is its ability to define and manage dependencies between different tasks and jobs within the data pipeline. Users can specify dependencies based on various criteria, such as temporal constraints, data availability, or completion status, ensuring that tasks are executed in the correct sequence and with the necessary prerequisites met. This dependency management capability helps prevent issues such as data inconsistency, job failures, or resource contention, thereby improving the reliability and robustness of the data pipeline system.

Scheduler 292 may also provide flexible scheduling options to accommodate different workload patterns and business requirements. Users can define schedules based on time-based intervals, event triggers, or external stimuli, allowing for dynamic and adaptive execution of data pipeline tasks. This flexibility enables organizations to optimize resource utilization, prioritize critical tasks, and respond quickly to changing business needs or data priorities.

Furthermore, in some embodiments, the scheduler 292 offers comprehensive monitoring, logging, and alerting capabilities to track the execution of data pipeline tasks in real-time and diagnose issues or errors as they can occur. Users can monitor job status, performance metrics, and resource utilization through intuitive dashboards and reports, enabling proactive management and troubleshooting of data pipeline processes. Automated alerts and notifications can be configured to notify stakeholders of job failures, delays, or other anomalies, ensuring timely intervention and resolution of issues. In certain embodiments, the scheduler 292 can be a Wherescape scheduler.

Scheduler 292 can serve as a component of the data pipeline system, enabling organizations to automate, orchestrate, and manage the execution of data integration and transformation processes with ease. By providing centralized scheduling, dependency management, and monitoring capabilities, scheduler 292 can help organizations improve the efficiency, reliability, and agility of their data pipeline operations, ultimately driving better business outcomes and decision-making.

In the context of data pipelines and data quality management 293, several practices such as data validation, metadata monitoring, process monitoring, and business rule validation play roles in ensuring the accuracy, completeness, and reliability of data throughout the pipeline lifecycle. These practices contribute to identifying and rectifying data quality issues, improving data governance, and enhancing overall data integrity.

Data validation may involve the systematic verification of data against predefined rules, standards, or criteria to ensure its accuracy, consistency, and validity. By implementing data validation checks at various stages of the data pipeline, organizations can detect anomalies, errors, or inconsistencies in the data early on and take corrective actions promptly. For example, data validation checks can verify the integrity of data during the extraction, transformation, and loading (ETL) processes, ensuring that data conforms to expected formats, ranges, or constraints before it is loaded into downstream systems or databases.

Metadata monitoring may involve tracking and analyzing metadata, which provides descriptive information about data assets, such as their structure, lineage, and usage. By monitoring metadata across the data pipeline, organizations can gain insights into the quality, lineage, and usage of data assets, enabling them to identify potential issues or discrepancies that may impact data quality or governance. Metadata monitoring can help detect data lineage gaps, identify outdated or inaccurate metadata, and ensure compliance with data governance policies and standards.

Process monitoring may involve monitoring and analyzing the performance and behavior of data pipeline processes, workflows, and tasks. By implementing process monitoring mechanisms, organizations can track the execution of data pipeline processes in real-time, monitor resource utilization, and identify bottlenecks or performance issues that may affect data quality or timeliness. Process monitoring can help ensure that data pipeline processes are running efficiently, meeting service level agreements (SLAs), and delivering high-quality data to end users and stakeholders.

Business rule validation may involve validating data against predefined business rules, logic, or requirements to ensure its alignment with business objectives and expectations. By implementing business rule validation checks within the data pipeline, organizations can enforce data quality standards, business rules, and regulatory requirements, ensuring that data meets the needs of business users and decision-makers. Business rule validation can help detect data inconsistencies, outliers, or anomalies that may indicate potential business risks or opportunities, enabling organizations to make informed decisions and take appropriate actions.

Data validation, metadata monitoring, process monitoring, and business rule validation are useful practices in data pipelines and data quality management 293. By implementing these practices systematically throughout the data pipeline lifecycle, organizations can improve data quality, enhance data governance, and ensure that data is accurate, reliable, and actionable for decision-making and business insights.

Although a specific embodiment for an enterprise data warehouse (EDW) 200 suitable for carrying out the various steps, processes, methods, and operations described herein is discussed with respect to FIG. 2, any of a variety of systems and/or processes may be utilized in accordance with embodiments of the disclosure. For example, the specific structure of the EDW 200 may change based on the desired application or the specific deployment, such as which industry the EDW 200 is configured for. The elements depicted in FIG. 2 may also be interchangeable with other elements of FIGS. 1 and 3-18 as required to realize a particularly desired embodiment.

Figure 3:
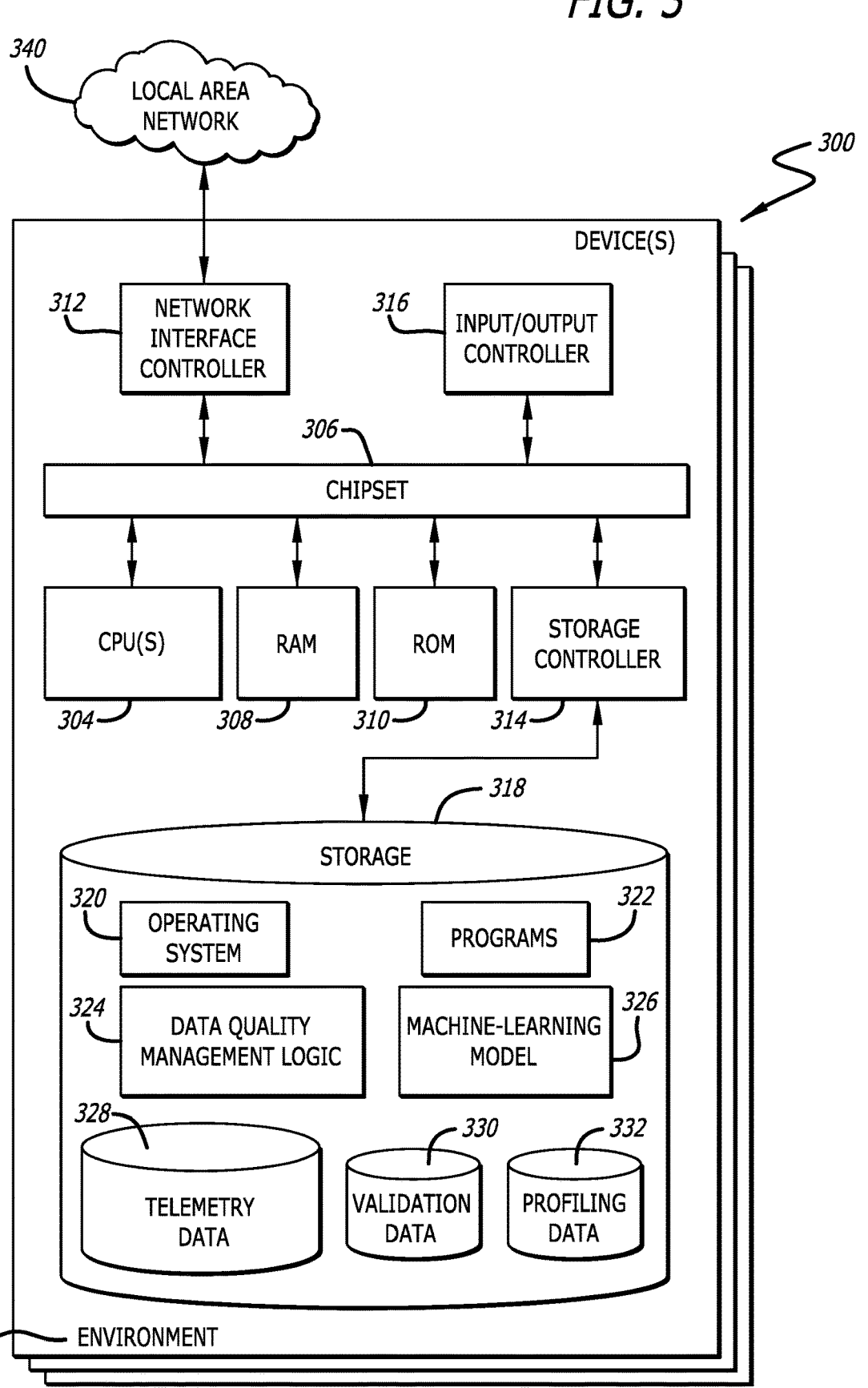
FIG. 3 is a schematic block diagram of a device suitable for configuration with a data quality management logic, in accordance with various embodiments of the disclosure.

Referring to FIG. 3, a schematic block diagram of a device suitable for configuration with a data quality management logic 324, in accordance with various embodiments of the disclosure is shown. The embodiment of the conceptual block diagram depicted in FIG. 3 can illustrate a conventional network-based device, such as a server, switch, wireless LAN controller, access point, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 3 can also illustrate a specialized device, system, and/or cloud-based or virtualized service in accordance with various embodiments of the disclosure. The device 300 may, in many non-limiting examples, correspond to physical devices or to virtual resources described herein.

In many embodiments, the device 300 may include an environment 302 such as a baseboard or "motherboard," in physical embodiments that can be configured as a printed circuit board with a multitude of components or devices connected by way of a system bus or other electrical communication paths. Conceptually, in virtualized embodiments, the environment 302 may be a virtual environment that encompasses and executes the remaining components and resources of the device 300. In more embodiments, one or more processors 304, such as, but not limited to, central processing units ("CPUs") can be configured to operate in conjunction with a chipset 306. The processor(s) 304 can be standard programmable CPUs that perform arithmetic and logical operations necessary for the operation of the device 300.

In a number of embodiments, the processor(s) 304 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 306 may provide an interface between the processor(s) 304 and the remainder of the components and devices within the environment 302. The chipset 306 can provide an interface to a random-access memory ("RAM") 308, which can be used as the main memory in the device 300 in some embodiments. The chipset 306 can further be configured to provide an interface to a computer-readable storage medium such as a read-only memory ("ROM") 310 or non-volatile RAM ("NVRAM") for storing basic routines that can help with various tasks such as, but not limited to, starting up the device 300 and/or transferring information between the various components and devices. The ROM 310 or NVRAM can also store other application components necessary for the operation of the device 300 in accordance with various embodiments described herein.

Additional embodiments of the device 300 can be configured to operate in a networked environment using logical connections to remote computing devices and computer systems through a network, such as the network 340. The chipset 306 can include functionality for providing network connectivity through a network interface card ("NIC") 312, which may comprise a gigabit Ethernet adapter or similar component. The NIC 312 can be capable of connecting the device 300 to other devices over the network 340. It is contemplated that multiple NICs 312 may be present in the device 300, connecting the device to other types of networks and remote systems.

In further embodiments, the device 300 can be connected to a storage 318 that provides non-volatile storage for data accessible by the device 300. The storage 318 can, for instance, store an operating system 320, applications 322. The storage 318 can be connected to the environment 302 through a storage controller 314 connected to the chipset 306. In certain embodiments, the storage 318 can consist of one or more physical storage units. The storage controller 314 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 300 can store data within the storage 318 by transforming the physical state of the physical storage units to reflect the information being stored. The specific transformation of physical state can depend on various factors. Examples of such factors can include, but are not limited to, the technology used to implement the physical storage units, whether the storage 318 is characterized as primary or secondary storage, and the like.

In many more embodiments, the device 300 can store information within the storage 318 by issuing instructions through the storage controller 314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 300 can further read or access information from the storage 318 by detecting the physical states or characteristics of one or more particular locations within the physical storage units.

In addition to the storage 318 described above, the device 300 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 300. In some examples, the operations performed by a cloud computing network, and or any components included therein, may be supported by one or more devices similar to device 300. Stated otherwise, some or all of the operations performed by the cloud computing network, and or any components included therein, may be performed by one or more devices 300 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 318 can store an operating system 320 utilized to control the operation of the device 300. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 318 can store other system or application programs and data utilized by the device 300.

In many additional embodiments, the storage 318 or other computer-readable storage media is encoded with computer-executable instructions which, when loaded into the device 300, may transform it from a general-purpose computing system into a special-purpose computer capable of implementing the embodiments described herein. These computer-executable instructions may be stored as application 322 and transform the device 300 by specifying how the processor(s) 304 can transition between states, as described above. In some embodiments, the device 300 has access to computer-readable storage media storing computer-executable instructions which, when executed by the device 300, perform the various processes described above with regard to FIGS. 1-9. In certain embodiments, the device 300 can also include computer-readable storage media having instructions stored thereupon for performing any of the other computer-implemented operations described herein.

In many further embodiments, the device 300 may include a data quality management logic 324. The data quality management logic 324 can be configured to perform one or more of the various steps, processes, operations, and/or other methods that are described within the disclosure herein. Often, the data quality management logic 324 can be a set of instructions stored within a non-volatile memory that, when executed by the processor(s)/controller(s) 304 can carry out these steps, etc. In some embodiments, the data quality management logic 324 may be a client application that resides on a network-connected device, such as, but not limited to, a server, switch, personal or mobile computing device in a single or distributed arrangement.

In some embodiments, telemetry data 328 can encompass real-time measurements crucial for monitoring and optimizing data performance, content, and/or validity. Telemetry data 328 related to data pipeline quality management typically encompasses a wide range of metrics, statistics, and insights gathered from the operation and performance of the data pipeline itself. This telemetry data 328 can provide valuable information about various aspects of the pipeline's functionality, efficiency, and reliability, allowing organizations to monitor and optimize their data processes effectively. Some key components of telemetry data 328 in data pipeline quality management may include throughput metrics, which measure the rate at which data is processed through the pipeline, and latency metrics, which track the time taken for data to traverse the pipeline from source to destination. Additionally, telemetry data 328 may include error rates and error codes, indicating the frequency and types of errors encountered during data processing, as well as data quality metrics that assess the accuracy, completeness, and consistency of the data flowing through the pipeline. By analyzing telemetry data, organizations can identify bottlenecks, anomalies, or inefficiencies in their data pipelines and take proactive measures to improve data quality, performance, and reliability.

In various embodiments, validation data 330 typically can refer to a subset of data that is used to perform validation checks, verify the integrity, accuracy, and consistency of data throughout the pipeline. Validation data 330 may comprise various components, each serving a specific purpose in assessing data quality and ensuring its suitability for downstream use. Firstly, in many embodiments, validation data 330 may include samples of incoming or raw data obtained from source systems or external sources. These samples are used to validate data as it is ingested into the pipeline, ensuring that it meets expected formats, standards, and quality criteria. For example, validation data 330 may include records from source databases, files, or streams, which are subjected to data validation checks to identify anomalies, errors, or discrepancies. Additionally, in more embodiments, validation data 330 may encompass reference or master data sets that serve as benchmarks or golden records against which incoming data is compared. These reference data sets represent trusted, authoritative sources of data that are used to validate the accuracy and completeness of incoming data. For instance, reference data may include lists of valid customers, products, or entities, which are used to validate the integrity of corresponding data fields in incoming records.

Moreover, in certain embodiments, validation data 330 may involve synthetic or simulated data generated specifically for testing and validation purposes. Synthetic data is often used to mimic real-world scenarios, edge cases, or outliers that may not be adequately represented in actual data sets. By incorporating synthetic data into validation processes, organizations can assess the robustness and resilience of data pipelines under various conditions and scenarios.

Furthermore, in some embodiments, validation data 330 may comprise historical or archived data sets that are used to validate the consistency and accuracy of data over time. Historical data sets provide insights into data trends, patterns, and changes over different time periods, enabling organizations to identify data anomalies, trends, or outliers that may indicate data quality issues or anomalies.

Validation data 330 in data pipelines may encompass a diverse range of data types, sources, and formats, each serving a specific role in ensuring data quality and integrity throughout the pipeline lifecycle. By leveraging validation data 330 effectively, organizations can identify and rectify data quality issues proactively, ensuring that data remains accurate, reliable, and actionable for decision-making and business insights.

In a number of embodiments, In the realm of data pipelines and data quality management, profiling data 332 typically can refer to a subset of data that is used to perform data profiling, which may involve analyzing the structure, content, and quality of data to gain insights into its characteristics and attributes. Profiling data 332 may encompass various components that are useful for assessing the quality, completeness, and consistency of data throughout the pipeline.

Firstly, in many embodiments, profiling data 332 often includes samples of actual data obtained from source systems or external sources. These samples serve as the basis for analyzing the distribution, frequency, and variability of data values within different fields or columns. By examining the distribution of data values, organizations can identify patterns, outliers, or anomalies that may indicate data quality issues or inconsistencies.

Additionally, in more embodiments, profiling data 332 may consist of metadata extracted from data sources, such as schema information, data types, and constraints. Metadata provides valuable insights into the structure and characteristics of data, enabling organizations to assess its compatibility, integrity, and relevance for downstream processing and analysis. Metadata profiling helps identify potential data quality issues, such as missing values, data truncation, or schema inconsistencies, which may affect the accuracy and reliability of data.

Moreover, in certain embodiments, profiling data 332 may involve statistical analyses and calculations performed on the sampled data to derive summary statistics, such as mean, median, standard deviation, or data ranges. These statistics provide quantitative measures of data quality, completeness, and distribution, enabling organizations to assess the overall health and reliability of data. Statistical profiling helps identify data anomalies, outliers, or deviations from expected norms, which may include further investigation or remediation.

Furthermore, in some embodiments, profiling data 332 may include data quality metrics and indicators generated from profiling analyses, such as data completeness, accuracy, consistency, and timeliness. These metrics provide a holistic view of data quality across different dimensions, allowing organizations to prioritize data quality issues and allocate resources effectively for remediation. Data quality profiling helps organizations establish baseline benchmarks, monitor performance over time, and track improvements in data quality as part of ongoing data governance and stewardship efforts.

Profiling data 332 in data pipelines encompasses a diverse range of data types, sources, and analyses aimed at understanding and assessing the quality, integrity, and relevance of data throughout the pipeline lifecycle. By leveraging profiling data 332 effectively, organizations can identify data quality issues proactively, mitigate risks, and ensure that data remains accurate, reliable, and actionable for decision-making and business insights.

In still further embodiments, the device 300 can also include one or more input/output controllers 316 for receiving and processing input from a number of input devices, such as a keyboard, a mouse, a touchpad, a touch screen, an electronic stylus, or other type of input device. Similarly, an input/output controller 316 can be configured to provide output to a display, such as a computer monitor, a flat panel display, a digital projector, a printer, or other type of output device. Those skilled in the art will recognize that the device 300 might not include all of the components shown in FIG. 3 and can include other components that are not explicitly shown in FIG. 3 or might utilize an architecture completely different than that shown in FIG. 3.

As described above, the device 300 may support a virtualization layer, such as one or more virtual resources executing on the device 300. In some examples, the virtualization layer may be supported by a hypervisor that provides one or more virtual machines running on the device 300 to perform functions described herein. The virtualization layer may generally support a virtual resource that performs at least a portion of the techniques described herein.

Finally, in numerous additional embodiments, data may be processed into a format usable by a machine-learning model 326 (e.g., feature vectors), and or other pre-processing techniques. The machine-learning ("ML") model 326 may be any type of ML model, such as supervised models, reinforcement models, and/or unsupervised models. The ML model 326 may include one or more of linear regression models, logistic regression models, decision trees, Naïve Bayes models, neural networks, k-means cluster models, random forest models, and/or other types of ML models 326.

The ML model(s) 326 can be configured to generate inferences to make predictions or draw conclusions from data. An inference can be considered the output of a process of applying a model to new data. This can occur by learning from at least the telemetry data 328, the power validation data 330, and the profiling data 332. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 326 may be generated by human/administrator verifications or may compare predicted outcomes with actual outcomes.

Although a specific embodiment for a device suitable for configuration with a data quality management logic 324 suitable for carrying out the various steps, processes, methods, and operations described herein is discussed with respect to FIG. 3, any of a variety of systems and/or processes may be utilized in accordance with embodiments of the disclosure. For example, the quality management logic 324 may be configured as a device-based logic, or may be provided as a cloud-based or other remote service available for purchase or use. The elements depicted in FIG. 3 may also be interchangeable with other elements of FIGS. 1-2 and 4-18 as required to realize a particularly desired embodiment.

Figure 4:
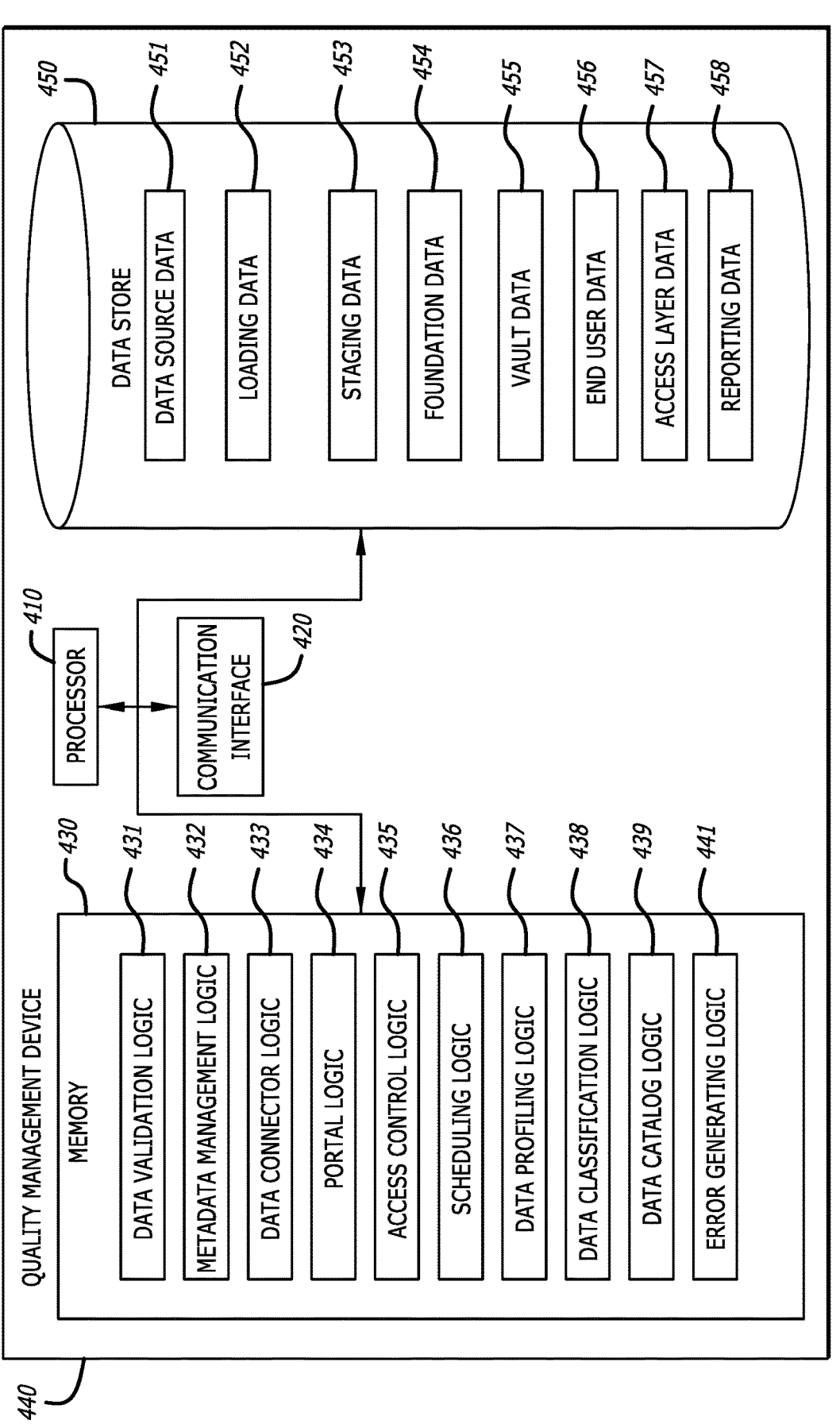
FIG. 4 is a schematic block diagram of a device suitable for data pipeline quality management, in accordance with various embodiments of the disclosure.

Referring to FIG. 4, a schematic block diagram of a device 440 suitable for data pipeline quality management, in accordance with various embodiments of the disclosure is shown. As discussed above, a device 440 may be embodied as a unique device as depicted in FIG. 3 that is communicatively connected to an enterprise data warehouse or other data pipeline. In further embodiments, the device 440 may be configured either as a hardware or software module. In particular embodiments, the device 440 may be configured as a software application run on or at least accessible through a personal and/or mobile computing device.

The device 440 as depicted in FIG. 4 comprises at least a processor 410, memory 430, inputs and outputs 420, and a data store 450. The memory 430 may include a data validation logic 431, a metadata management logic 432, a data connector logic 433, a portal logic 434, an access control logic 435, a scheduling logic 436, a data profiling logic 437, a data classification logic 438, a data catalog logic 439, and an error generation logic 441. The data store 450 may comprise various types of data including, but not limited to, data source data 451, loading data 452, staging data 453, foundation data 454, vault data 455, end user data 456, access layer data 457, and/or reporting data 458. As discussed previously, the various data types and logics may be configured in various ways depending on the application desired including combining, omitting, or adding logics and data types.

In some embodiments, a data validation logic 431 can refer to the set of rules, algorithms, and criteria used to assess the quality, integrity, and consistency of data as it moves through the pipeline. This logic can encompass various components and configurations tailored to specific data quality requirements and business objectives.

Firstly, in many embodiments, data validation logic 431 may include rules and constraints defined based on the structure, format, and semantics of data fields or attributes. These rules specify criteria such as data types, ranges, lengths, and patterns that data often adhere to in order to be considered valid. For example, data validation logic 431 may enforce rules to ensure that dates are in the correct format, numerical values fall within acceptable ranges, and text fields do not exceed specified lengths.

Additionally, in more embodiments, data validation logic 431 may involve referential integrity checks to validate relationships and dependencies between different data entities or tables. These checks verify that foreign relationships are maintained and that data references are consistent and accurate across related tables. For instance, data validation logic 431 may enforce rules to ensure that each customer record references a valid customer ID from a master customer table, preventing orphaned or invalid references.

Moreover, in certain embodiments, data validation logic 431 can include consistency checks to identify discrepancies, anomalies, or duplicates within the data. These checks compare data values across different records, fields, or sources to detect inconsistencies or deviations from expected patterns. For example, data validation logic 431 may flag records with duplicate customer IDs, inconsistent product codes, or conflicting address information, allowing organizations to address data quality issues proactively.

Furthermore, in some embodiments, data validation logic 431 may incorporate business rules, logic, or requirements specific to the domain or context of the data. These rules encapsulate business policies, regulations, or best practices that data often conform to in order to meet business objectives and compliance requirements. For example, data validation logic 431 may enforce rules to ensure regulatory compliance, data privacy, or data governance standards, helping organizations maintain trust, integrity, and accountability in their data assets.

Data validation logic 431 in data pipelines can be configured to ensure that data meets predefined quality standards, integrity constraints, and business requirements throughout the pipeline lifecycle. By implementing robust data validation logic 431, organizations can identify and rectify data quality issues proactively, ensuring that data remains accurate, reliable, and actionable for decision-making and business insights.

In a number of embodiments, a metadata management logic 432 can refer to the set of processes, rules, and mechanisms used to govern, control, and leverage metadata throughout the data pipeline lifecycle. Metadata management logic 432 encompasses various components and configurations aimed at ensuring the consistency, accuracy, and usefulness of metadata for data management, analysis, and decision-making purposes.

Firstly, in many embodiments, metadata management logic 432 may involve the definition and enforcement of metadata standards, policies, and guidelines to ensure consistency and uniformity across different data assets and sources. These standards specify metadata attributes, formats, naming conventions, and classifications that metadata often adhere to, facilitating effective metadata governance and stewardship. For example, metadata management logic 432 may enforce rules to ensure that metadata is labeled consistently, documented comprehensively, and classified accurately according to predefined taxonomies or ontologies.

Additionally, in more embodiments, metadata management logic 432 can include mechanisms for capturing, cataloging, and indexing metadata from various data sources, systems, and tools used within the data pipeline ecosystem. This may involve automatically extracting metadata from data files, databases, ETL processes, and other sources, and storing it in a centralized metadata repository. By consolidating metadata in a centralized repository, organizations can gain a unified view of their data landscape, enabling efficient metadata discovery, search, and reuse across different projects and initiatives.

Moreover, in certain embodiments, metadata management logic 432 may encompass mechanisms for lineage tracking, impact analysis, and dependency management to understand the relationships and dependencies between different data assets and processes within the pipeline. Lineage tracking traces the origins, transformations, and movements of data throughout the pipeline, providing insights into data provenance and history. Impact analysis evaluates the potential impact of changes to data assets or processes on downstream systems, applications, or stakeholders, enabling organizations to assess risks and plan accordingly. Dependency management ensures that data assets and processes are synchronized and coordinated effectively, minimizing disruptions and inconsistencies in the pipeline workflow.

Furthermore, in some embodiments, metadata management logic 432 may include capabilities for metadata validation, quality assurance, and monitoring to ensure the accuracy, completeness, and reliability of metadata over time. This may involve performing checks and validations on metadata attributes, values, and relationships to identify anomalies, errors, or discrepancies that may affect data quality or integrity. Metadata monitoring tracks changes, updates, and usage patterns of metadata, providing visibility into metadata evolution and usage trends, enabling organizations to assess the health and effectiveness of their metadata management practices.

Metadata management logic 432 in data pipelines can be configured to govern, control, and leverage metadata effectively throughout the data lifecycle. By implementing robust metadata management logic 432, organizations can ensure consistency, accuracy, and usefulness of metadata, enabling efficient data management, analysis, and decision-making across the enterprise.

In additional embodiments, a data connector logic 433 can refer to the set of processes, mechanisms, and configurations used to facilitate the integration, interoperability, and movement of data between disparate systems, applications, or platforms within the pipeline ecosystem. Data connector logic 433 encompasses various components and functionalities aimed at ensuring seamless data connectivity, transformation, and exchange across heterogeneous environments and technologies.

Firstly, in many embodiments, data connector logic 433 may involve the implementation of connectors, adapters, or interfaces that enable communication and interaction between different data sources, systems, or tools within the pipeline. These connectors serve as middleware or integration components that bridge the gap between incompatible or disparate data formats, protocols, and APIs, enabling data to flow smoothly between systems. For example, data connector logic 433 may include connectors for relational databases, file systems, cloud storage services, APIs, messaging queues, and streaming platforms, allowing organizations to ingest, process, and distribute data from a wide range of sources.

Additionally, in more embodiments, data connector logic 433 can include mechanisms for data transformation, mapping, and enrichment to harmonize and standardize data across different formats and structures. This may involve translating data schemas, formats, and semantics between source and target systems, ensuring compatibility and consistency of data throughout the pipeline. Data connector logic 433 may incorporate transformation rules, mappings, and scripts to convert data between formats, perform data cleansing, validation, and enrichment, and handle data integration challenges such as schema evolution, data quality issues, and semantic mismatches.

Moreover, in certain embodiments, data connector logic 433 may encompass functionalities for data orchestration, scheduling, and workflow management to coordinate and automate data movement and processing tasks within the pipeline. This may involve defining workflows, dependencies, and schedules for data ingestion, transformation, loading, and distribution, ensuring that data flows smoothly and efficiently through the pipeline. Data connector logic 433 may include workflow engines, schedulers, and orchestration tools that enable organizations to define, execute, and monitor complex data processing workflows, handle failures and exceptions, and optimize resource utilization and performance.

Furthermore, in some embodiments, data connector logic 433 may include capabilities for data security, compliance, and governance to ensure the confidentiality, integrity, and regulatory compliance of data throughout the pipeline. This may involve implementing encryption, access controls, data masking, and auditing mechanisms to protect sensitive data, enforce data privacy regulations, and maintain compliance with industry standards and regulations. Data connector logic 433 may also include features for data lineage tracking, provenance, and auditability, enabling organizations to trace the movement, transformation, and usage of data across the pipeline and demonstrate compliance with data governance requirements.

Data connector logic 433 in data pipelines can be configured to facilitate seamless data connectivity, transformation, and exchange across heterogeneous environments and technologies. By implementing robust data connector logic 433, organizations can overcome data integration challenges, streamline data movement and processing, and unlock the value of their data assets for analysis, decision-making, and business insights.

In further embodiments, a portal logic 434 can refer to the set of processes, mechanisms, and configurations used to manage, monitor, and interact with data pipeline systems through a centralized web-based interface or portal. Portal logic 434 encompasses various components and functionalities aimed at providing users with intuitive, efficient, and secure access to data pipeline resources, tools, and insights.

Firstly, in many embodiments, portal logic 434 may involve the design and development of a user-friendly interface that enables users to access and navigate data pipeline functionalities, workflows, and resources easily. The portal interface typically provides dashboard views, navigation menus, and interactive controls that allow users to monitor pipeline status, view data processing metrics, and access relevant tools and documentation. By providing a centralized and intuitive interface, portal logic 434 enables users to interact with data pipeline systems effectively, regardless of their technical expertise or background.

Additionally, in more embodiments, portal logic 434 can include functionalities for user authentication, authorization, and access control to ensure that users have appropriate permissions and privileges to access data pipeline resources and perform specific actions. This may involve implementing authentication mechanisms such as single sign-on (SSO), multi-factor authentication (MFA), and role-based access control (RBAC) to verify user identities and enforce access policies. Portal logic 434 may also include features for user management, account provisioning, and permission assignment, allowing administrators to manage user access and permissions efficiently.

Moreover, in certain embodiments, portal logic 434 may encompass capabilities for data discovery, exploration, and visualization to empower users to explore and analyze data within the pipeline. This may involve integrating data exploration tools, data visualization libraries, and query interfaces into the portal interface, enabling users to interactively explore data, create visualizations, and generate insights. Portal logic 434 may also include features for searching and browsing metadata, data catalogs, and data lineage information, facilitating data discovery and understanding across the pipeline ecosystem.

Furthermore, in some embodiments, portal logic 434 can include functionalities for collaboration, communication, and workflow management to facilitate teamwork and coordination among users involved in data pipeline activities. This may involve integrating collaboration tools such as chat, messaging, and notifications into the portal interface, enabling users to communicate, share insights, and collaborate on data pipeline tasks in real-time. Portal logic 434 may also include features for task assignment, workflow automation, and project management, allowing users to coordinate and track progress on data pipeline projects efficiently.

Portal logic 434 in data pipelines can be configured to provide users with a centralized, secure, and user-friendly interface for managing, monitoring, and interacting with data pipeline systems. By implementing robust portal logic 434, organizations can empower users to access, explore, analyze, and collaborate on data pipeline activities effectively, enabling them to derive insights, make informed decisions, and drive business outcomes with confidence.

In still more embodiments, an access control logic 435 can refer to the set of processes, mechanisms, and configurations used to manage, enforce, and regulate access to data pipeline resources, functionalities, and data assets. Access control logic 435 encompasses various components and functionalities aimed at ensuring that users have appropriate permissions and privileges to access and interact with data pipeline systems securely and effectively.

Firstly, in many embodiments, access control logic 435 may involve the implementation of authentication mechanisms to verify the identities of users and authenticate their access to data pipeline resources. This includes mechanisms such as username/password authentication, multi-factor authentication (MFA), and single sign-on (SSO), which authenticate users based on their credentials and establish their identities before granting access to data pipeline systems.

Additionally, in more embodiments, access control logic 435 can include mechanisms for authorization, which determine the permissions and privileges that users have to access specific data pipeline resources and perform certain actions. This may involve defining roles, groups, and access policies that specify the level of access granted to users based on their roles, responsibilities, and organizational affiliations. Access control logic 435 may also include features for fine-grained access control, allowing administrators to define granular permissions at the individual resource or data level.

Moreover, in certain embodiments, access control logic 435 may encompass mechanisms for enforcing access control policies and rules to ensure that only authorized users can access and interact with data pipeline resources. This may involve implementing access control mechanisms such as access control lists (ACLs), role-based access control (RBAC), and attribute-based access control (ABAC), which enforce access policies based on user attributes, roles, and contextual factors. Access control logic 435 may also include features for auditing and logging access attempts, enabling organizations to track and monitor user access and detect unauthorized activities or security breaches.

Furthermore, in some embodiments, access control logic 435 can include mechanisms for data encryption, data masking, and data anonymization to protect sensitive data and ensure confidentiality and privacy. This may involve encrypting data at rest and in transit, masking sensitive data fields to prevent unauthorized access, and anonymizing data to remove personally identifiable information (PII) and protect user privacy. Access control logic 435 may also include features for data classification, labeling, and tagging, enabling organizations to classify data based on sensitivity levels and apply appropriate access controls accordingly.

access control logic 435 in data pipelines can be configured to manage, enforce, and regulate access to data pipeline resources and data assets securely and efficiently. By implementing robust access control logic 435, organizations can ensure that only authorized users have access to data pipeline systems, protect sensitive data from unauthorized access, and maintain compliance with security and privacy regulations.

In yet additional embodiments, scheduling logic 436 can refer to the set of processes, mechanisms, and configurations used to orchestrate, manage, and automate the execution of data pipeline tasks, workflows, and processes according to predefined schedules and dependencies. Scheduling logic 436 encompasses various components and functionalities aimed at ensuring that data pipeline activities are executed efficiently, reliably, and in accordance with business requirements and priorities.

Firstly, in many embodiments, scheduling logic 436 may involve the definition and management of scheduling policies, rules, and criteria that determine when and how data pipeline tasks and processes are scheduled for execution. This includes specifying scheduling parameters such as start times, end times, recurrence intervals, and dependencies between tasks, enabling organizations to orchestrate complex data processing workflows and coordinate the execution of tasks across distributed environments.

Additionally, in more embodiments, scheduling logic 436 can include mechanisms for workload management, resource allocation, and optimization to maximize the efficiency and utilization of computing resources within the data pipeline ecosystem. This may involve dynamically allocating resources such as CPU, memory, storage, and network bandwidth to data pipeline tasks based on workload priorities, resource availability, and performance requirements. Scheduling logic 436 may incorporate algorithms and heuristics for load balancing, resource provisioning, and capacity planning, ensuring that data pipeline activities are executed optimally and without resource contention.

Moreover, in certain embodiments, scheduling logic 436 may encompass features for job monitoring, tracking, and reporting to provide visibility into the status, progress, and performance of data pipeline tasks and workflows. This includes monitoring task execution times, resource utilization, and completion statuses in real-time, as well as generating reports and dashboards to track performance indicators (KPIs) and metrics. Scheduling logic 436 may also include alerting mechanisms to notify stakeholders of job failures, delays, or other anomalies, enabling proactive management and troubleshooting of data pipeline processes.

Furthermore, in some embodiments, scheduling logic 436 can include capabilities for dependency management, job sequencing, and workflow automation to ensure that data pipeline tasks are executed in the correct sequence and with the necessary prerequisites met. This may involve defining dependencies between tasks based on data availability, processing dependencies, and inter-task relationships, as well as automating the execution of workflows and processes to minimize manual intervention and human error. Scheduling logic 436 may also incorporate retry mechanisms, error handling strategies, and fault tolerance mechanisms to handle failures and exceptions gracefully and ensure the robustness and reliability of data pipeline operations.

Scheduling logic 436 in data pipelines can be configured to orchestrate, manage, and automate the execution of data pipeline tasks and processes efficiently and reliably. By implementing robust scheduling logic 436, organizations can optimize resource utilization, streamline workflow execution, and ensure that data pipeline activities are executed in a timely manner, enabling them to meet business objectives, SLAs, and performance goals effectively.

In various embodiments, a data profiling logic 437 can refer to the set of processes, mechanisms, and configurations used to analyze, assess, and understand the characteristics, quality, and structure of data within the pipeline. Data profiling logic 437 encompasses various components and functionalities aimed at gaining insights into the content, distribution, and patterns of data, enabling organizations to identify data quality issues, anomalies, and opportunities for improvement.

Firstly, in many embodiments, data profiling logic 437 may involve the extraction and analysis of metadata from data sources, such as databases, files, or streams, to understand the structure, schema, and semantics of data fields and attributes. This includes identifying data types, lengths, formats, and patterns within the data, as well as detecting anomalies or inconsistencies that may indicate data quality issues or discrepancies. Data profiling logic 437 may also involve capturing statistics and summary metrics about data values, such as frequency distributions, cardinality, and uniqueness, to assess the diversity and variability of data within different fields or columns.

Additionally, in more embodiments, data profiling logic 437 can include mechanisms for data quality assessment, validation, and anomaly detection to identify and flag potential data quality issues and discrepancies. This may involve performing data quality checks and validations on sampled data to assess its accuracy, completeness, consistency, and timeliness. Data profiling logic 437 may incorporate predefined rules, thresholds, and criteria for detecting anomalies such as missing values, outliers, duplicates, or data discrepancies, enabling organizations to pinpoint areas of concern and take corrective actions to improve data quality.

Moreover, in certain embodiments, data profiling logic 437 may encompass features for data pattern recognition, data standardization, and data cleansing to enhance the consistency and quality of data within the pipeline. This may involve identifying recurring patterns, formats, or structures within data values and applying standardization rules and transformations to ensure consistency and uniformity. Data profiling logic 437 may also involve data cleansing techniques such as data deduplication, data normalization, and data enrichment to remove redundancies, inconsistencies, and inaccuracies from the data, improving its overall quality and usability.

Furthermore, in some embodiments, data profiling logic 437 can include capabilities for data exploration, visualization, and reporting to communicate insights and findings about the data effectively. This may involve generating summary reports, visualizations, and dashboards that highlight characteristics, trends, and anomalies within the data, enabling stakeholders to gain a comprehensive understanding of the data profile. Data profiling logic 437 may also include features for interactive data exploration, allowing users to drill down into specific data attributes, segments, or patterns to uncover additional insights and anomalies.

Data profiling logic 437 in data pipelines can be configured to analyze, assess, and understand the characteristics and quality of data within the pipeline, enabling organizations to identify and address data quality issues proactively. By implementing robust data profiling logic 437, organizations can improve the accuracy, consistency, and reliability of data, enabling them to make informed decisions, derive actionable insights, and drive business value effectively.

In still more embodiments, a data classification logic 438 can refer to the set of processes, mechanisms, and configurations used to categorize, label, and tag data based on its sensitivity, importance, and regulatory requirements. Data classification logic 438 encompasses various components and functionalities aimed at ensuring that data is classified and treated appropriately throughout its lifecycle within the pipeline ecosystem.

Firstly, in many embodiments, data classification logic 438 may involve the definition and implementation of classification policies, rules, and criteria that determine how data is classified based on its attributes, characteristics, and usage. This includes specifying classification levels, such as public, internal, confidential, and sensitive, and defining criteria for assigning data to different classification categories based on factors such as data content, context, and sensitivity. Classification policies may also consider regulatory requirements, industry standards, and organizational policies governing data protection, privacy, and security.

Additionally, in more embodiments, data classification logic 438 can include mechanisms for automated classification of data based on predefined rules, patterns, or algorithms that analyze data attributes and content to determine its classification level. This may involve implementing machine learning models, natural language processing (NLP) techniques, or pattern recognition algorithms that can automatically classify data based on patterns, keywords, or metadata attributes. Automated classification helps streamline the classification process, reduce manual effort, and ensure consistency and accuracy in data classification across the pipeline.

Moreover, in certain embodiments, data classification logic 438 may encompass features for manual review, validation, and refinement of data classifications by data stewards, subject matter experts, or authorized users. This may involve providing tools and interfaces for users to review and validate automated classifications, correct misclassifications, and provide additional context or justification for classification decisions. Manual review processes enable organizations to address edge cases, exceptions, or ambiguities that cannot be handled effectively through automated classification alone, ensuring that data is classified accurately and appropriately.

Furthermore, in some embodiments, data classification logic 438 can include capabilities for enforcing access controls, data handling policies, and security measures based on data classification levels. This may involve integrating classification labels and tags into access control mechanisms, encryption policies, and data handling procedures to ensure that data is protected and handled in accordance with its classification level. For example, data classified as sensitive may be subject to stricter access controls, encryption requirements, and data retention policies compared to data classified as public or internal.

Data classification logic 438 in data pipelines can be configured to categorize, label, and tag data based on its sensitivity, importance, and regulatory requirements, enabling organizations to manage and protect data effectively throughout its lifecycle. By implementing robust data classification logic 438, organizations can ensure compliance with regulatory requirements, mitigate security risks, and protect sensitive information from unauthorized access, disclosure, or misuse within the pipeline ecosystem.

In numerous embodiments, a data catalog logic 439 can refer to the set of processes, mechanisms, and configurations used to manage, organize, and govern metadata about data assets within the pipeline ecosystem. Data catalog logic 439 encompasses various components and functionalities aimed at providing users with a centralized and searchable repository of metadata, enabling them to discover, understand, and leverage data assets effectively.

Firstly, in many embodiments, data catalog logic 439 may involve the extraction and ingestion of metadata from diverse data sources, such as databases, files, applications, and data warehouses, into a centralized catalog repository. This includes capturing metadata attributes such as data schemas, data types, relationships, lineage information, and usage statistics, as well as indexing and organizing metadata for efficient search and retrieval. Data catalog logic 439 may utilize automated metadata extraction tools, connectors, and adapters to ingest metadata from a wide range of sources, ensuring comprehensive coverage of data assets within the pipeline ecosystem.

Additionally, in more embodiments, data catalog logic 439 can include mechanisms for metadata enrichment, annotation, and curation to enhance the quality, relevance, and usability of metadata within the catalog. This may involve enriching metadata with additional contextual information, such as business glossaries, data dictionaries, and data lineage diagrams, to provide users with comprehensive insights into the meaning, context, and usage of data assets. Data catalog logic 439 may also support user-driven annotation and curation of metadata, allowing data stewards, subject matter experts, and users to contribute metadata annotations, tags, and annotations to enhance metadata quality and relevance.

Moreover, in certain embodiments, data catalog logic 439 may encompass features for metadata search, exploration, and discovery to enable users to find and access relevant data assets quickly and easily. This includes providing search interfaces, filters, and faceted navigation capabilities that allow users to search for data assets based on various criteria such as data types, attributes, tags, and usage patterns. Data catalog logic 439 may also include features for browsing metadata hierarchies, exploring data relationships, and visualizing data lineage, enabling users to understand the context and relationships between different data assets within the pipeline ecosystem.

Furthermore, in some embodiments, data catalog logic 439 can include capabilities for metadata governance, security, and compliance to ensure that metadata is managed, accessed, and protected in accordance with organizational policies and regulatory requirements. This may involve implementing access controls, data permissions, and audit trails to govern access to metadata and track changes and usage patterns over time. Data catalog logic 439 may also include features for data lineage tracking, impact analysis, and versioning, enabling organizations to ensure data integrity, traceability, and accountability across the data lifecycle.

Data catalog logic 439 in data pipelines can be configured to provide users with a centralized, searchable, and comprehensive repository of metadata about data assets within the pipeline ecosystem. By implementing robust data catalog logic 439, organizations can enable users to discover, understand, and leverage data assets effectively, driving data-driven insights, decision-making, and innovation within the organization.

In still yet more embodiments, an error generation logic 441 can refer to the set of processes, mechanisms, and configurations used to simulate, generate, and inject errors or anomalies into the data pipeline environment for testing, validation, and troubleshooting purposes. Error generation logic 441 encompasses various components and functionalities aimed at assessing the resilience, robustness, and fault tolerance of data pipeline systems under different error conditions and failure scenarios.

Firstly, in many embodiments, error generation logic 441 may involve the definition and configuration of error scenarios, conditions, and triggers that specify when and how errors are generated within the data pipeline environment. This includes defining error types, such as data format errors, data quality errors, network errors, or system errors, as well as specifying conditions or thresholds for triggering error generation, such as random intervals, specific data patterns, or predefined error injection points within the pipeline workflow.

Additionally, in more embodiments, error generation logic 441 can include mechanisms for injecting errors or anomalies into data streams, files, or databases at various points within the data pipeline workflow. This may involve introducing artificial errors, inconsistencies, or corruptions into data sources, transformations, or processing steps to simulate real-world error conditions and test the resilience and fault tolerance of the pipeline. Error generation logic 441 may utilize techniques such as data mutation, data corruption, or data injection to introduce errors into data streams or files, enabling organizations to evaluate the impact of errors on data processing and downstream systems.

Moreover, in certain embodiments, error generation logic 441 may encompass features for monitoring, tracking, and analyzing error events and their impact on data pipeline operations. This may involve capturing error logs, error messages, and error metadata generated during error injection experiments, as well as analyzing error patterns, frequencies, and correlations to identify common failure scenarios and areas of vulnerability within the pipeline. Error generation logic 441 may also include capabilities for root cause analysis, diagnosis, and remediation of errors, enabling organizations to identify underlying causes of errors and implement corrective actions to improve pipeline reliability and resilience.

Furthermore, in some embodiments, error generation logic 441 can include functionalities for evaluating the effectiveness of error handling mechanisms, recovery strategies, and contingency plans within the data pipeline environment. This may involve assessing how well the pipeline responds to error conditions, recovers from failures, and maintains data integrity and consistency under adverse circumstances. Error generation logic 441 may involve measuring performance indicators (KPIs) such as error recovery time, data loss rates, and system availability during error injection experiments, enabling organizations to validate and refine error handling procedures and strategies.

Error generation logic 441 in data pipelines can be configured to simulate, generate, and inject errors or anomalies into the pipeline environment for testing, validation, and improvement purposes. By implementing robust error generation logic 441, organizations can assess the resilience, robustness, and fault tolerance of data pipeline systems under different error conditions and failure scenarios, enabling them to identify and address weaknesses, improve system reliability, and enhance data quality and integrity.

The data store 450 may be configured as a physical storage device within the device 440 as depicted in the embodiment of FIG. 4. In additional embodiments, the data store 450 may be a separate or external device physically connected to the device 440. In further additional embodiments, the data store 450 may be situation in a remote client, such as a cloud-based server and provides data read/write access upon demand of the device 440. As those skilled in the art will recognize, the format and type of data available within the data store 450 can vary greatly and may be configured as needed, including combining one or more data structures together.

In a number of embodiments, data source data 451 can refer to the raw or primary data that is ingested, extracted, or collected from various sources to be processed, transformed, and loaded into the pipeline for further analysis, storage, or dissemination. Data source data 451 can originate from a wide range of heterogeneous sources, including databases, files, applications, APIs, sensors, IoT devices, and streaming platforms, each containing different types of structured, semi-structured, or unstructured data.

Data source data 451 may include transactional data generated by operational systems, such as customer orders, sales transactions, financial transactions, or inventory records, providing a record of business activities and operations. It may also encompass master data, such as customer profiles, product catalogs, or employee records, serving as reference data for maintaining consistency and accuracy across the organization.

Furthermore, in some embodiments, data source data 451 can include log data generated by IT systems, applications, or infrastructure components, capturing events, activities, and performance metrics for monitoring, troubleshooting, and analysis purposes. Log data may include server logs, application logs, network logs, security logs, or audit logs, providing insights into system behavior, user interactions, and operational metrics.

Additionally, in more embodiments, data source data 451 may comprise external data obtained from third-party sources, such as market data providers, data brokers, government agencies, or public datasets, enriching internal data with external context and insights. External data may include demographic data, economic indicators, weather data, geospatial data, or social media data, providing valuable context and external factors that influence business operations and decision-making.

Moreover, in certain embodiments, data source data 451 can include streaming data generated in real-time or near-real-time by sensors, IoT devices, social media feeds, or other streaming sources, capturing continuous streams of events, signals, or messages. Streaming data may include telemetry data, sensor readings, social media updates, or financial market feeds, enabling organizations to monitor, analyze, and respond to events and trends as they can occur.

Data source data 451 in data pipelines is comprised of a diverse array of raw or primary data obtained from various sources, including operational systems, logs, external sources, and streaming platforms. By ingesting and processing data source data 451 within the pipeline, organizations can extract valuable insights, derive actionable intelligence, and drive informed decision-making and business outcomes.

In numerous embodiments, loading data 452 can refer to the process of ingesting, transforming, and loading staged or processed data into target storage or destination systems for storage, analysis, or dissemination. Loading data 452 represents the final stage of the data processing workflow, where data is transferred from temporary or intermediate storage repositories, such as staging tables or temporary files, to permanent storage or destination systems, such as data warehouses, data lakes, or analytical databases. Loading data 452 may involve various operations and transformations to ensure that the data is properly formatted, structured, and stored for efficient retrieval and analysis.

Loading data 452 may involve data transformation processes to convert data from its staged or processed format into a format suitable for storage or analysis in the target system. This can include formatting data into the appropriate schema, data types, and data structures required by the target system, as well as performing any necessary data conversions, aggregations, or calculations to derive derived fields or metrics. Loading data 452 may also involve applying business rules, validation checks, or data quality controls to ensure the integrity and accuracy of the data being loaded into the target system.

Furthermore, in some embodiments, loading data 452 may involve data integration processes to combine data from multiple sources or partitions into a unified dataset for storage or analysis. This can include merging data from different staging tables or files, joining data from disparate sources or systems, or consolidating data from different partitions or segments into a single dataset. Loading data 452 may also involve data deduplication, where duplicate records or entries are identified and removed to ensure data consistency and eliminate redundancy in the target system.

Additionally, in more embodiments, loading data 452 may involve data loading mechanisms or tools that facilitate the efficient and scalable transfer of data from the staging environment to the target system. This can include bulk loading techniques, parallel processing, or data streaming approaches that optimize data transfer performance and throughput. Loading data 452 may also involve data loading schedules or schedules that automate the loading process, ensuring that data is loaded into the target system in a timely and reliable manner.

Moreover, in certain embodiments, loading data 452 may involve data loading strategies or methodologies that prioritize data loading based on business priorities, data freshness requirements, or system performance considerations. This can include incremental loading techniques, where only new or updated data is loaded into the target system, or batch loading approaches, where data is loaded in predefined batches or intervals. Loading data 452 may also involve data validation and reconciliation processes to verify that the data loaded into the target system matches the expected results and meets the specified criteria.

Loading data 452 in data pipelines may involve the process of transferring staged or processed data into target storage or destination systems for storage, analysis, or dissemination. By effectively loading data 452 into the target system, organizations can ensure that data is stored, managed, and accessed efficiently, enabling them to derive valuable insights, make informed decisions, and drive business outcomes effectively.

In numerous embodiments, staging data 453 can refer to an intermediate stage in the data processing workflow where raw or source data is transformed, cleansed, and prepared for further processing or loading into downstream systems. Staging data 453 can serve as a transitional phase between the raw data extracted from source systems and the processed data ready for analysis, storage, or dissemination. Staging data 453 typically undergoes several transformations and enhancements to improve its quality, consistency, and usability before being consumed by downstream applications or analytics processes.

Staging data 453 may include various types of data transformations and operations performed on the raw data to prepare it for further processing. This can involve data cleansing, where inconsistencies, errors, or missing values are identified and corrected to ensure data quality and integrity. Data transformations may also include data enrichment, where additional information or attributes are added to the raw data to enhance its context and relevance for analysis. For example, staging data 453 may involve enriching customer records with demographic information or product data with pricing details.

Furthermore, in some embodiments, staging data 453 may involve data normalization or standardization processes to ensure consistency and uniformity across different data sources and formats. This can include standardizing data formats, units of measurement, or naming conventions to facilitate integration and analysis of heterogeneous data. Staging data 453 may also involve data aggregation or summarization to condense large volumes of raw data into more manageable and meaningful datasets for analysis or reporting purposes.

Additionally, in more embodiments, staging data 453 may incorporate data validation and error checking mechanisms to detect and correct data anomalies or discrepancies before proceeding with further processing. This can involve applying validation rules, constraints, or checks to verify the accuracy, completeness, and consistency of the data, and flagging or resolving any data quality issues encountered during processing. Staging data 453 may also include logging and auditing mechanisms to track data transformations, errors, and processing outcomes for monitoring, troubleshooting, and accountability purposes.

Moreover, in certain embodiments, staging data 453 may be stored in temporary or transient storage repositories such as staging tables, temporary files, or in-memory buffers during the data processing workflow. Staging data 453 may be stored in relational databases, data lakes, or distributed file systems, depending on the volume, velocity, and variety of the data being processed. Staging data 453 repositories may also support parallel processing, partitioning, or sharding to optimize data processing performance and scalability.

Staging data 453 in data pipelines represents an intermediate stage where raw or source data is transformed, cleansed, and prepared for further processing or loading into downstream systems. By leveraging staging data 453 effectively, organizations can ensure the quality, consistency, and usability of data throughout the data processing workflow, enabling them to derive valuable insights, make informed decisions, and drive business outcomes effectively.

In additional embodiments, foundation data 454 can refer to the core or foundational layer of data that can serve as the basis for analytics, reporting, and decision-making within an organization. Foundation data 454 represents a curated, integrated, and harmonized dataset that combines data from various sources and systems to provide a comprehensive and unified view of business entities, relationships, and transactions. Foundation data 454 is typically structured, cleansed, and standardized to ensure consistency, accuracy, and reliability for downstream analytics and reporting processes.

Foundation data 454 may include master data entities such as customer, product, employee, or supplier data, which serve as the foundational building blocks for business operations and analysis. Master data entities represent business entities or objects that are shared and used across multiple business processes and applications, serving as the authoritative source of information for related data attributes and relationships. Foundation data 454 may also include reference data, such as industry codes, classifications, or standards, which provide additional context and metadata for interpreting and analyzing the primary data.

Furthermore, in some embodiments, foundation data 454 may encompass transactional data, such as sales transactions, purchase orders, invoices, or shipments, which capture the operational activities and transactions of the organization. Transactional data represents the day-to-day business interactions and processes that generate revenue, incur expenses, or drive business outcomes, providing a detailed record of business activities and events. Foundation data 454 may also include historical data, which captures past transactions, events, or trends over time, enabling organizations to analyze historical performance, identify patterns, and make informed decisions based on historical insights.

Additionally, in more embodiments, foundation data 454 may include derived or calculated data elements that are derived from raw or source data through data transformation or aggregation processes. This can include calculated metrics, performance indicators (KPIs), or aggregated measures that provide summarized views or insights into business performance or operational efficiency. Foundation data 454 may also include metadata attributes such as data lineage, data quality scores, or data usage statistics, which provide additional context and information about the source, quality, and usage of the data.

Moreover, in certain embodiments, foundation data 454 may be stored in dedicated data repositories or data stores designed to support the storage, management, and access of foundational data assets. This can include relational databases, data warehouses, or data lakes that are optimized for storing structured, semi-structured, or unstructured data and enabling efficient querying, analysis, and reporting. Foundation data 454 repositories may also incorporate data governance, security, and compliance mechanisms to ensure that data is managed and protected in accordance with organizational policies and regulatory requirements.

Foundation data 454 in data pipelines represents the core or foundational layer of data that can serve as the basis for analytics, reporting, and decision-making within an organization. By establishing a solid foundation of integrated, harmonized, and curated data assets, organizations can derive valuable insights, make informed decisions, and drive business outcomes effectively and efficiently.

In further embodiments, vault data 455 can refer to a specialized data storage and modeling approach used to organize and manage data in a way that supports scalability, flexibility, and agility for analytics, reporting, and decision-making. Vault data 455 modeling is based on the principles of Data Vault methodology, which focuses on creating a robust and scalable foundation for data integration and analytics by separating raw data storage from business logic and analytics layers. Vault data 455 comprises a structured, standardized, and integrated dataset that can serve as a central repository for capturing, storing, and managing enterprise data assets.

Vault data 455 typically consists of three main types of tables: Hubs, Links, and Satellites, which represent different aspects of the data model and its relationships. Hubs store unique business keys or identifiers for business entities, such as customers, products, or transactions, providing a central point of reference for identifying and accessing related data. Links represent the relationships or associations between different business entities, enabling the modeling of complex relationships and hierarchies within the data. Satellites store additional attributes or metadata about the business entities captured in the Hubs and Links, providing context, history, and descriptive information for the data.

Furthermore, in some embodiments, vault data 455 may include historical snapshots or versions of data that capture changes, updates, or revisions to the data over time. This enables organizations to track and analyze historical trends, patterns, and behaviors within the data, supporting longitudinal analysis and trend identification. Vault data 455 may also incorporate mechanisms for handling slowly changing dimensions (SCDs), which track changes to dimension attributes over time and ensure that historical data remains accurate and consistent for reporting and analysis purposes.

Additionally, in more embodiments, vault data 455 may encompass data governance, metadata management, and lineage tracking capabilities to ensure that data is managed, documented, and traced throughout its lifecycle. This includes capturing metadata attributes such as data lineage, data quality scores, or data ownership information, as well as implementing data governance policies, standards, and controls to ensure data integrity, security, and compliance. Vault data 455 may also support data lineage tracking, impact analysis, and versioning to enable organizations to understand the origins, transformations, and usage of data within the pipeline.

Moreover, in certain embodiments, vault data 455 may be stored in dedicated data repositories or data warehouses that are optimized for storing, managing, and analyzing large volumes of structured and semi-structured data. This can include columnar databases, distributed file systems, or cloud-based data platforms that provide scalable storage, parallel processing, and advanced analytics capabilities for handling complex data models and queries. Vault data 455 repositories may also incorporate data virtualization, data federation, or data caching techniques to optimize data access and query performance for analytical workloads.

Vault data 455 in data pipelines represents a structured, standardized, and integrated dataset that can serve as a central repository for capturing, storing, and managing enterprise data assets. By adopting a Data Vault approach to data modeling and management, organizations can create a flexible, scalable, and agile foundation for analytics, reporting, and decision-making, enabling them to derive valuable insights, make informed decisions, and drive business outcomes effectively.

In certain embodiments, end user data 456 can refer to the data that is tailored and optimized for consumption by end users, such as business analysts, decision-makers, or other stakeholders, to support their analytical, reporting, and decision-making needs. End user data 456 represents the final output of the data pipeline process, which has been transformed, aggregated, and formatted to meet the specific requirements and preferences of end users for analysis, visualization, or reporting purposes. End user data 456 is typically presented in a user-friendly format, such as dashboards, reports, or interactive visualizations, to enable end users to derive insights and make informed decisions effectively.

End user data 456 may include aggregated or summarized data that has been processed and aggregated from raw or source data to provide a consolidated view of metrics, trends, or performance indicators. This can include summary tables, performance indicators (KPIs), or executive dashboards that provide at-a-glance insights into the overall health, status, or performance of the organization. End user data 456 may also include drill-down capabilities or interactive features that enable end users to explore and analyze data in more detail and gain deeper insights into underlying trends or patterns.

Furthermore, in some embodiments, end user data 456 may encompass derived or calculated metrics that have been derived from raw or source data through data transformation or calculation processes. This can include calculated fields, ratios, or indicators that provide additional context or insights into business performance, efficiency, or effectiveness. End user data 456 may also include predictive or prescriptive analytics models that leverage advanced statistical techniques or machine learning algorithms to forecast future trends, identify anomalies, or recommend optimal courses of action.

Additionally, in more embodiments, end user data 456 may incorporate metadata attributes, annotations, or documentation that provide context, descriptions, or explanations for the data being presented. This can include data dictionaries, business glossaries, or annotations that define the meaning, usage, or interpretation of data attributes and metrics. End user data 456 may also include data lineage information, which traces the origins, transformations, and processing steps applied to the data, enabling end users to understand the lineage and trustworthiness of the data being presented.

Moreover, in certain embodiments, end user data 456 may be delivered through various channels or platforms that are accessible and convenient for end users to access and interact with. This can include web-based portals, business intelligence (BI) tools, or mobile applications that provide intuitive interfaces, visualization capabilities, and self-service features for end users to explore, analyze, and interact with data. End user data 456 delivery platforms may also support collaboration, sharing, and dissemination of insights among end users, enabling teams to collaborate, share insights, and make data-driven decisions collectively.

End user data 456 in data pipelines represents the final output of the data pipeline process, which has been tailored and optimized for consumption by end users to support their analytical, reporting, and decision-making needs. By presenting data in a user-friendly and actionable format, organizations can empower end users to derive insights, make informed decisions, and drive business outcomes effectively and efficiently.

In still further embodiments, the access layer data 457 can refer to the portion of the data architecture that facilitates the interaction between end users and the underlying data assets. This layer can serve as a bridge between the back-end data storage and processing systems and the front-end tools and applications used by end users for analysis, reporting, and decision-making. Access layer data 457 is designed to provide end users with seamless and efficient access to relevant data assets, while also ensuring security, performance, and scalability.

Access layer data 457 may include views or virtual representations of the underlying data stored in the data repositories or data warehouses. These views are tailored to meet the specific needs and preferences of end users, providing a simplified and optimized interface for querying, analyzing, and visualizing data. Views in the access layer may include pre-defined queries, filters, or aggregations that enable end users to access and retrieve data without needing to understand the underlying data model or query language.

Furthermore, in some embodiments, access layer data 457 may encompass performance indexes or optimization techniques that enhance the performance and efficiency of data access operations. This can include indexing strategies, query optimization techniques, or caching mechanisms that improve the speed and responsiveness of data queries and retrieval. Performance indexes may be created on fields or attributes to accelerate data retrieval and aggregation, while caching mechanisms may store frequently accessed data in memory to reduce latency and improve responsiveness.

Additionally, in more embodiments, access layer data 457 may include aggregates or summary tables that pre-calculate and store aggregated data for commonly used queries or reports. Aggregates enable end users to quickly retrieve summary statistics, totals, or averages without needing to perform expensive calculations on the raw data. Summary tables may be periodically refreshed or updated to reflect changes in the underlying data, ensuring that end users have access to accurate and up-to-date information.

Moreover, in certain embodiments, access layer data 457 may encompass OLAP (Online Analytical Processing) cubes or multidimensional data structures that enable interactive and exploratory analysis of data. OLAP cubes organize data into multiple dimensions, such as time, geography, or product category, allowing end users to slice, dice, and drill down into the data to uncover insights and trends. OLAP cubes support complex analytical queries and calculations, enabling end users to perform ad-hoc analysis and explore data from different perspectives.

Furthermore, in some embodiments, access layer data 457 may include exports or data extracts that enable end users to export or download data for further analysis or sharing outside of the data pipeline environment. Exports may be formatted in different file formats, such as CSV, Excel, or PDF, to accommodate the diverse needs and preferences of end users. Data extracts may include subsets of data or custom reports tailored to specific user requirements, enabling end users to access and analyze data offline or in external tools and applications.

Access layer data 457 in data pipelines can serve as the interface between end users and the underlying data assets, providing a simplified, optimized, and efficient means of accessing, querying, and analyzing data. By providing seamless and intuitive access to data, organizations can empower end users to derive insights, make informed decisions, and drive business outcomes effectively and efficiently.

In more additional embodiments, reporting data 458 can refer to the structured, processed, and aggregated datasets that are specifically tailored for generating reports, dashboards, and visualizations to support decision-making and analysis within an organization. Reporting data 458 represents the culmination of the data pipeline process, where raw or source data is transformed, cleansed, and aggregated to provide meaningful insights and metrics for reporting purposes. Reporting data 458 is optimized for presentation and analysis, enabling end users to easily understand and interpret the information presented in reports and visualizations.

Reporting data 458 may include pre-aggregated or summarized datasets that have been processed and aggregated from raw or source data to provide metrics, trends, and performance indicators. These aggregates may include totals, averages, counts, or percentages that provide a high-level overview of business operations, outcomes, or trends. Reporting data 458 may also include time-series data that tracks changes or trends over time, enabling organizations to analyze historical performance and identify patterns or anomalies.

Furthermore, in some embodiments, reporting data 458 may encompass calculated or derived metrics that are computed from raw or source data through data transformation or calculation processes. These calculated metrics may include ratios, percentages, or other derived indicators that provide additional context or insights into business performance or operational efficiency. Reporting data 458 may also incorporate predictive analytics models or forecasting techniques that anticipate future trends or outcomes based on historical data patterns.

Additionally, in more embodiments, reporting data 458 may include dimensional data structures that organize data into hierarchies or categories for analysis and visualization. Dimensional data enables users to slice, dice, and drill down into the data to explore different perspectives and dimensions, such as time, geography, or product category. Dimensional data may be organized into star schemas, snowflake schemas, or other dimensional models that facilitate interactive and exploratory analysis of data.

Moreover, in certain embodiments, reporting data 458 may encompass metadata attributes, annotations, or documentation that provide context, descriptions, or explanations for the data being presented in reports and visualizations. This metadata may include data dictionaries, business glossaries, or annotations that define the meaning, usage, or interpretation of data attributes and metrics. Reporting data 458 may also include data lineage information, which traces the origins, transformations, and processing steps applied to the data, enabling users to understand the lineage and trustworthiness of the data being presented.

Reporting data 458 in data pipelines represents the processed, aggregated, and optimized datasets that are used to generate reports, dashboards, and visualizations for decision-making and analysis within an organization. By providing meaningful insights and metrics in a format that is easily understandable and actionable, reporting data 458 enables organizations to monitor performance, identify trends, and make informed decisions that drive business outcomes effectively and efficiently.

Although a specific embodiment for a device 440 suitable for data pipeline quality management which may also be suitable for carrying out the various steps, processes, methods, and operations described herein is discussed with respect to FIG. 4, any of a variety of systems and/or processes may be utilized in accordance with embodiments of the disclosure. For example, the exact configuration of data and logics may vary from deployment to deployment, usually based on the specific application or industry being serviced. The elements depicted in FIG. 4 may also be interchangeable with other elements of FIGS. 1-3 and 5-18 as required to realize a particularly desired embodiment.

Figure 5:
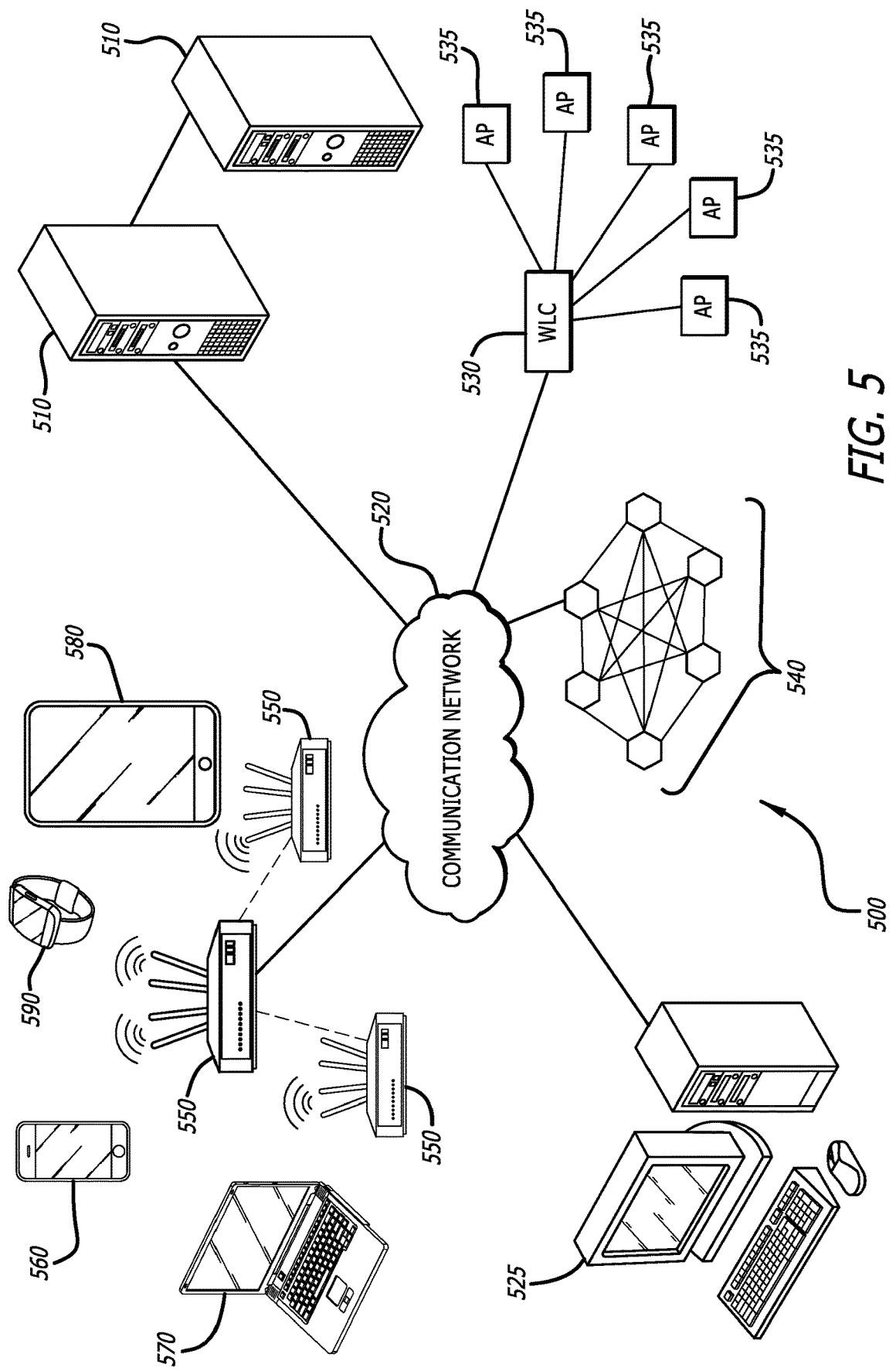
FIG. 5 is a conceptual network diagram of various environments that a data quality management logic may operate on a plurality of network devices, in accordance with various embodiments of the disclosure.

Referring to FIG. 5, a conceptual network diagram 500 of various environments that a data quality management logic may operate on a plurality of network devices, in accordance with various embodiments of the disclosure is shown. Those skilled in the art will recognize that the data quality management logic can include various hardware and/or software deployments and can be configured in a variety of ways. In many embodiments, the data quality management logic can be configured as a standalone device, exist as a logic in another network device, be distributed among various network devices operating in tandem, or remotely operated as part of a cloud-based network management tool. In further embodiments, one or more servers 510 can be configured with the data quality management logic or can otherwise operate as the networking logic. In many embodiments, the data quality management logic may operate on one or more servers 510 connected to a communication network 520 (shown as the "Internet"). The communication network 520 can include wired networks or wireless networks. The data quality management logic can be provided as a cloud-based service that can service remote networks, such as, but not limited to a deployed network 540.

However, in additional embodiments, the data quality management logic may be operated as a distributed logic across multiple network devices. In the embodiment depicted in FIG. 5, a plurality of network access points (APs) 550 can operate as the data quality management logic in a distributed manner or may have one specific device operate as the data quality management logic for all of the neighboring or sibling APs 550. The APs 550 may facilitate Wi-Fi connections for various electronic devices, such as but not limited to, mobile computing devices including laptop computers 570, cellular phones 560, portable tablet computers 580 and wearable computing devices 590.

In further embodiments, the data quality management logic may be integrated within another network device. In the embodiment depicted in FIG. 5, a wireless LAN controller (WLC) 530 may have an integrated data quality management logic that the WLC 530 can use to monitor or control power consumption of the APs 535 that the WLC 530 is connected to, either wired or wirelessly. In still more embodiments, a personal computer 525 may be utilized to access and/or manage various aspects of the networking logic, either remotely or within the network itself. In the embodiment depicted in FIG. 5, the personal computer 525 communicates over the communication network 520 and can access the data quality management logic of the servers 510, or the network APs 550, or the WLC 530.

Although a specific embodiment for various environments that the data quality management logic may operate on a plurality of network devices suitable for carrying out the various steps, processes, methods, and operations described herein is discussed with respect to FIG. 5, any of a variety of systems and/or processes may be utilized in accordance with embodiments of the disclosure. In many non-limiting examples, the data quality management logic may be provided as a device or software separate from the WLC 530 or the data quality management logic may be integrated into a server 510. The elements depicted in FIG. 5 may also be interchangeable with other elements of FIGS. 1-4 and FIGS. 6-18 as required to realize a particularly desired embodiment.

Figure 6:
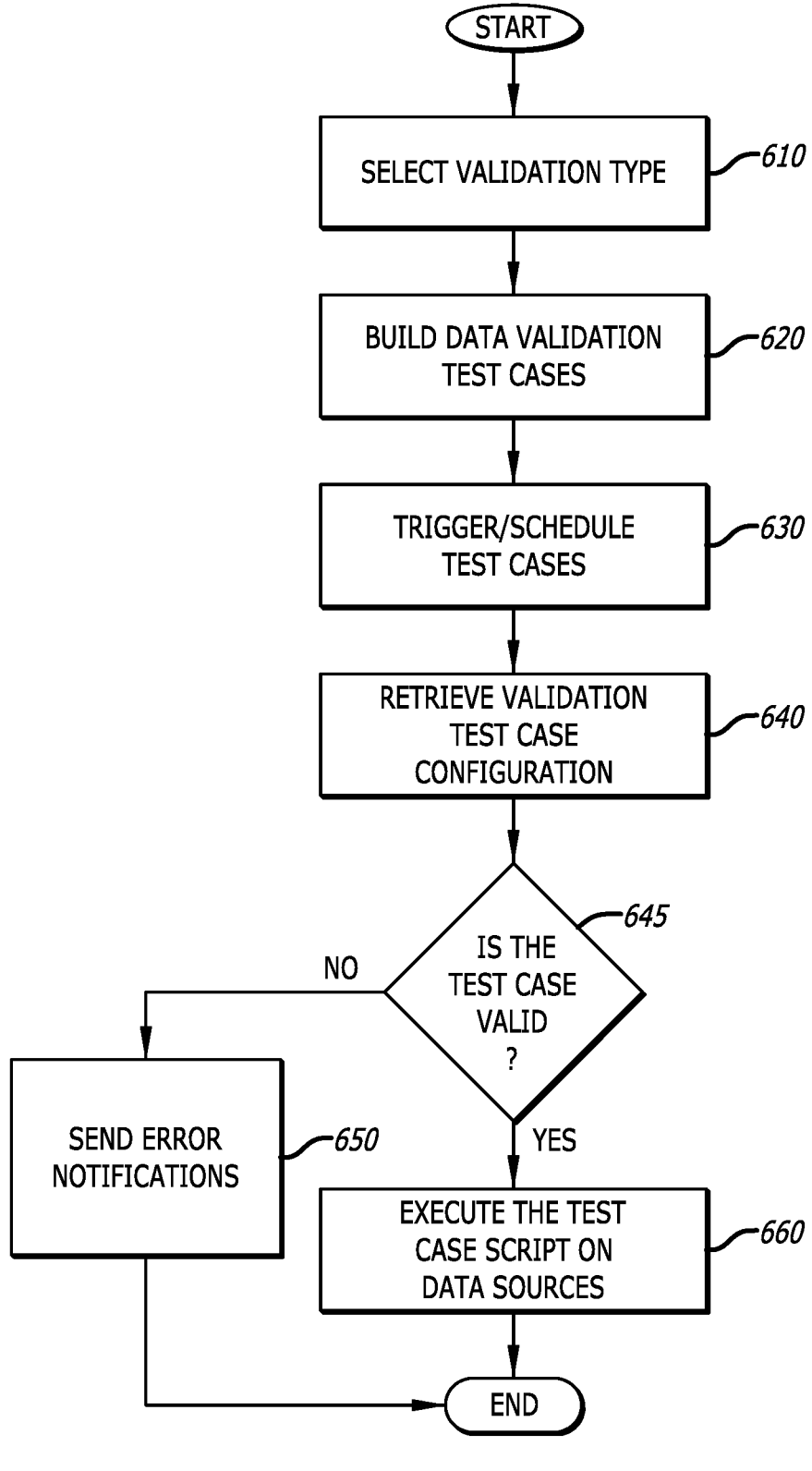
FIG. 6 is a flowchart depicting a process for executing a test case script in accordance with various embodiments of the disclosure.

Referring to FIG. 6, a flowchart depicting a process 600 for executing a test case script in accordance with various embodiments of the disclosure is shown. In many embodiments, the process 600 can select a validation type (block 610). In some embodiments, the validation type can be selected from a variety of types including, but not limited to source to target, data quality, business rule, and/or file monitoring.

In a number of embodiments, the process 600 can build data validation test cases (block 620). In certain embodiments, this can be done using custom scripts for different types of validation. However, those skilled in the art will recognize that other builds of validation test cases may be utilized as needed.

In more embodiments, the process 600 can trigger/schedule the test cases (block 630). This can be done to validate the data pipelines after an extract, load, transform (ELT) process. However, other processes may occur prior to the validation and/or triggering of test cases.

In additional embodiments, the process 600 can retrieve validation test case configurations (block 640). Configuring validation test cases can help to ensure the accuracy, reliability, and robustness of data pipeline quality and management. These configurations may encompass various aspects of testing, including input data, boundary conditions, data formats, transformation logic, error handling, performance metrics, data quality checks, integration tests, regression tests, and environment configurations. Test case configurations can be designed to cover different scenarios, such as valid and invalid data inputs, boundary conditions, diverse data formats, and edge cases to verify the correctness of transformation logic, business rules, and error handling mechanisms.

Additionally, performance metrics and benchmarks can be defined to evaluate the throughput, latency, and resource utilization of the pipeline under different workload conditions. Data quality checks and validation rules ensure the accuracy, completeness, and consistency of processed data, while integration tests validate end-to-end data flows and interactions between pipeline components. Regression tests help detect and prevent regressions or unintended side effects, and testing in various environments ensures consistency and reliability across deployment environments. Through these configurations, data quality management logics can comprehensively assess the functionality, performance, and reliability of one or more data pipelines, ensuring the integrity and quality of processed data.

In further embodiments, the process 600 can determine if the test case script is valid (block 645). In response to it being determined that the test case script is not valid, then the process 600 can send an error notification (block 650). This notification can be generated and transmitted through various means such as, but not limited to, an application notification, an email, a text message, or the like.

However, if it is determined that a test case script is valid, then the process 600 can execute the test case script on one or more data sources (block 660). In various embodiments, this can be done through one or more built-in data connectors. However, other executions can be done locally or through other data connections.

Although a specific embodiment for a process 600 for executing a test case script suitable for carrying out the various steps, processes, methods, and operations described herein is discussed with respect to FIG. 6, any of a variety of systems and/or processes may be utilized in accordance with embodiments of the disclosure. For example, the process 600 may be carried out entirely by a single logic, or may be executed by multiple logics that may be remotely located. The elements depicted in FIG. 6 may also be interchangeable with other elements of FIGS. 1-5 and FIGS. 7-18 as required to realize a particularly desired embodiment.

Figure 7:
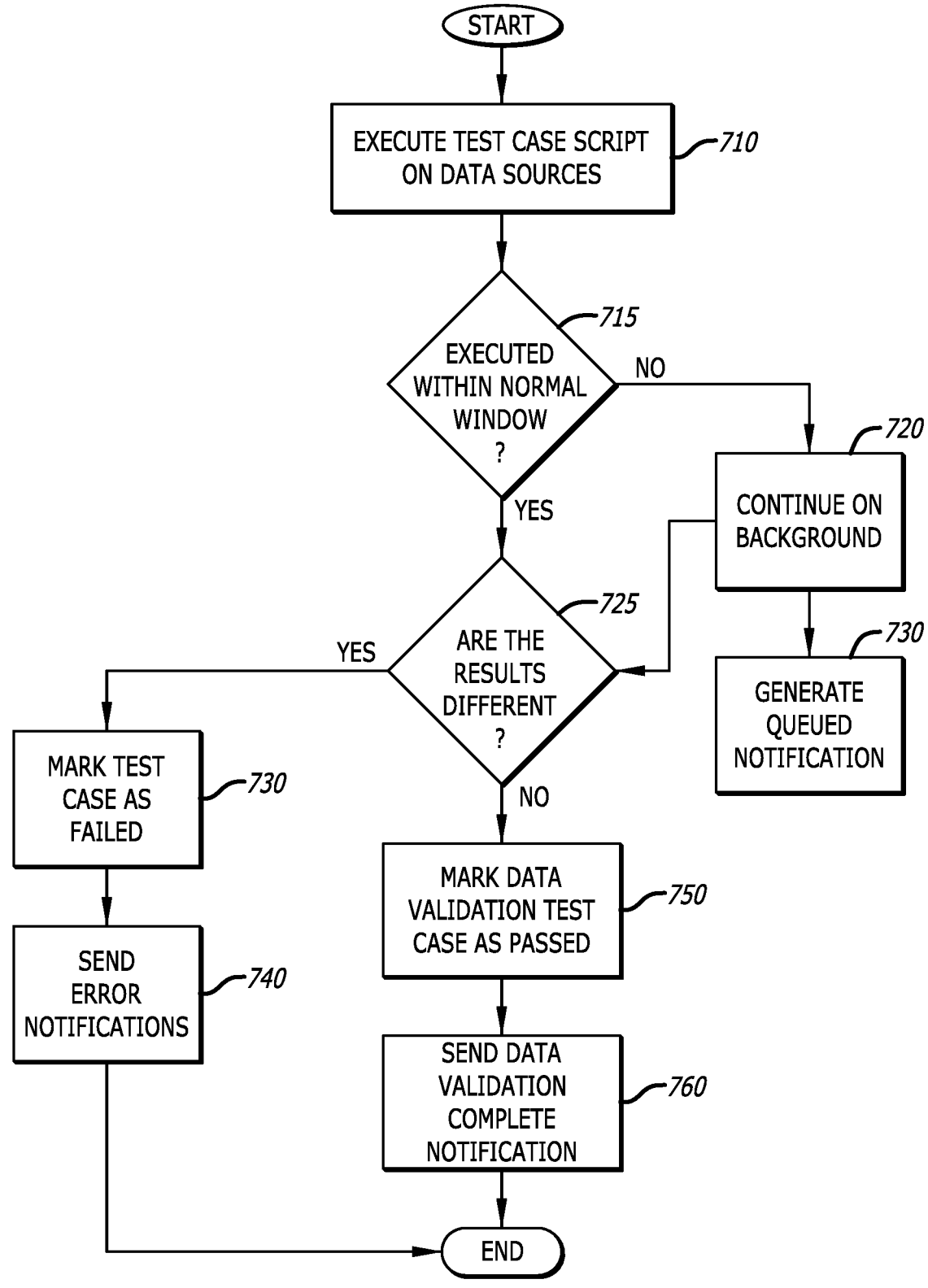
FIG. 7 is a flowchart depicting a process for validating data in accordance with various embodiments of the disclosure.

Referring to FIG. 7, a flowchart depicting a process 700 for validating data in accordance with various embodiments of the disclosure is shown. In many embodiments, the process 700 can execute the test case script on one or more data sources (block 710). As discussed above with respect to FIG. 6, this can be done through one or more built-in data connectors. In various embodiments, other executions can be done locally or through other data connections.

In a number of embodiments, the process 700 can determined if the execution occurred within a normal window (block 715). This can be an expected timeframe of occurrence or within some other parameter or boundary that is expected based on the executed test case script. In response to determining that the execution has not happened within a normal window, the process 700 can continue to execute the test case script in the background (block 720). In response to this, various embodiments of the process 700 can generate a queued notification (block 730) which can indicate that the execution is now in a queued state.

However, if it is determined that the test case script is executing within a normal window, the process 700 can further determine if the results are different or not as expected (block 725). In some embodiments, the process 700 may also make this determination upon completion of a test case script execution that has completed running in the background. If the results are different or not as expected, the process 700 can mark the test case as failed (block 730). In certain embodiments, the process 700 may also generate a comparison chart and source data trends related to the failure. Subsequently, some embodiments of the process 700 can send an error notification (block 740). This notification can be generated and transmitted through various means such as, but not limited to, an application notification, an email, a text message, or the like.

However, when it is determined that the test results are not different or are as expected, then the process 700 can mark the data validation test case as passed (block 750). The process 700 may also subsequently generate a comparison table and source data trends. In additional embodiments, the process 700 can send a data validation completion notification (block 760). This notification can also be generated and transmitted through various means such as, but not limited to, an application notification, an email, a text message, or the like.

Although a specific embodiment for a process 700 for validating data suitable for carrying out the various steps, processes, methods, and operations described herein is discussed with respect to FIG. 7, any of a variety of systems and/or processes may be utilized in accordance with embodiments of the disclosure. For example, the boundaries of what constitutes a pass and/or fail may be adjusted dynamically based on or more conditions, or can vary based on the industry being served or the preference of a network administrator. The elements depicted in FIG. 7 may also be interchangeable with other elements of FIGS. 1-6 and FIGS. 8-18 as required to realize a particularly desired embodiment.

Figure 8:
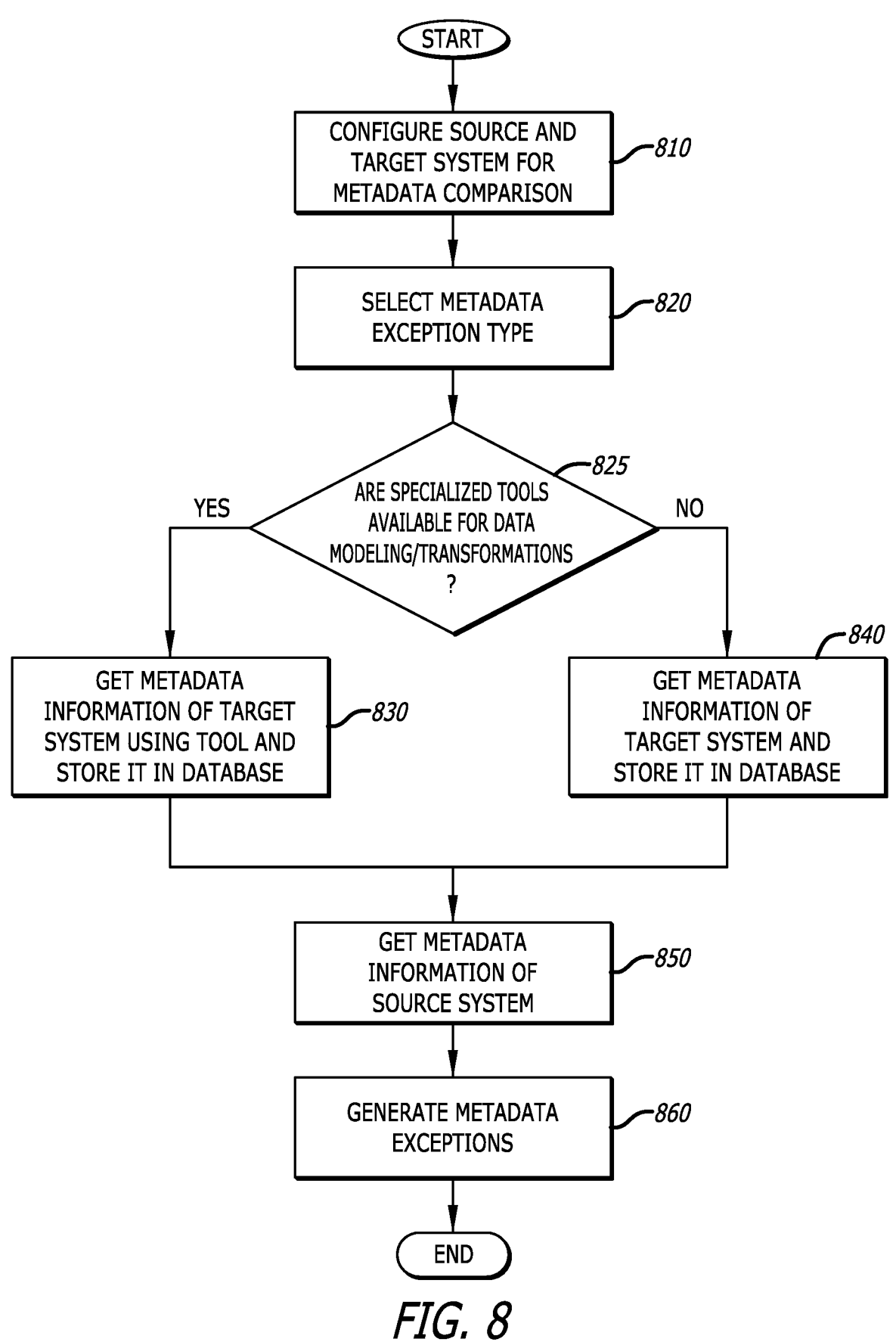
FIG. 8 is a flowchart depicting a process for generating metadata exceptions in accordance with various embodiments of the disclosure.

Referring to FIG. 8, a flowchart depicting a process 800 for generating metadata exceptions in accordance with various embodiments of the disclosure is shown. In many embodiments, the process 800 can configure source and target systems for metadata comparison (block 810). When evaluating metadata in a data pipeline, comparing source and target systems can involve examining the characteristics, attributes, and properties of the data sources and destinations within the pipeline.

The source system typically refers to the original data repositories or sources from which data is extracted or ingested into the pipeline. This could include databases, applications, files, or external services where the raw or source data originates. The target system, on the other hand, may represent the destination or final storage location where data is loaded or transformed within the pipeline. This could be a data warehouse, data lake, analytical database, or any other repository where processed or transformed data is stored for further analysis, reporting, or decision-making purposes. Comparing metadata between the source and target systems can involves assessing factors such as schema definitions, data types, field mappings, data transformations, data quality rules, and other metadata attributes to ensure consistency, accuracy, and alignment between the data at different stages of the pipeline.

In a number of embodiments, the process 800 can select a metadata exception type (block 820). As those skilled in the art will recognize, the metadata exception type can vary and include, but is not limited to, having one or more column missing, detecting a primary key mismatch, finding a column data type mismatch, or a column size mismatch, etc. Each of these types of exceptions can be monitored as desired.

In more embodiments, the process 800 can determine if there are specialized tools available for data modeling and/or transformations (block 825). For example, specialized tools related to an extract, load, transform (ELT) or extract, transform, load (ETL) may be available. However, other tools may be available depending on the type of data being evaluated.

In response to one or more specialized tools being available, the process 800 can get metadata information of the target system using the specialized tool and store it in a database (block 830). However, when there is no specialized tool available, the process 800 can get the metadata information of the target system and store it in a database (block 840). In either event though, regardless of whether a specialized tool is available or not, then certain embodiments of the process 800 can get metadata information of the source system (block 850). In various embodiments, this can be based on the target system metadata. In still more embodiments, this metadata information can be stored within a database.

In further embodiments, the process 800 can generate metadata exceptions (block 860). In a variety of embodiments, this can be done in response to a comparison that is done between the target and source system data. The comparison can be done locally or remotely through a cloud-based service provider or other device. Any generated results may be stored within a database for further processing.

Although a specific embodiment for a process 800 for generating metadata exceptions suitable for carrying out the various steps, processes, methods, and operations described herein is discussed with respect to FIG. 8, any of a variety of systems and/or processes may be utilized in accordance with embodiments of the disclosure. For example, the comparison and exception generation can be done based on a selected type of exceptions, or may be done automatically or in response to one or more events. The elements depicted in FIG. 8 may also be interchangeable with other elements of FIGS. 1-7 and FIGS. 9-18 as required to realize a particularly desired embodiment.

Figure 9:
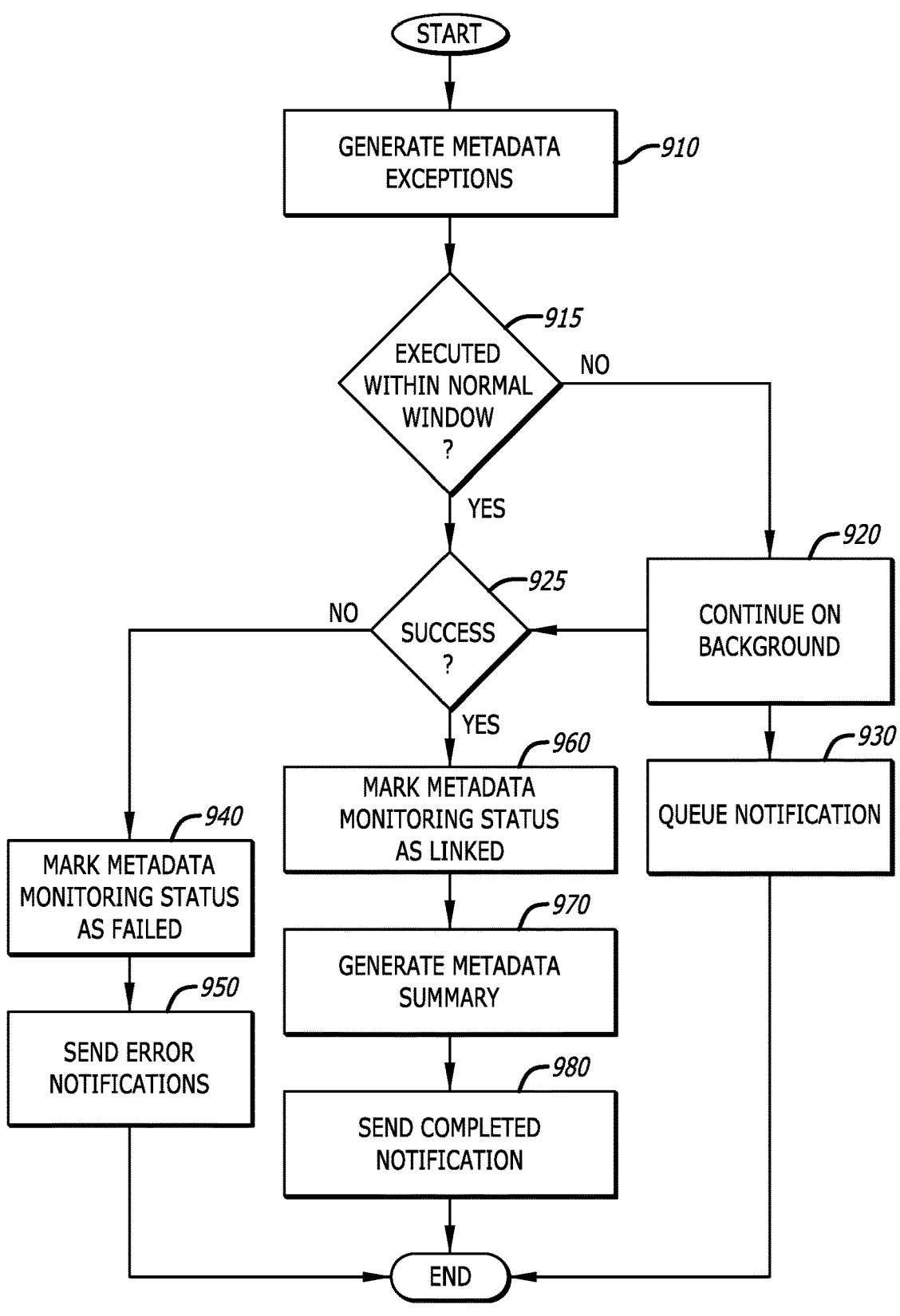
FIG. 9 is a flowchart depicting a process for generating a metadata summary in accordance with various embodiments of the disclosure.

Referring to FIG. 9, a flowchart depicting a process 900 for generating a metadata summary in accordance with various embodiments of the disclosure is shown. In many embodiments, the process 900 can generate one or more metadata exceptions (block 910). As described above with respect to FIG. 8, this can be done in response to a comparison that is done between the target and source system data. The comparison can be done locally or remotely through a cloud-based service provider or other device. Any generated results may be stored within a database for further processing.

In a number of embodiments, the process 900 can determine if the generation is executed within a normal window (block 915). This can be an expected timeframe of occurrence or within some other parameter or boundary that is expected based on the executed test case script. In response to determining that the execution has not happened within a normal window, the process 900 can continue to generate the metadata exceptions in the background (block 920). In response to this, various embodiments of the process 900 can generate a queued notification (block 930) which can indicate that the execution is now in a queued state.

However, if it is determined that the metadata exception generation is occurring within a normal window, the process 900 can further determine if the results indicate success (block 725). In some embodiments, the process 900 may also make this determination upon completion of a metadata exception generation that has completed running in the background. If the results do not indicate success, the process 900 can mark the metadata monitoring status as failed (block 940). Subsequently, some embodiments of the process 900 can send an error notification (block 950). This notification can be generated and transmitted through various means such as, but not limited to, an application notification, an email, a text message, or the like.

However, if the metadata exception generation is indicated as a success, various embodiments of the process 900 can mark the metadata monitoring status as linked (block 960). Linking a metadata monitoring status in a data pipeline can refer to establishing a connection or association between the metadata monitoring status and the relevant components, processes, or entities within the pipeline. This linkage enables organizations to track and monitor the status, health, and performance of the data pipeline in real-time or near real-time. By linking metadata monitoring status to specific pipeline components or processes, organizations can gain insights into the operational status, data quality, and reliability of each stage of the pipeline, including data ingestion, transformation, loading, and delivery. This allows for proactive identification and resolution of issues, anomalies, or discrepancies that may arise during data processing, ensuring that the pipeline operates smoothly and efficiently. Additionally, linking metadata monitoring status can facilitate reporting, auditing, and compliance efforts by providing a comprehensive view of the pipeline's performance and adherence to predefined metrics, thresholds, or service-level agreements (SLAs).

In still more embodiments, the process 900 can generate a metadata summary (block 970). In some embodiments, the metadata summary may comprise different types of exception tables with detailed discrepancies between table columns, sizes, data types, and/or primary keys in the source vs. the target system. However, other types of formats of summaries may be utilized as needed based on the desired application.

In various embodiments, the process 900 can send a completed notification. This notification can be configured to allow a user to review the metadata exceptions and take further action if needed. This notification can be generated and transmitted through various means such as, but not limited to, an application notification, an email, a text message, or the like.

Although a specific embodiment for a process 900 for generating a metadata summary suitable for carrying out the various steps, processes, methods, and operations described herein is discussed with respect to FIG. 9, any of a variety of systems and/or processes may be utilized in accordance with embodiments of the disclosure. For example, the metadata exceptions can indicate success if only certain types of errors or exceptions occur, which can be configured by a user, logic, or other administrator. The elements depicted in FIG. 9 may also be interchangeable with other elements of FIGS. 1-8 and FIGS. 10-18 as required to realize a particularly desired embodiment.

Figure 10:
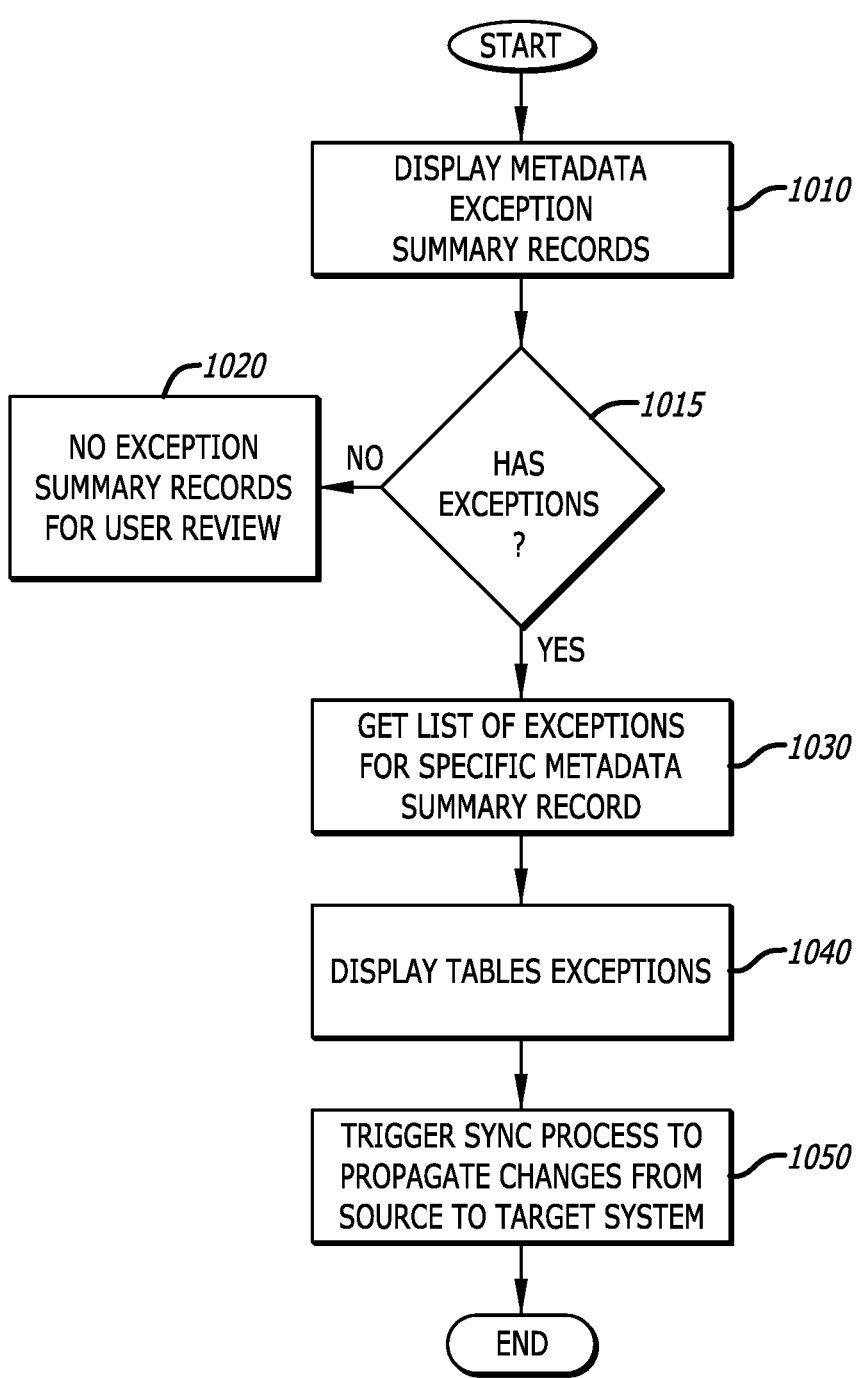
FIG. 10 is a flowchart depicting a process for triggering a sync process in accordance with various embodiments of the disclosure.

Referring to FIG. 10, a flowchart depicting a process 1000 for triggering a sync process in accordance with various embodiments of the disclosure is shown. In many embodiments, the process 1000 can display metadata exception summary records (block 1010). This display can be through a graphical user interface, but may also be represented on other media or portals.

In a number of embodiments, the process 1000 can determine if the summary has any exceptions (block 1015). In response to no exceptions being found, the process 1000 can indicate that no exception summary records exist for a user to review (block 1020). However, if exceptions are determined to exist, then various embodiments of the process 1000 can generate a list of exceptions for specific metadata summary records (block 1030). The specific records may be selected based on a heuristic rule set which can indicate priority, on the number of exceptions present, or dynamically selected based on the type of exceptions found and/or the type of industry served.

In further embodiments, the process 1000 can display one or more exception tables (block 1040). This display may be presented on a graphical user interface, such as that of a specialized application running on a desktop computer application, or a mobile computing device application. The display may be presented via a web-based portal such that the generation occurs on a remote server, or the like. In certain embodiments, the tables may be configured to indicate detailed discrepancies such as, but not limited to, table columns, size, and datatype as well as primary keys in the source vs. the target system, etc.

In additional embodiments, the process 1000 can trigger a sync process to propagate changes from the source system to the target system (block 1050). This propagation can be automatic in nature, or may be set at a predefined time or in response to a specific event. The propagation may also be transmitted from the source system to the target system, but may also be retrieved by the target system from the source system.

Although a specific embodiment for a process 1000 for triggering a sync process suitable for carrying out the various steps, processes, methods, and operations described herein is discussed with respect to FIG. 10, any of a variety of systems and/or processes may be utilized in accordance with embodiments of the disclosure. For example, the exceptions that can trigger a sync across systems may be limited by an administrator or logic based on one or more predetermined rules. The elements depicted in FIG. 10 may also be interchangeable with other elements of FIGS. 1-9 and FIGS. 11-18 as required to realize a particularly desired embodiment.

Figure 11:
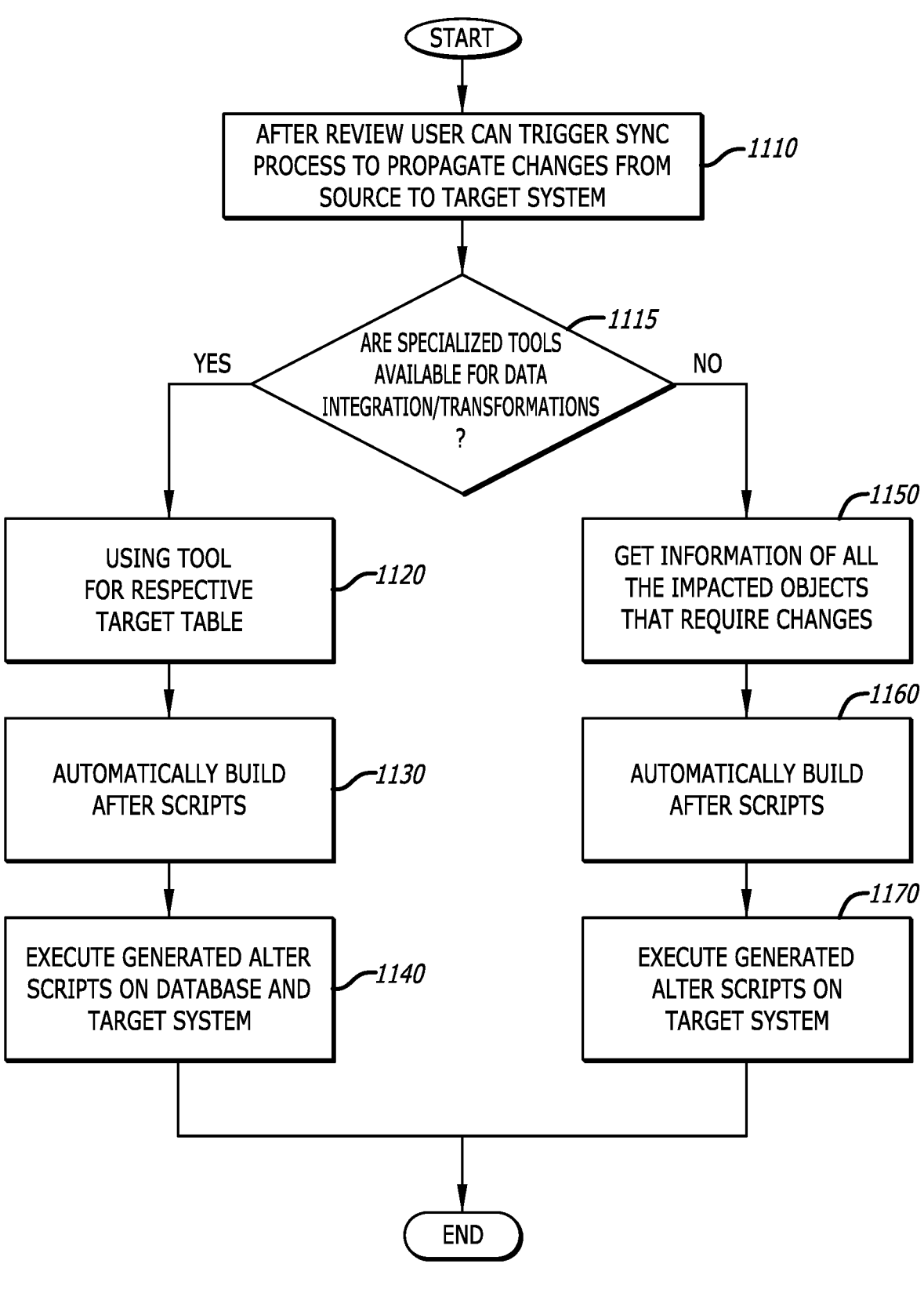
FIG. 11 is a flowchart depicting a process for executing a generated alter script in accordance with various embodiments of the disclosure.

Referring to FIG. 11, a flowchart depicting a process 1100 for executing a generated alter script in accordance with various embodiments of the disclosure is shown. In the context of evaluating metadata in a data pipeline, an alter script can refer to a script or set of instructions used to modify the structure or schema of a database or data repository within the pipeline. This script can be employed to make changes to the target schema or data model based on determined metadata exceptions, data analysis needs, or schema enhancements. An alter script may include commands to add, modify, or delete tables, columns, indexes, constraints, or other database objects, allowing organizations to adapt their data infrastructure to accommodate new data sources, fields, or relationships.

In many embodiments, the process 1100 can trigger a sync process to propagate changes from a source system to a target system (block 1110). This propagation can be automatic in nature, or may be set at a predefined time or in response to a specific event. The propagation may also be transmitted from the source system to the target system, but may also be retrieved by the target system from the source system.

In more embodiments, the process 1100 can determine if there are specialized tools available for data modeling and/or transformations (block 1115). For example, specialized tools related to an extract, load, transform (ELT) or extract, transform, load (ETL) may be available. However, other tools may be available depending on the type of data being evaluated.

In response to one or more specialized tools being available, the process 1100 can utilize the tool(s) for the respective target table (block 1120). Subsequently, various embodiments of the process 1100 can automatically build an alter script (block 1130). In some embodiments, the alter script can be based on each different type of exception, such as, but not limited to, missing columns, primary key mismatches, column data type mismatch, and/or column size mismatch. In more embodiments, the process 1100 can execute the generated alter script on the database related to the tool as well as the target system (block 1140).

However, when there is no specialized tool available, the process 1100 can get the metadata information of all of the impacted or associated objects that will require a change (block 1150). Subsequently, various embodiments of the process 1100 may also automatically build an alter script (block 1160). In these embodiments, the alter script can be based on each different type of exception, such as, but not limited to, missing columns, primary key mismatches, column data type mismatch, and/or column size mismatch. In still more embodiments, the process 1100 can execute the generated alter script on the target system (block 1170).

Although a specific embodiment for a process 1100 for executing a generated alter script suitable for carrying out the various steps, processes, methods, and operations described herein is discussed with respect to FIG. 11, any of a variety of systems and/or processes may be utilized in accordance with embodiments of the disclosure. For example, the target of the alter scripts may vary depending on the system being evaluated, any regulations or data retention rules set in place, and/or the type of industry being served. The elements depicted in FIG. 11 may also be interchangeable with other elements of FIGS. 1-10 and FIGS. 12-18 as required to realize a particularly desired embodiment.

Figure 12:
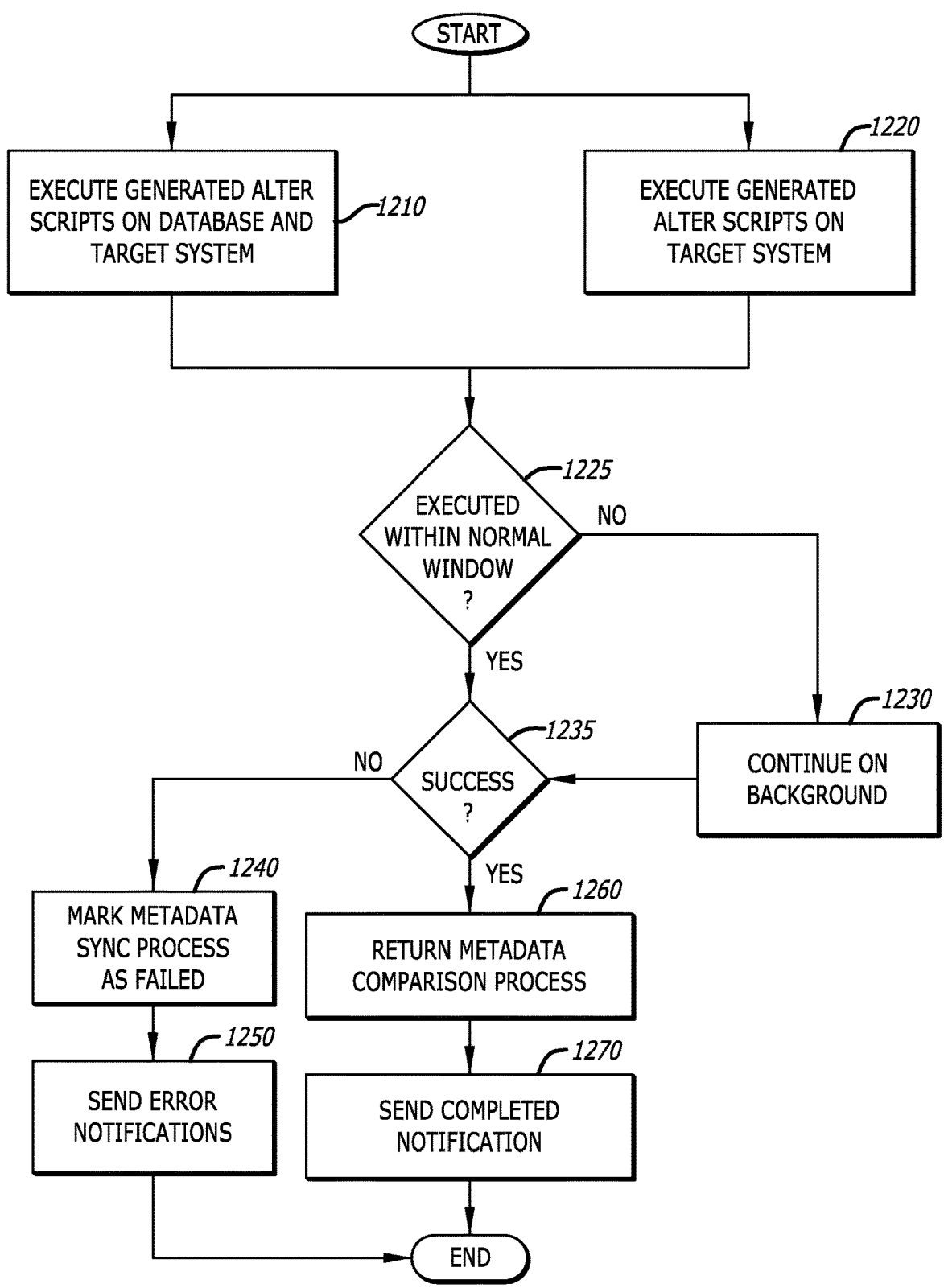
FIG. 12 is a flowchart depicting a process for conducting a metadata comparison in accordance with various embodiments of the disclosure.

Referring to FIG. 12, a flowchart depicting a process 1200 for conducting a metadata comparison in accordance with various embodiments of the disclosure is shown. In many embodiments, an alter script can be run. In certain embodiments, the process 1200 can execute a generated alter script on the database related to the tool as well as the target system (block 1210). In additional embodiments, the process 1200 can simply execute a generated alter script on the target system (block 1220).

In either event, various embodiments of the process 1200 can subsequently determine if the alter script(s) were executed within a normal time window (block 1225). This can be an expected timeframe of occurrence or within some other parameter or boundary that is expected based on the executed test case script. In response to determining that the execution has not happened within a normal window, the process 1200 can continue to execute the alter script in the background (block 1230).

However, if it is determined that the alter script is executing within a normal time window, the process 1200 can further determine if the alterations executed by the alter script were a success (block 1235). In some embodiments, the process 1200 may also make this determination upon completion of a alter script that has completed running in the background. If the results do not indicate success, the process 1200 can mark the metadata sync process as failed (block 1240). Subsequently, some embodiments of the process 1200 can send an error notification (block 1250). This notification can be generated and transmitted through various means such as, but not limited to, an application notification, an email, a text message, or the like.

However, if the alter script execution is indicated as a success, various embodiments of the process 1200 can mark the subsequently re-run the metadata comparison (block 1260). This can then generate a new exception summary report between the source system and the target system. In certain embodiments, this new report can be configured to show the changes carried out by the alter script as well as changes from exceptions to non-exceptions, etc.

In further embodiments, the process 1200 can send a completed notification associated with the re-run metadata comparison (block 1270). This notification can be generated and transmitted through various means such as, but not limited to, an application notification, an email, a text message, or the like. However, the notification may be generated and displayed to a user or network administrator through a graphical user interface, or other web-based portal, etc.

Although a specific embodiment for a process 1200 for conducting a metadata comparison suitable for carrying out the various steps, processes, methods, and operations described herein is discussed with respect to FIG. 12, any of a variety of systems and/or processes may be utilized in accordance with embodiments of the disclosure. For example, the re-running of the metadata comparison may be triggered by a user, logic, or other administrator instead of being done automatically. The elements depicted in FIG. 12 may also be interchangeable with other elements of FIGS. 1-11 and FIGS. 13-18 as required to realize a particularly desired embodiment.

Figure 13:
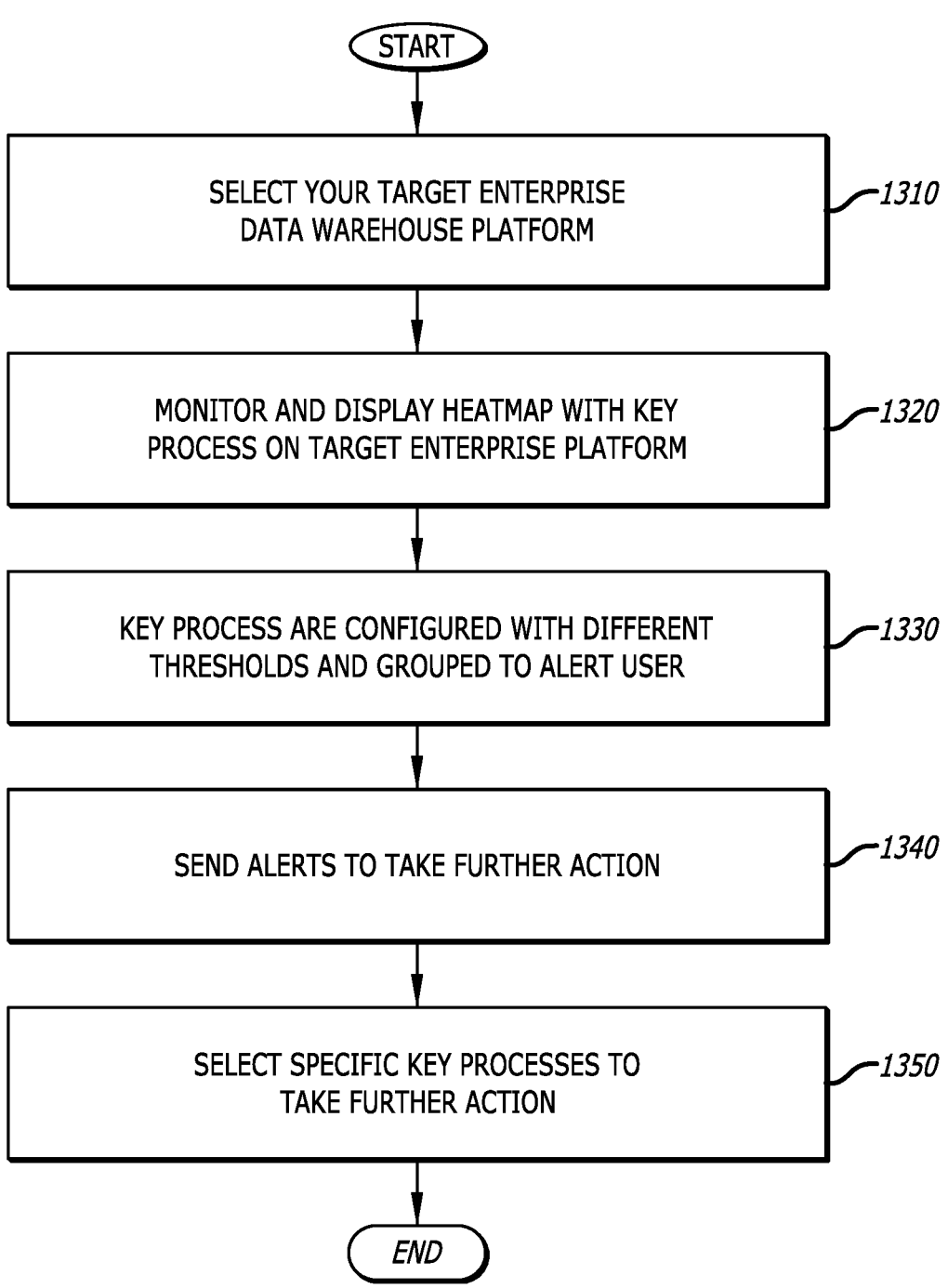
FIG. 13 is a flowchart depicting a process for selecting a key process in accordance with various embodiments of the disclosure.

Referring to FIG. 13, a flowchart depicting a process 1300 for selecting a key process in accordance with various embodiments of the disclosure is shown. In many embodiments, the process 1300 can select a target enterprise data warehouse (EDW) platform (block 1310). In some embodiments, this can be done through one or more configurable screens, graphical user interface, and/or prompts. In more embodiments, the configurations can relate to the Snowflake system, SQL server settings, PostgreSQL settings, MySQL settings.

In a number of embodiments, the process 1300 can monitor and display a heatmap with key processes on a target enterprise platform (block 1320). Key processes may include, but are not limited to, task/job failures, copy failures, query failures, long running queriers, and/or login failures, etc. The heatmap can be configured in a variety of ways based on the desired application and/or display preferences.

In more embodiments, the process 1300 can configure key processes with different thresholds and grouping for alerting a user (block 1330). These threshold can be setup in a variety of ways. In some embodiments for example, these thresholds may be set as good, moderate, and critical. However, as those skilled in the art will recognize, the type of thresholds used and the manner they are determined (dynamic vs. static, etc.) can vary based on the desired application.

In additional embodiments, the process 1300 can send alerts to take further action (block 1340). These alerts can be sent through an application, web portal, email, text, etc. They can be configured to alert a user to review and subsequently take further action.

In further embodiments, the process 1300 can select specific key processes to take further action (block 1350). In certain embodiments, this can be related to a heatmap tile for a user to select. These heatmap tiles can be part of an alert that has been generated and sent to the user, or administrator, etc. and presented as a graphical user interface.

Although a specific embodiment for a process 1300 for selecting a key process suitable for carrying out the various steps, processes, methods, and operations described herein is discussed with respect to FIG. 13, any of a variety of systems and/or processes may be utilized in accordance with embodiments of the disclosure. For example, the use of a heatmap may be replaced by another method of displaying information across various displays for selection. The elements depicted in FIG. 13 may also be interchangeable with other elements of FIGS. 1-12 and FIGS. 14-18 as required to realize a particularly desired embodiment.

Figure 14:
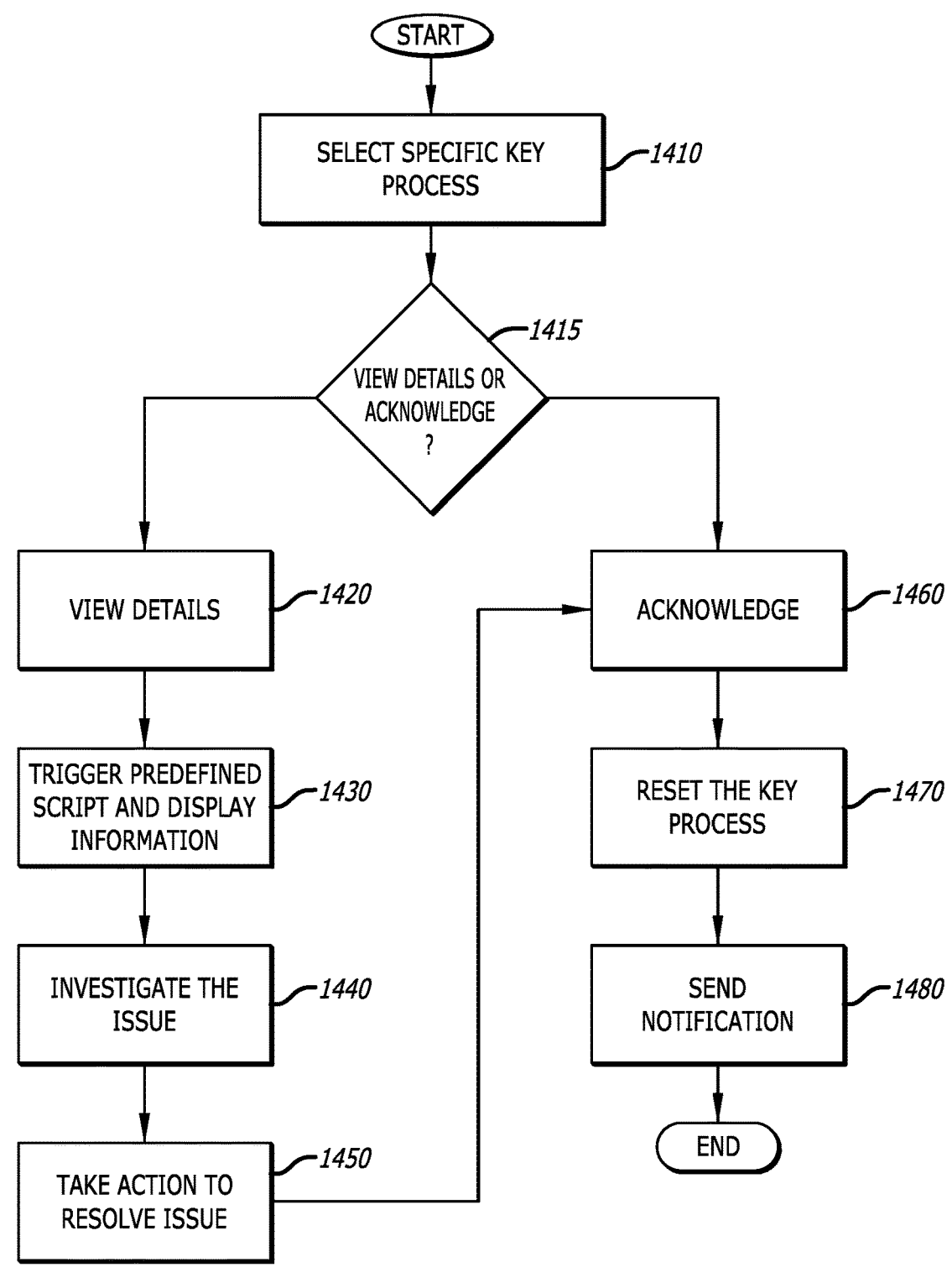
FIG. 14 is a flowchart depicting a process for managing key processes in accordance with various embodiments of the disclosure.

Referring to FIG. 14, a flowchart depicting a process 1400 for managing key processes in accordance with various embodiments of the disclosure is shown. In many embodiments, the process 1400 can select specific key processes to take further action (block 1410). In certain embodiments, this can be related to a heatmap tile for a user to select. These heatmap tiles can be part of an alert that has been generated and sent to the user, or administrator, etc. and presented as a graphical user interface.

In a number of embodiments, the process 1400 can determine if details are viewed or acknowledged (block 1415). In response to a selection of viewing, the process 1400 can provide a method to view the details (block 1420). The view can be in the form of an alert message, or can be sent as data to another logic or the like. In response, the process 1400 can trigger a predefined script or display information (block 1430). This information can be displayed on a screen within a graphical user interface and can be based on a key processes selection, such as a heatmap tile, that caused the original alert.

In more embodiments, the process 1400 can provide a means to allow a user, logic, or administrator to investigate an issue related to the key process (block 1440). This may be by providing one or more suggestions or predefined actions that can be selected based on the determined results. In further embodiments, the process 1400 can take action to resolve the issue (block 1450). In some embodiments, a logic, such as, but not limited to, a machine-learning based logic can take the current conditions as input and select a course of action as a response or output.

In response to the action being taken, or when the details are indicated to be acknowledged, the process 1400 can acknowledge the details (block 1460). This acknowledgment can be in the form of a prompt generated in a graphical user interface that can be selected, or another method such as a logic responding with a signal that the data associated with the details was received.

In still more embodiments, the process 1400 can reset the key process (block 1470). In embodiments where heatmap tiles are utilized for communicating key processes, the specific key process heatmap tile may be reset. However, as those skilled in the art will recognize, the resetting can apply to various methods of data that can be set into a triggered, or active state.

In various embodiments, the process 1400 can send a notification (block 1480). This notification can be associated with the reset state of the key process. This notification can be generated and transmitted through various means such as, but not limited to, an application notification, an email, a text message, or the like.

Although a specific embodiment for a process 1400 for managing key processes suitable for carrying out the various steps, processes, methods, and operations described herein is discussed with respect to FIG. 14, any of a variety of systems and/or processes may be utilized in accordance with embodiments of the disclosure. For example, in some embodiments, the process 1400 can avoid the determination of view vs. acknowledgment and simply go to view as part of the process 1400. The elements depicted in FIG. 14 may also be interchangeable with other elements of FIGS. 1-13 and FIGS. 15-18 as required to realize a particularly desired embodiment.

Figure 15:
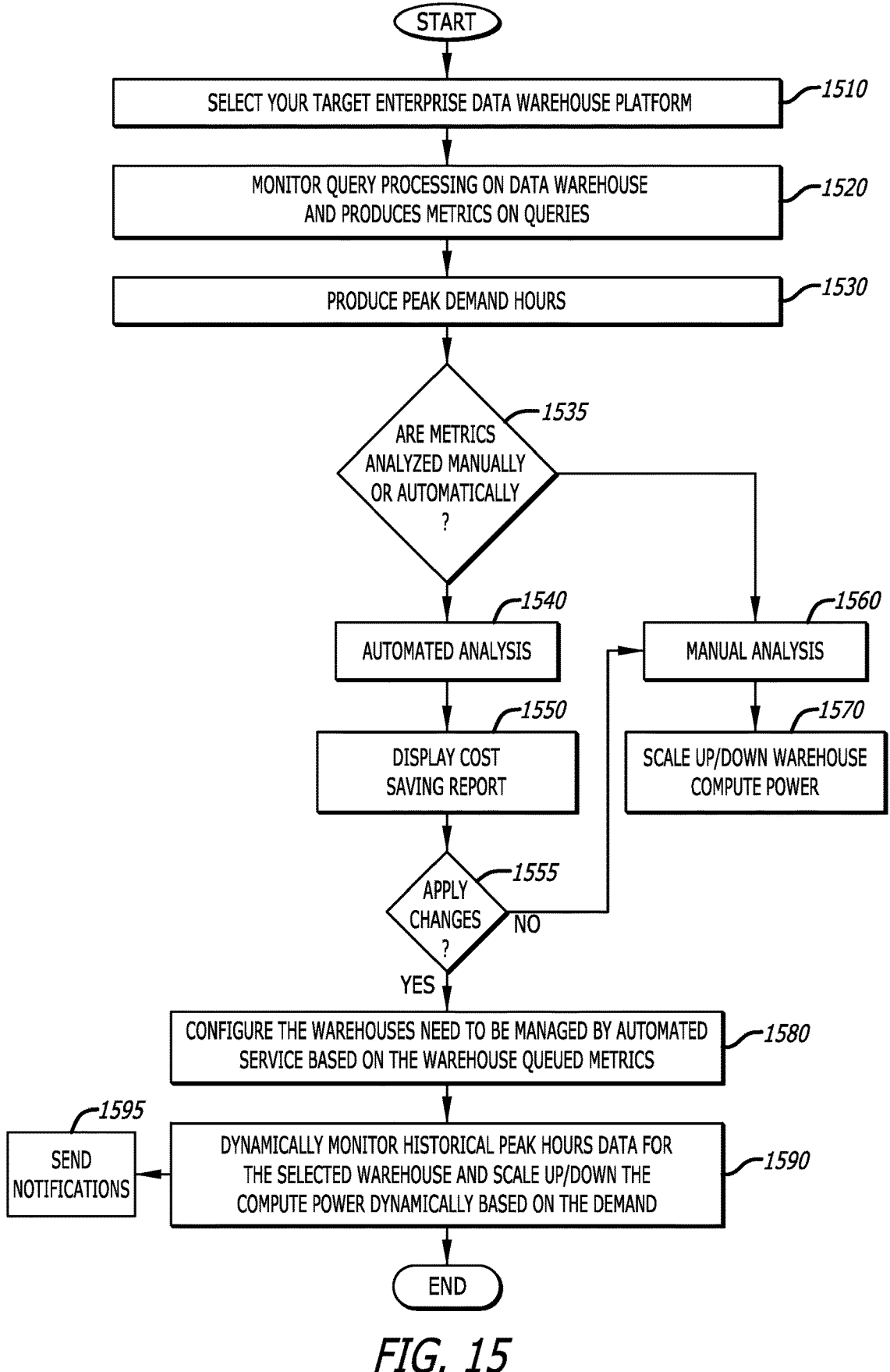
FIG. 15 is a flowchart depicting a process for configuring data warehouses in accordance with various embodiments of the disclosure.

Referring to FIG. 15, a flowchart depicting a process 1500 for configuring data warehouses in accordance with various embodiments of the disclosure is shown. In many embodiments, the process 1500 can select a target enterprise data warehouse (EDW) platform (block 1510). In some embodiments, this can be done through one or more configurable screens, graphical user interface, and/or prompts. In more embodiments, the configurations can relate to the Snowflake system, an AWS Redshift, a Google BigQuery, an Azure Synapse, or through Databricks.

In a number of embodiments, the process 1500 can monitor query processing on the data warehouse and produce metrics on queries (block 1520). Monitoring queries allows organizations to assess the performance and efficiency of their data pipelines. By tracking query execution times, resource utilization, and throughput metrics, organizations can identify bottlenecks, optimize query performance, and ensure that the pipeline meets service-level agreements (SLAs) for data processing and delivery. Secondly, monitoring queries helps organizations detect and troubleshoot issues or anomalies in the data pipeline. By monitoring query logs and error messages, organizations can identify errors, failures, or data inconsistencies that may arise during data processing. This enables prompt investigation and resolution of issues to prevent data pipeline downtime or data quality issues. In some embodiments, this monitoring can be done on EDWs that are encountering significant demand and/or encountering a delay in meeting that demand.

In more embodiments, the process 1500 can produce peak demand hours (block 1530). This can be done by utilizing advanced analytics on the EDW's query processing data. The peak demand hours can then be displayed to a user or passed to another logic for further processing.

In further embodiments, the process 1500 can determine if the metrics are being analyzed manually or automatically (block 1535). This determination may be a selection in response to the current query processing demands on peak hours. In certain embodiments, the automatic process may be provided as a service that can be selected by a user, administrator, or a logic if enabled.

If manual processing is desired, the process 1500 can execute a manual analysis (block 1560). In response to the manual analysis, the process 1500 can further scale up or down the available EDW computing power (block 1570). This can be based on the metrics provided, but may be done for a variety of reasons.

However, if it is determined that an automatic analysis is desired, the numerous embodiments of the process 1500 can execute an automated analysis (block 1540). The automated analysis can include setting one or more thresholds, analyzing various data, and/or providing one or more suggested actions in response to the analysis. In some embodiments, the automated analysis is generated by one or more machine-learning processes.

In still more embodiments, the process 1500 can display a cost saving report (block 1550). This cost saving report can be configured to include any modifications proposed, such as to the available computing power. The metrics provided can also be configured as a forecast for an upcoming period of time. This period of time can vary, but may include several days, a week, etc. The specific forecast can vary based on the subscription or product purchased.

In numerous embodiments, the process 1500 can determine if the proposed changes should be applied (block 1555). This determination can be done by a user or administrator in certain embodiments. In other embodiments, the determination can be made by a logic in response to a set of heuristic rules, or as an output of one or more machine-learning processes. If the determination is that the changes should not be applied, then the process 1500 can revert to a manual analysis (block 1560).

However, if it is determined that the changes should be applied, then the process 1500 can configure the EDW(s) to be managed by an automated service based on the queued metrics (block 1580). In certain embodiments, this may be a one-time process upon setup that can be skipped upon subsequent analyses. The setup may be required by an EDW administrator.

In yet further embodiments, the process can dynamically monitor historical peak hour data for the selected warehouse and scale up or down the compute power dynamically based on the demand (block 1590). In some embodiments, the dynamic monitoring can be based on other available data. For example, the available computing power, cost of electricity, or other sustainability factors may be utilized when making decisions on whether to scale computing power up or down.

In more additional embodiments, the process 1500 can send notifications related to the dynamic monitoring (block 1595). This notification can be generated and transmitted through various means such as, but not limited to, an application notification, an email, a text message, or the like. However, certain notifications may be sent to another logic for further processing.

Although a specific embodiment for a process 1500 for configuring data warehouses suitable for carrying out the various steps, processes, methods, and operations described herein is discussed with respect to FIG. 15, any of a variety of systems and/or processes may be utilized in accordance with embodiments of the disclosure. For example, the historical peak demand hours or queries may be utilized to preemptively make decisions on available computing power. The elements depicted in FIG. 15 may also be interchangeable with other elements of FIGS. 1-14 and FIGS. 16-18 as required to realize a particularly desired embodiment.

Figure 16:
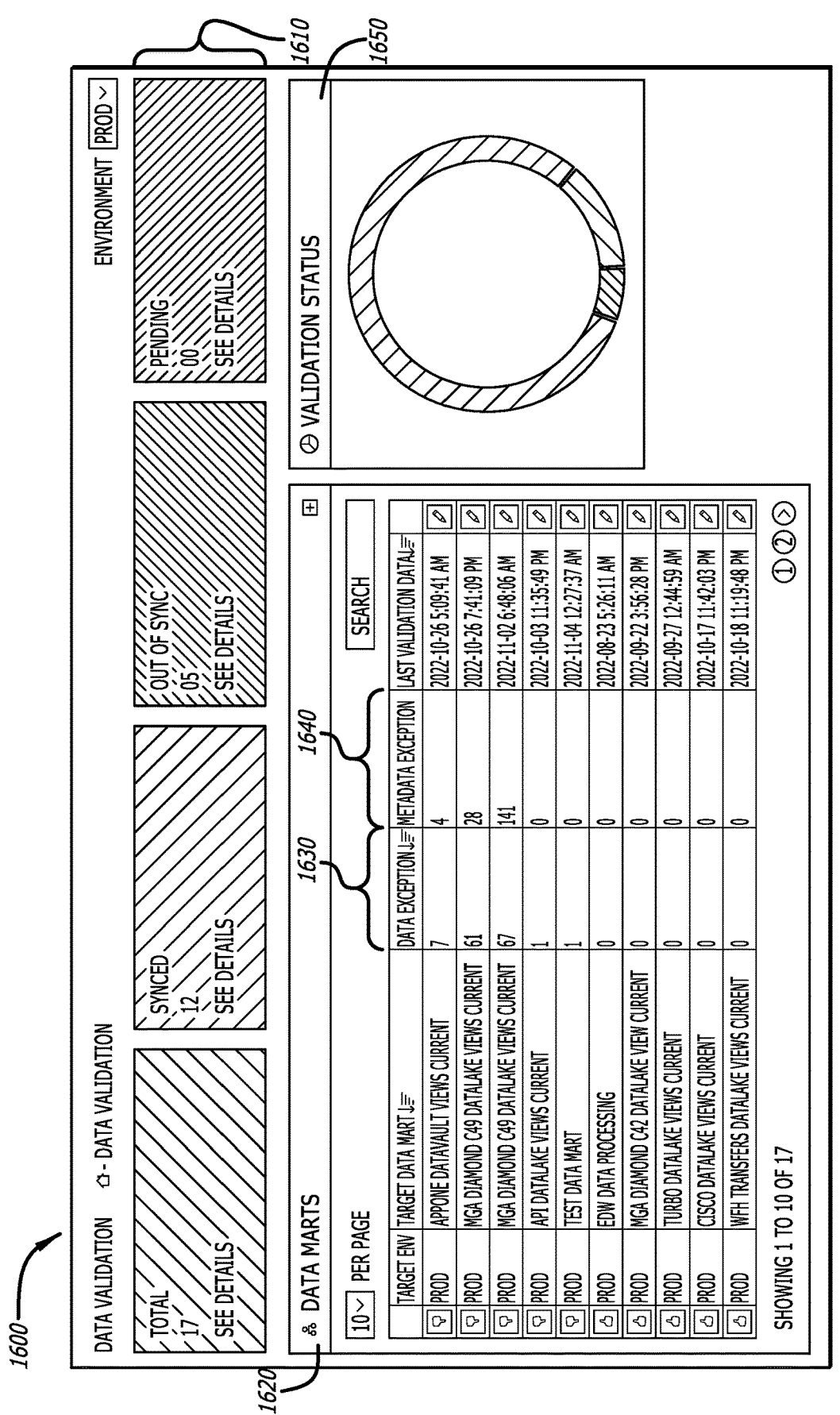
FIG. 16 is a conceptual graphical user interface for data validation in accordance with various embodiments of the disclosure.

Referring to FIG. 16, a conceptual graphical user interface 1600 for data validation in accordance with various embodiments of the disclosure is shown. In many embodiments, the graphical user interface 1600 can include a variety of components for providing data comparisons using test cases between source and target systems. In more embodiments, the graphical user interface 1600 can be configured for business logic validation between raw data and other information. Components may also be configured to give access for file load monitoring of a data lake or similar structure. In a number of embodiments, the graphical user interface 1600 can comprise components configured to provide investigations and monitoring of data discrepancies, as well as helping a user to understand the data volume trends from the source system.

In the embodiment depicted in FIG. 16, the graphical user interface 1600 includes a top alert area 1610, as well as a data marts window 1620. Within the data marts window 1620, a column for data exceptions 1630 can be formatted to provide quick visible access to available data exceptions on each data mart. Likewise, a metadata exception column 1640 can be configured to also provide quick visible access to the number of metadata exceptions within each data mart. Finally, a validation status chart 1650 can be displayed which can quickly provide visual feedback on the state of the system.

Although a specific embodiment for a process 1600 for data validation suitable for carrying out the various steps, processes, methods, and operations described herein is discussed with respect to FIG. 16, any of a variety of systems and/or processes may be utilized in accordance with embodiments of the disclosure. For example, as those skilled in the art will recognize, a graphical user interface can vary greatly based on the display provided and the application desired. The elements depicted in FIG. 16 may also be interchangeable with other elements of FIGS. 1-15 and FIGS. 17-18 as required to realize a particularly desired embodiment.

Figure 17:
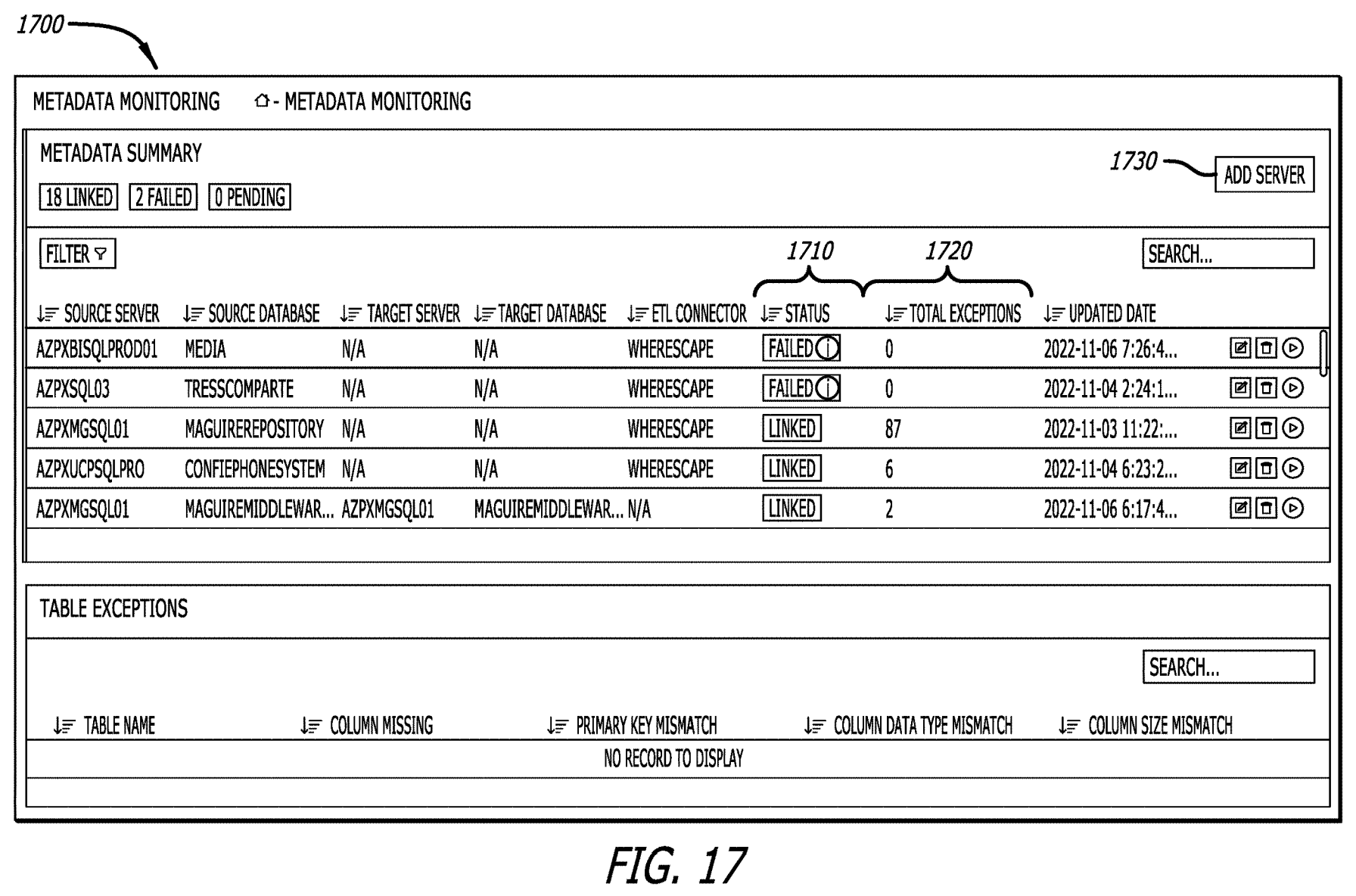

Referring to FIG. 17, a conceptual graphical user interface 1700 for metadata monitoring in accordance with various embodiments of the disclosure is shown. In many embodiments, the graphical user interface 1700 can be configured for processing automated metadata (or object structure) comparison between the source and target systems. In additional embodiments, the graphical user interface 1700 can allow for the generation of metadata exceptions within a summary for objects with missing columns, data type, size, and/or mismatch. This can allow for action to be taken quicker and the avoidance of and fixing of exceptions within the data pipeline which can avoid ETL failures.

In the embodiment depicted in FIG. 17, the graphical user interface 1700 comprises a list of source and target systems. Each system can be affixed a status, which can be displayed within a status column 1710. Likewise, a total exceptions column 1720 can be added to allow for a quick visual clue on the exceptions associated with each system and/or translation. In more embodiments, the graphical user interface 1700 can also be configured with an add server button 1730 which can allow for adding new servers and/or translations in the EDW and data pipeline management system.

Although a specific embodiment for a process 1700 for metadata monitoring suitable for carrying out the various steps, processes, methods, and operations described herein is discussed with respect to FIG. 17, any of a variety of systems and/or processes may be utilized in accordance with embodiments of the disclosure. For example, as those skilled in the art will recognize, a graphical user interface can vary greatly based on the display provided and the application desired. The elements depicted in FIG. 17 may also be interchangeable with other elements of FIGS. 1-16 and FIG. 18 as required to realize a particularly desired embodiment.

Figure 18:
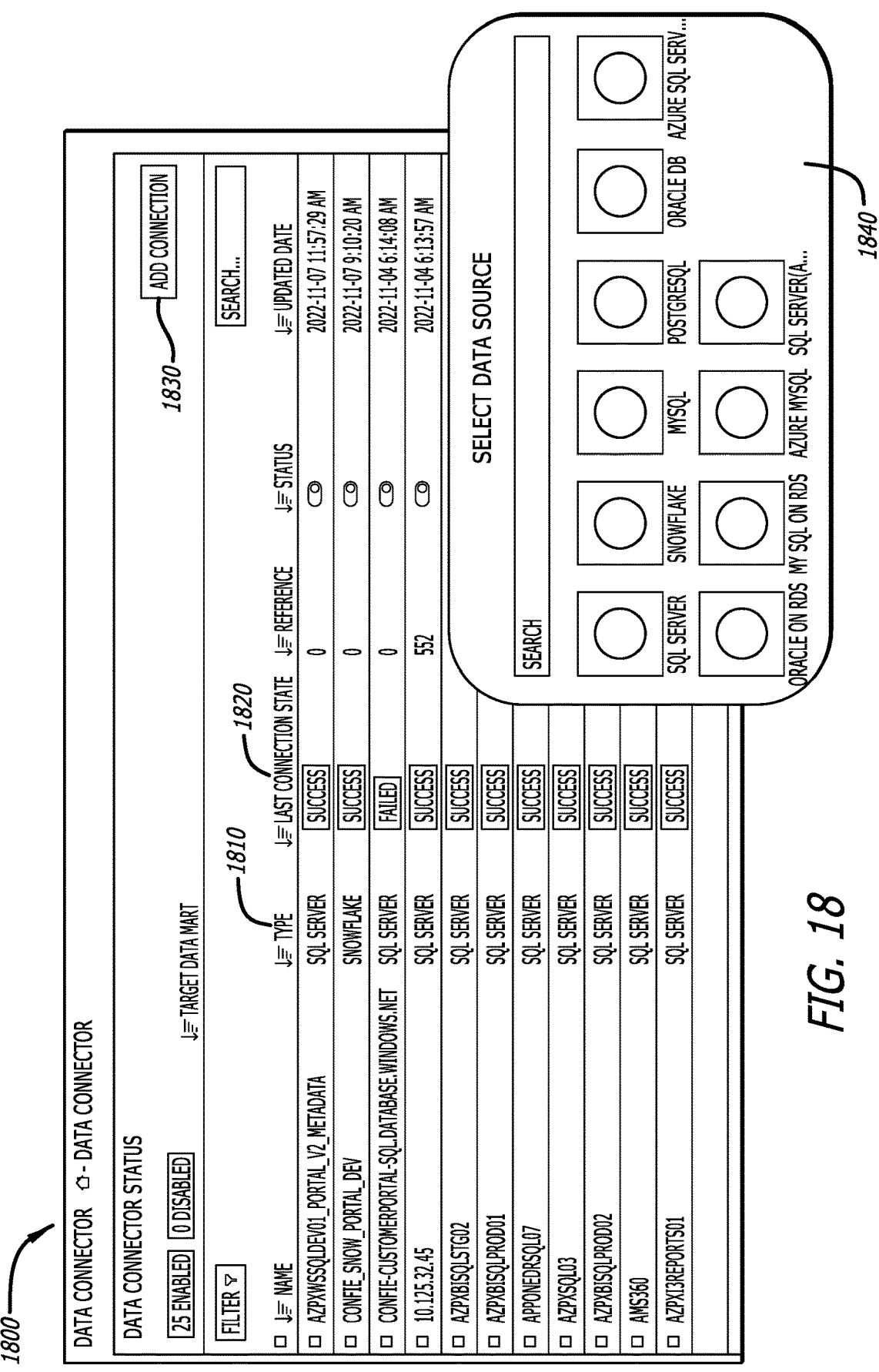
FIG. 18 is a conceptual graphical user interface for data connectors in accordance with various embodiments of the disclosure.

FIG. 18 is a conceptual graphical user interface 1800 for data connectors in accordance with various embodiments of the disclosure. In many embodiments, the graphical user interface 1800 can allow for the ability to connect a variety of data sources both in on-premises environments as well as on the cloud. This can help to orchestrate an end-to-end data validation and metadata monitoring system. In additional embodiments, the graphical user interface 1800 can allow for the inclusion of connections from various sources like, but not limited to, SQL servers, Snowflake systems, My SQL servers, PostgreSQL servers, Oracle SQL servers, Azure and AWS systems, and the like.

In the embodiment depicted in FIG. 18, the graphical user interface 1800 shows a variety of data connections. Each data connection can have a type indicated via a type column 1810. Similarly, a last connection state column 1820 can provide a quick visual indication on the current or last known state of the connection. Finally, an add connection button 1830 can be provided to allow for the selection of additional connections. In some embodiments, this may be done through the use of a connection selection wizard 1840 or other similar series of prompts configured to allow quick connection between a variety of connection sources.

Although a specific embodiment for a process 1800 for data connectors suitable for carrying out the various steps, processes, methods, and operations described herein is discussed with respect to FIG. 18, any of a variety of systems and/or processes may be utilized in accordance with embodiments of the disclosure. For example, as those skilled in the art will recognize, a graphical user interface can vary greatly based on the display provided and the application desired. The elements depicted in FIG. 18 may also be interchangeable with other elements of FIGS. 1-17 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
a memory communicatively coupled to the processor;
a data quality management logic when executed by the processor to:
select a target enterprise data warehouse (EDW) platform;
monitor query processing on the target EDW platform;
produce metrics on queries including query execution times, resource utilization, throughput, and error conditions;
analyze the produced metrics to identify peak demand hour data based on periods of highest aggregate resource utilization or query activity;
determine, based on the produced metrics, whether analysis will proceed using an automated analysis or a manual analysis;
scaling available EDW computing power up or down in response to the manual analysis;
generate, in response to the automated analysis, a plurality of suggested actions including compute-scaling recommendations and configuration changes derived from the thresholds or machine-learning outputs;
automatically select one of the suggested actions; and
dynamically apply the selected suggested action.

2. The device of claim 1, wherein the data quality management logic is further configured to send a notification in response to the dynamically applied selected suggested action.

3. The device of claim 1, wherein the suggested action is associated with computing power.

4. The device of claim 3, wherein the computing power is related to the EDW.

5. The device of claim 4, wherein the suggested action is to increase the overall available computing power of the EDW.

6. The device of claim 1, wherein the monitoring of the target EDW platform comprises at least monitoring the queries associated with the EDW.

7. The device of claim 6, wherein the monitoring further comprises determining a delay time associated with the queries.

8. The device of claim 7, wherein data quality management logic is further configured to produce a plurality of metrics based on the monitoring of the target EDW platform.

9. The device of claim 8, wherein the metrics are based on the delay time and the produced peak demand hour data.

10. The device of claim 9, wherein the analysis of the target EDW platform is at least based on the produced plurality of metrics.

11. A method of dynamically monitoring enterprise data warehouse (EDW) platforms, comprising:

selecting, via a data quality management logic when executed by a processor, a target EDW platform;

monitoring query processing on the target EDW platform;

producing metrics on queries including query execution times, resource utilization, throughput, and error conditions;

analyzing the produced metrics to identify peak demand hour data based on periods of highest aggregate resource utilization or query activity;

determining, based on the produced metrics, whether analysis will proceed using an automated analysis or a manual analysis;

scaling available EDW computing power up or down in response to the manual analysis;

generating, in response to the automated analysis, a plurality of suggested actions including compute-scaling recommendations and configuration changes derived from the thresholds or machine-learning outputs;

automatically selecting one of the suggested actions; and dynamically applying the selected suggested action.

12. The method of claim 11, wherein the data quality management logic is further configured to send a notification in response to the dynamically applied selected suggested action.

13. The method of claim 11, wherein the suggested action is associated with computing power.

14. The method of claim 13, wherein the computing power is related to the EDW.

15. The method of claim 14, wherein the suggested action is to increase the overall available computing power of the EDW.

16. The method of claim 11, wherein the monitoring of the target EDW platform comprises at least monitoring the queries associated with the EDW.

17. The method of claim 16, wherein the monitoring further comprises determining a delay time associated with the queries.

18. The method of claim 17, wherein data quality management logic is further configured to produce a plurality of metrics based on the monitoring of the target EDW platform.

19. The method of claim 18, wherein the metrics are based on the delay time and the produced peak demand hour data.

20. The method of claim 19, wherein the analysis of the EDW platform is at least based on the produced plurality of metrics.

\* \* \* \* \*